(12) United States Patent
Blumberg, Jr.

(10) Patent No.: US 9,270,010 B2
(45) Date of Patent: Feb. 23, 2016

(54) RFID SYSTEM WITH AN EDDY CURRENT TRAP

(75) Inventor: David Blumberg, Jr., Manchester, NH (US)

(73) Assignee: DEKA Products Limited Partnership, Manchester, NH (US)

(*) Notice: Subject to any disclaimer, the term of this patent is extended or adjusted under 35 U.S.C. 154(b) by 1218 days.

(21) Appl. No.: 13/035,438

(22) Filed: Feb. 25, 2011

(65) Prior Publication Data

US 2011/0205134 A1    Aug. 25, 2011

Related U.S. Application Data

(63) Continuation-in-part of application No. 12/469,545, filed on May 20, 2009, now Pat. No. 8,314,740, which is a continuation-in-part of application No. 12/205,681, filed on Sep. 5, 2008, now Pat. No. 8,325,045.

(60) Provisional application No. 61/308,655, filed on Feb. 26, 2010, provisional application No. 61/092,396, filed on Aug. 27, 2008, provisional application No. 60/970,497, filed on Sep. 6, 2007, provisional application No. 61/054,757, filed on May 20, 2008, provisional application No. 61/168,364, filed on Apr. 10, 2009.

(51) Int. Cl.

| H01Q 11/12 | (2006.01) |
|---|---|
| H01Q 1/22 | (2006.01) |
| A47J 31/40 | (2006.01) |
| G06K 7/00 | (2006.01) |
| G06K 7/10 | (2006.01) |
| H01Q 1/52 | (2006.01) |
| H01Q 7/00 | (2006.01) |
| H01Q 19/00 | (2006.01) |
| H01Q 15/00 | (2006.01) |

(52) U.S. Cl.
CPC ............ *H01Q 1/2208* (2013.01); *A47J 31/40* (2013.01); *G06K 7/0008* (2013.01); *G06K 7/10316* (2013.01); *H01Q 1/2216* (2013.01); *H01Q 1/521* (2013.01); *H01Q 7/00* (2013.01); *H01Q 15/0086* (2013.01); *H01Q 19/00* (2013.01)

(58) Field of Classification Search
CPC .......... G06K 7/10316; H01Q 15/0086; H01Q 1/2216; H01Q 1/521; H01Q 7/00; H01Q 19/00; H01Q 1/2208
USPC .......................... 343/741, 742, 753, 866, 867
See application file for complete search history.

(56) References Cited

U.S. PATENT DOCUMENTS

| 2,982,895 A | 5/1961 | Exon |
| 3,738,356 A | 6/1973 | Workman |

(Continued)

FOREIGN PATENT DOCUMENTS

| EP | 1768211 A1 | 3/2007 |
| EP | 1826866 A1 | 8/2007 |

(Continued)

OTHER PUBLICATIONS

International Search Report and Written Opinion dated Mar. 6, 2012, received in international patent application No. PCT/US2009/055388, 12 pgs.

(Continued)

*Primary Examiner* — Tho G Phan
(74) *Attorney, Agent, or Firm* — Michelle Saquet Temple

(57) ABSTRACT

An RFID antenna assembly configured to be energized with a carrier signal is disclosed. The RFID antenna assembly includes an inductive component including a loop antenna assembly, at least one capacitive component coupled to the inductive component, and an eddy current trap positioned a predetermined distance from the loop antenna assembly.

19 Claims, 37 Drawing Sheets

(56) References Cited

U.S. PATENT DOCUMENTS

| | | | |
|---|---|---|---|
| 4,014,319 | A | 3/1977 | Favre |
| 4,315,523 | A | 2/1982 | Mahawili et al. |
| 4,435,680 | A * | 3/1984 | Froncisz et al. ............. 324/316 |
| 4,446,429 | A * | 5/1984 | Froncisz et al. ............. 324/316 |
| 4,613,325 | A | 9/1986 | Abrams |
| 4,725,779 | A * | 2/1988 | Hyde et al. .................... 324/318 |
| 4,941,353 | A | 7/1990 | Fukatsu et al. |
| 5,350,082 | A | 9/1994 | Kiriakides, Jr. et al. |
| 6,326,789 | B1 | 12/2001 | Yoshida |
| 6,445,271 | B1 * | 9/2002 | Johnson ........................ 336/200 |
| 6,600,882 | B1 | 7/2003 | Applegate et al. |
| 6,640,650 | B2 | 11/2003 | Matsuzawa et al. |
| 7,084,769 | B2 | 8/2006 | Bauer et al. |
| 7,232,059 | B2 | 6/2007 | Peebles |
| 8,847,840 | B1 * | 9/2014 | Diaz ............................. 343/793 |
| 2002/0060226 | A1 | 5/2002 | Kameyama |
| 2004/0261624 | A1 | 12/2004 | Lassota |
| 2005/0103799 | A1 | 5/2005 | Litterst et al. |
| 2006/0044192 | A1 | 3/2006 | Egbert |
| 2006/0055617 | A1 | 3/2006 | Hall |
| 2006/0081653 | A1 | 4/2006 | Boland et al. |
| 2006/0279465 | A1 | 12/2006 | Moon et al. |
| 2007/0152829 | A1 | 7/2007 | Lindsay et al. |
| 2007/0269681 | A1 * | 11/2007 | Aiga et al. ................. 428/692.1 |
| 2008/0008609 | A1 | 1/2008 | Pate et al. |
| 2008/0204347 | A1 | 8/2008 | Alvey et al. |
| 2009/0295659 | A1 | 12/2009 | Blumberg |

FOREIGN PATENT DOCUMENTS

| | | |
|---|---|---|
| FR | 2869707 A | 11/2005 |
| WO | WO 2005/074402 A2 | 8/2005 |
| WO | WO 2007/054900 A2 | 5/2007 |
| WO | WO 2009/033087 A1 | 3/2009 |
| WO | WO 2009/143289 A2 | 11/2009 |

OTHER PUBLICATIONS

International Preliminary Report on Patentability dated Mar. 29, 2012, received in international patent application No. PCT/US2009/055388, 7 pgs.

International Preliminary Report on Patentability and Written Opinion dated Sep. 7, 2012, received in international patent application No. PCT/US2011/026274, 9 pgs.

Mini-Circuits, "*Segmented Magnetic Antennas for Near-field UHF RFID*" Microwave Journal, http://www.mwjournal.com/article.asp?HH_ID=AR_4597; 3 pgs.

International Search Report and Written Opinion, dated Dec. 5, 2008, received in international patent application No. PCT/US2008/075480, 11 pgs.

International Search Report and Written Opinion, dated Jan. 20, 2010, received in international patent application No. PCT/US2009/044735, 18 pgs.

International Preliminary Report on Patentability, dated Mar. 18, 2010, received in international patent application No. PCT/US2008/075473, 6 pgs.

International Preliminary Report on Patentability, dated Mar. 18, 2010, received in international patent application No. PCT/US2008/075497, 8 pgs.

International Preliminary Report on Patentability and Written Opinion, dated Mar. 18, 2010, received in international patent application No. PCT/US2008/075480, 9 pgs.

International Search Report and Written Opinion dated Aug. 9, 2011, received in international patent application No. PCT/US2011/026274, 13 pgs.

* cited by examiner

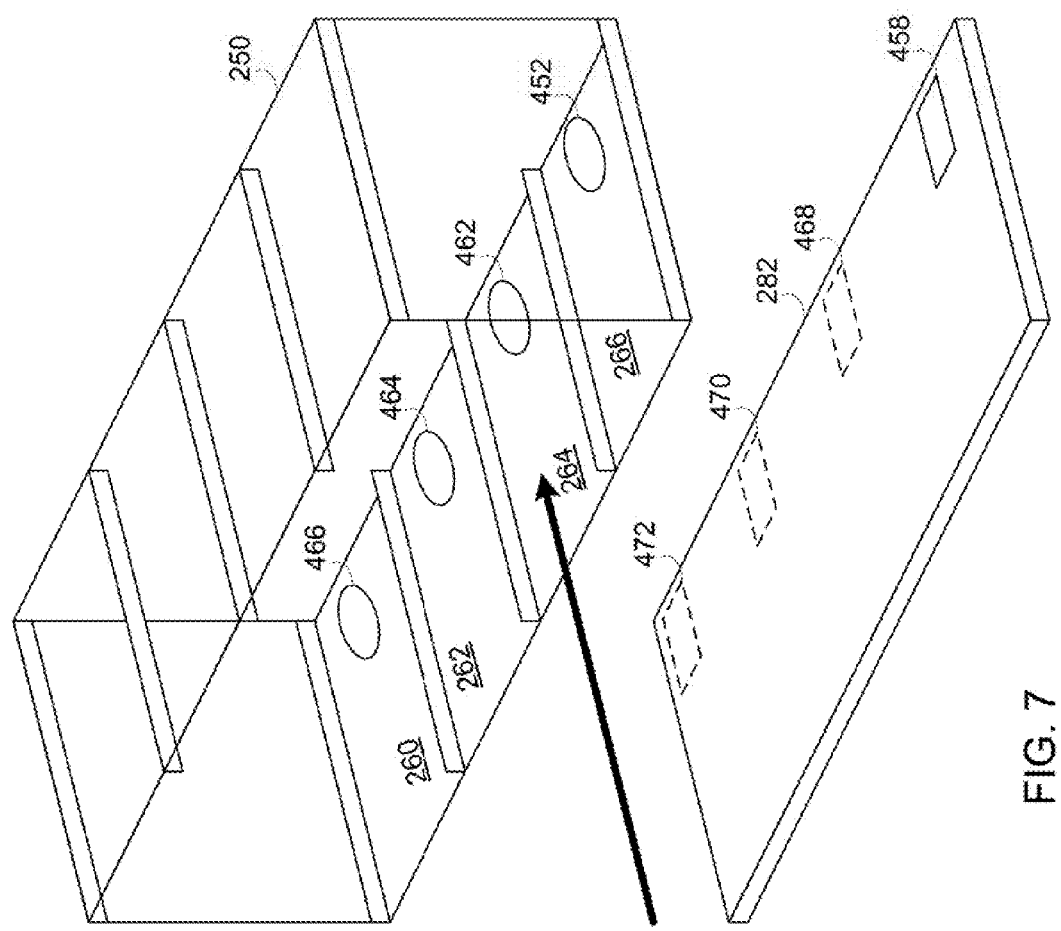
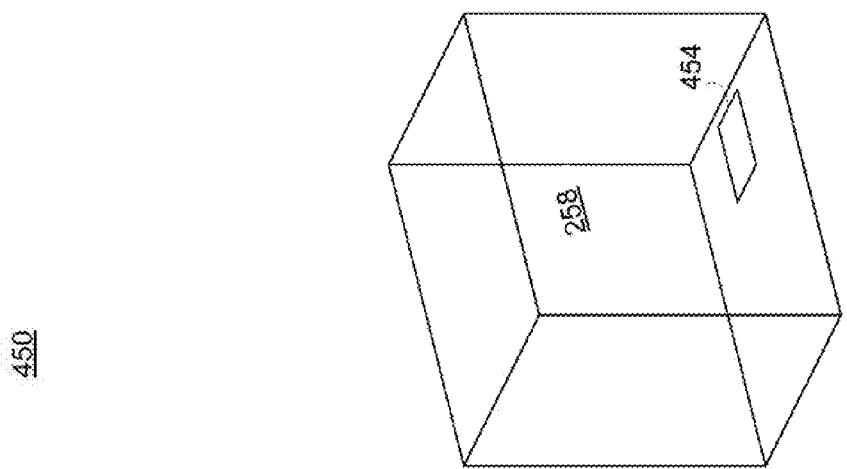
FIG. 7

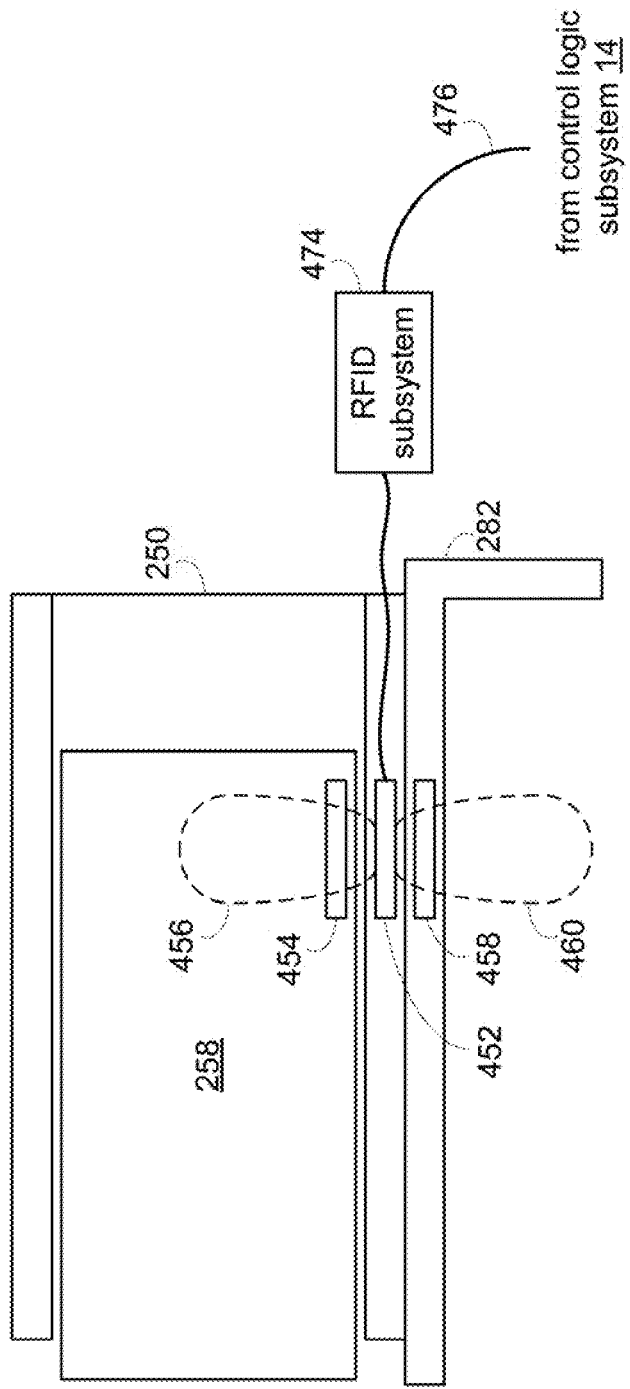

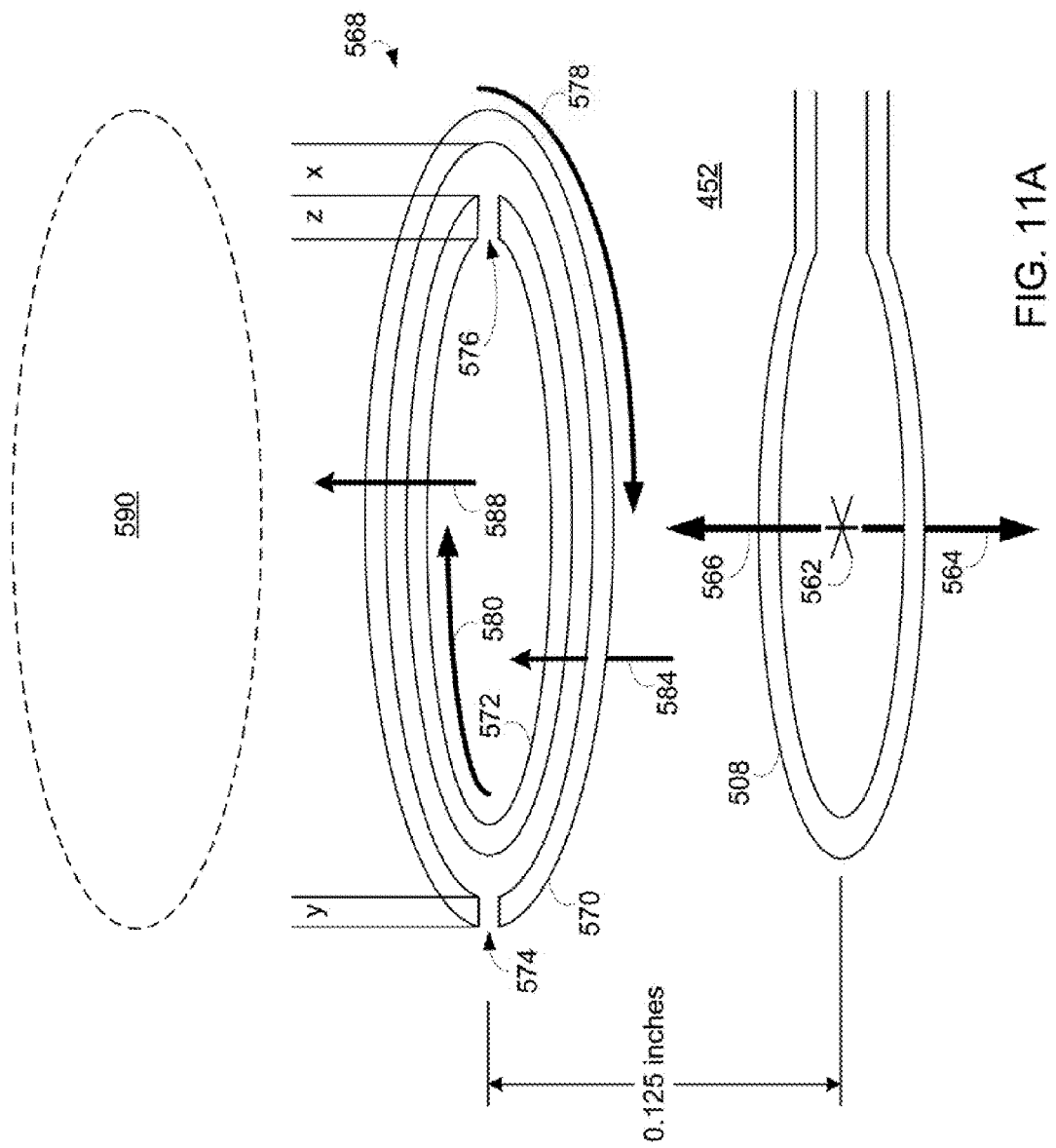

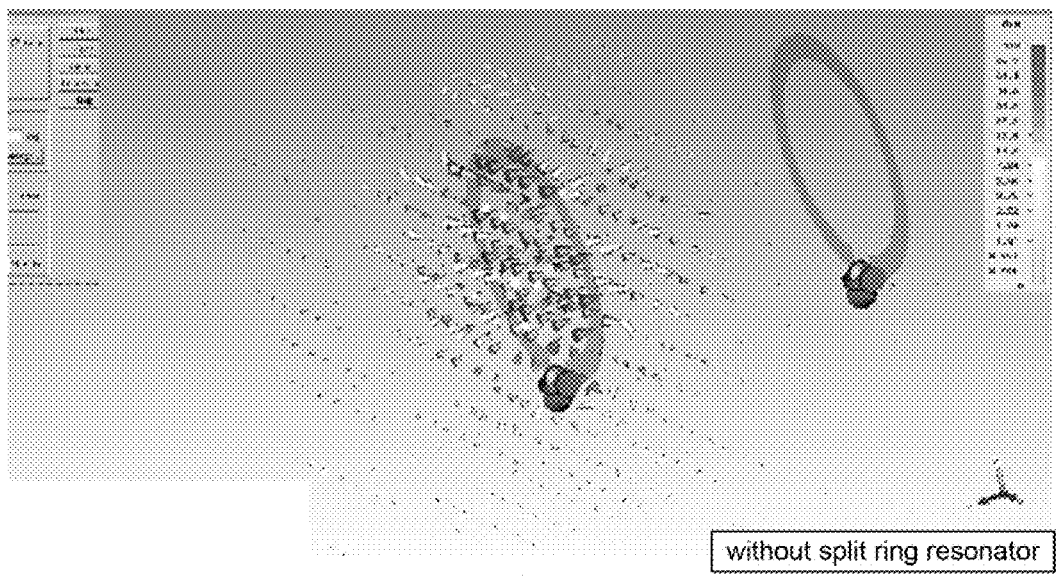
FIG. 11B1
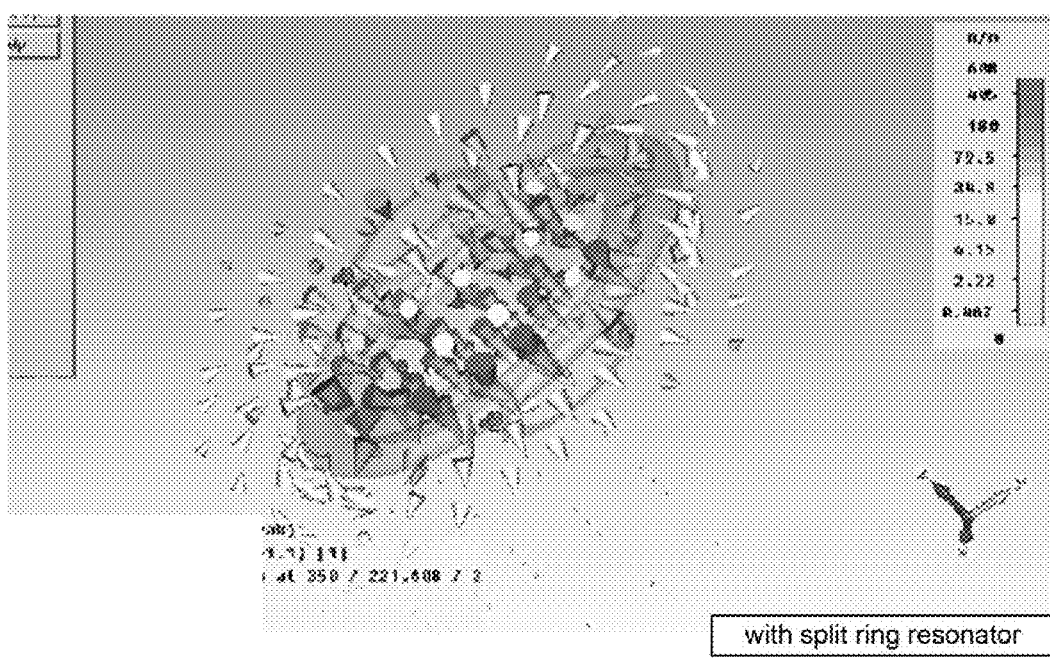
FIG. 11B2

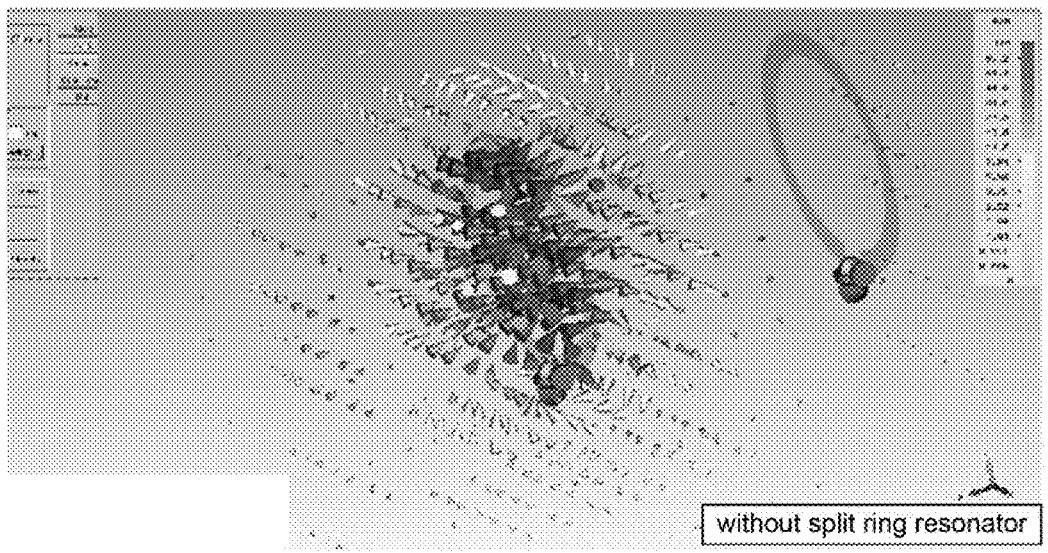
FIG. 11B3
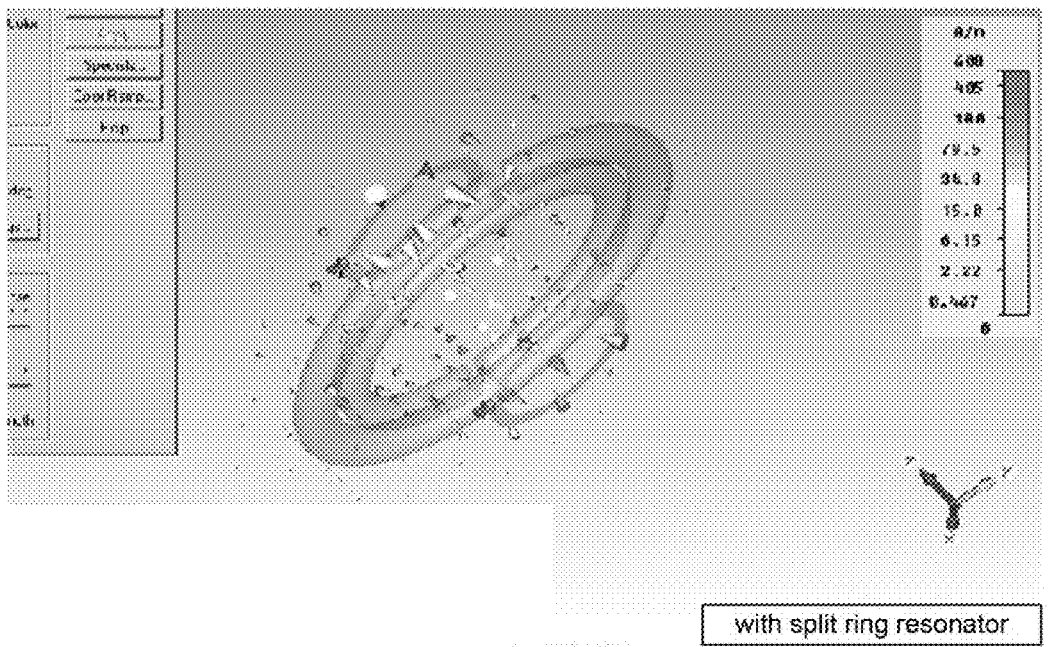
FIG. 11B4

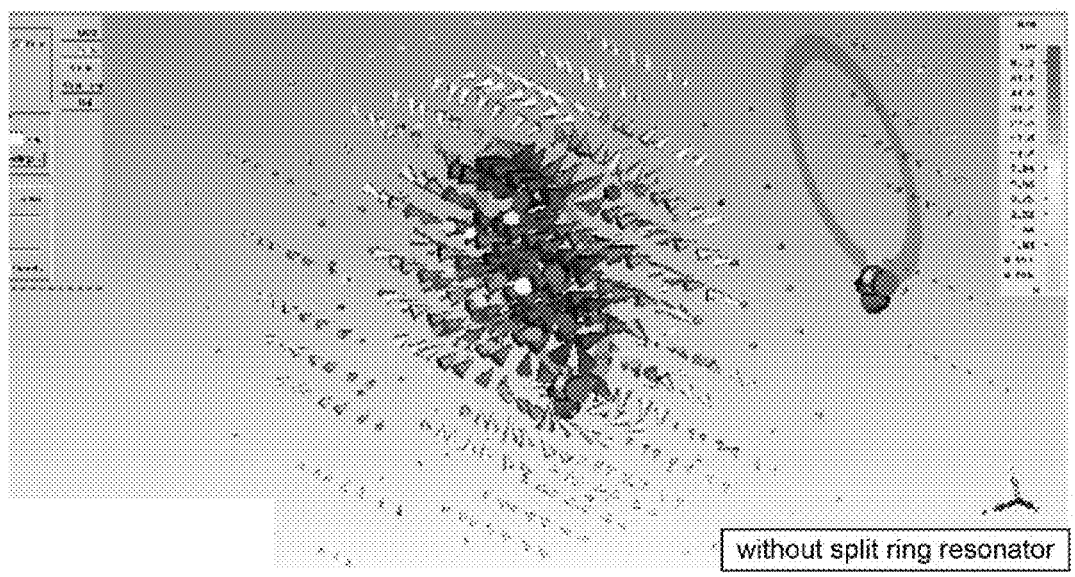
FIG. 11B5
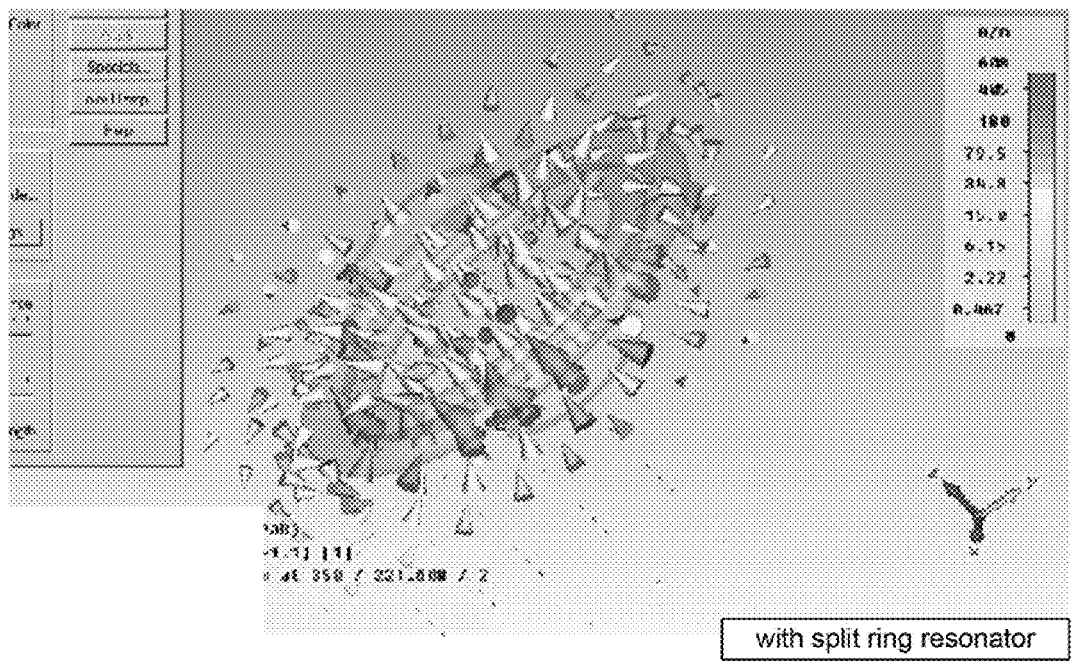
FIG. 11B6

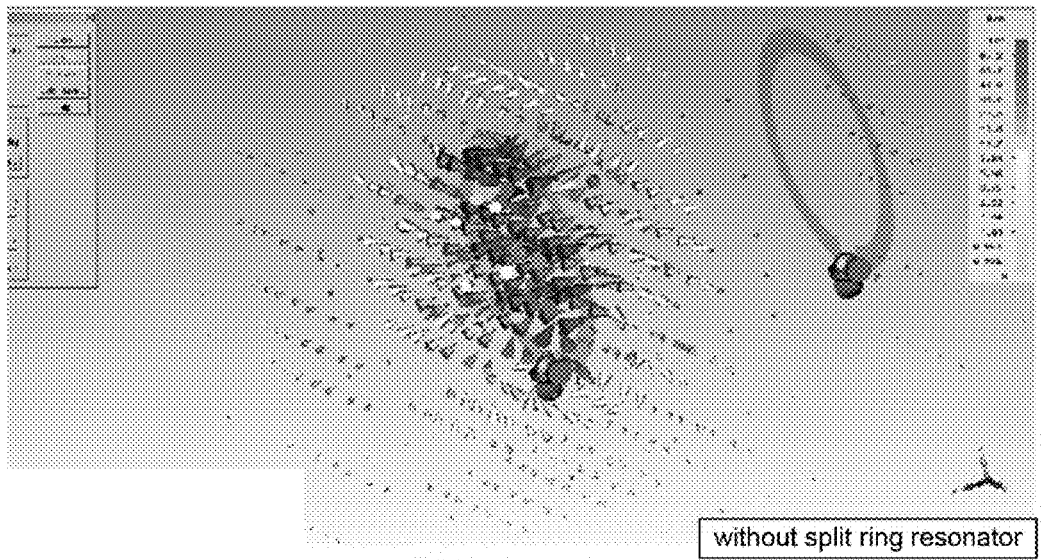
FIG. 11B7
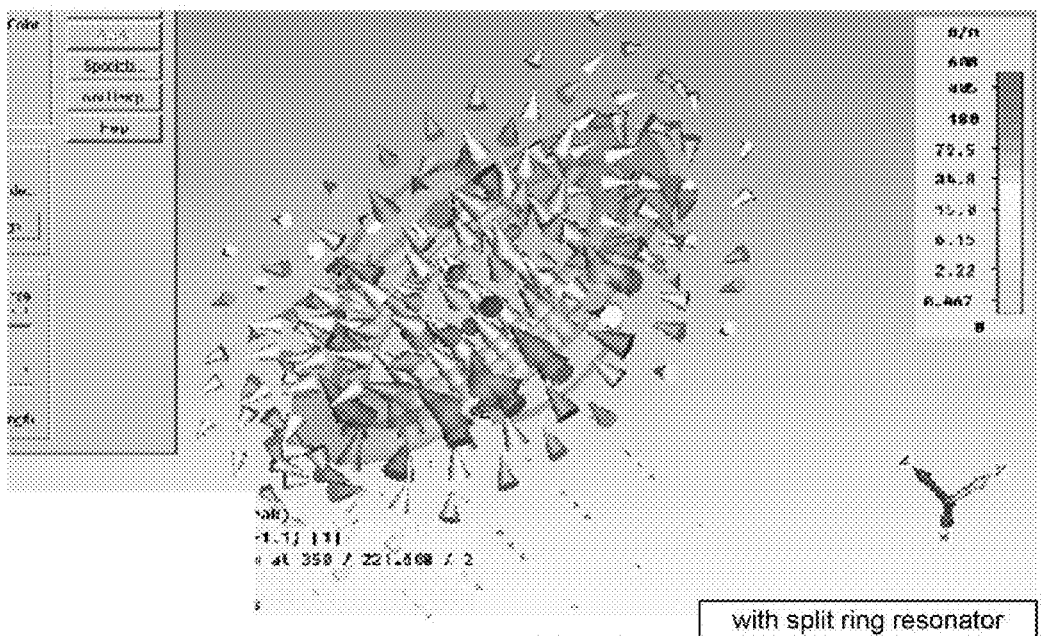
FIG. 11B8

FIG. 11B9
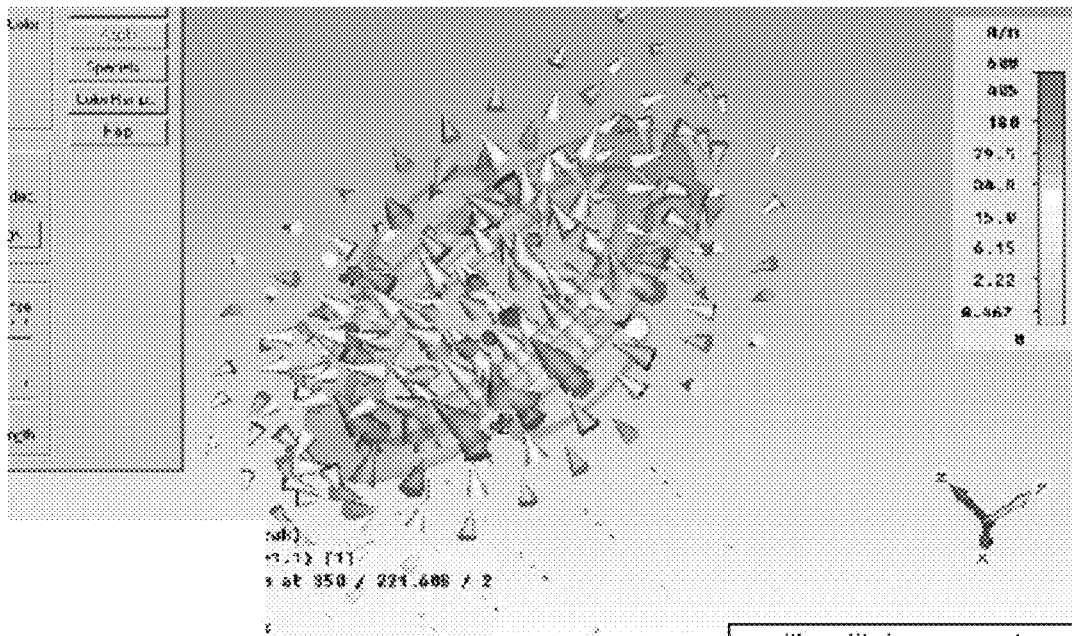
FIG. 11B10

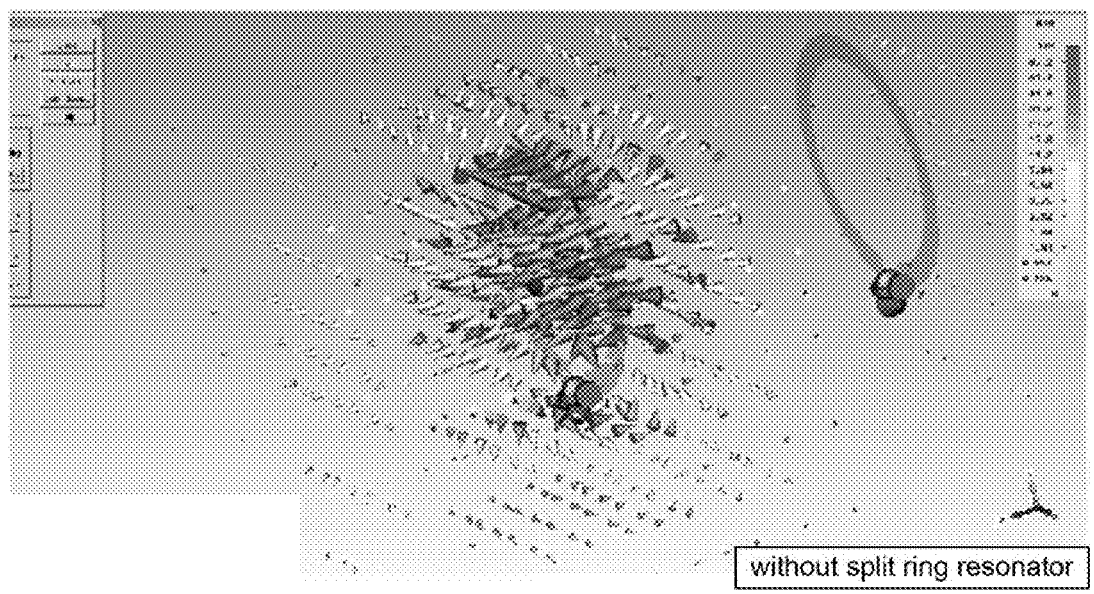
FIG. 11B11
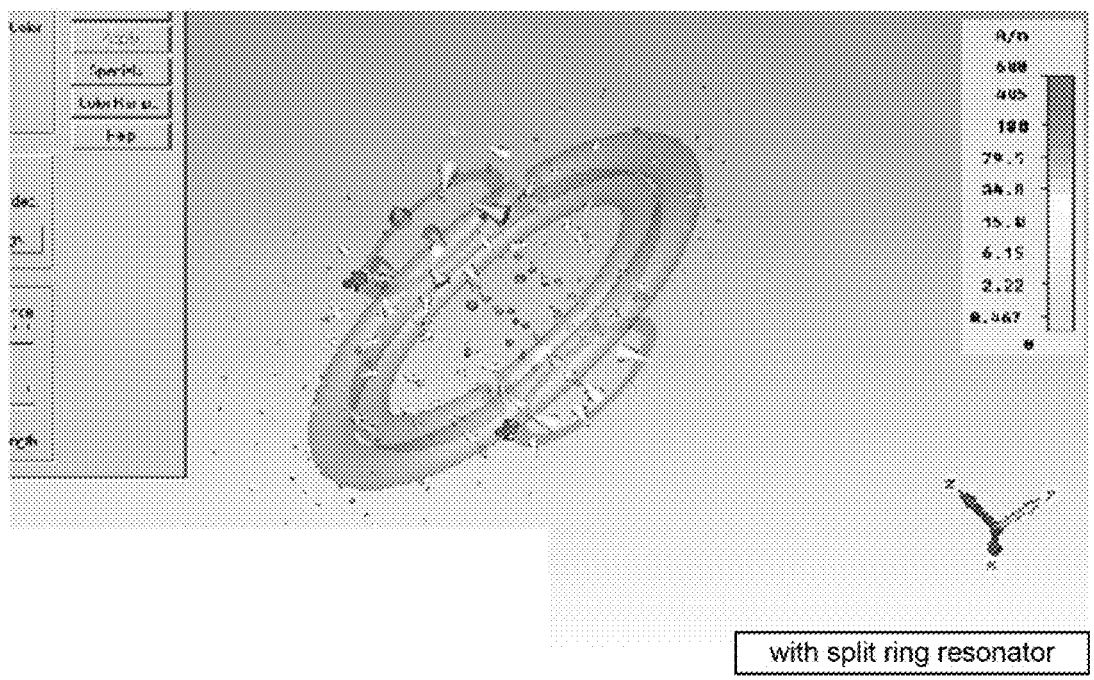
FIG. 11B12

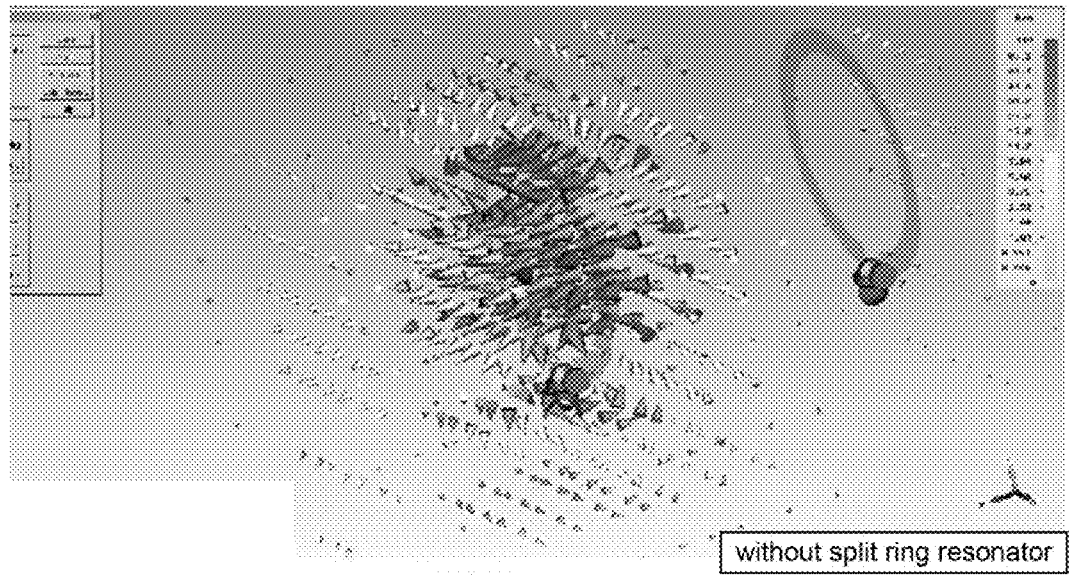
FIG. 11B13
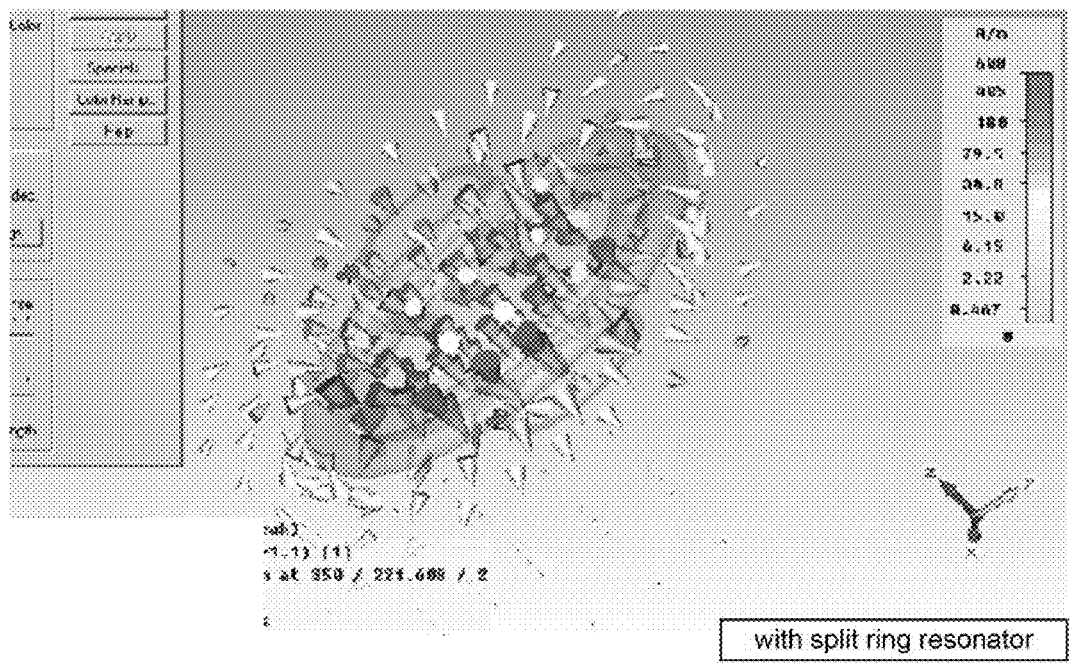
FIG. 11B14

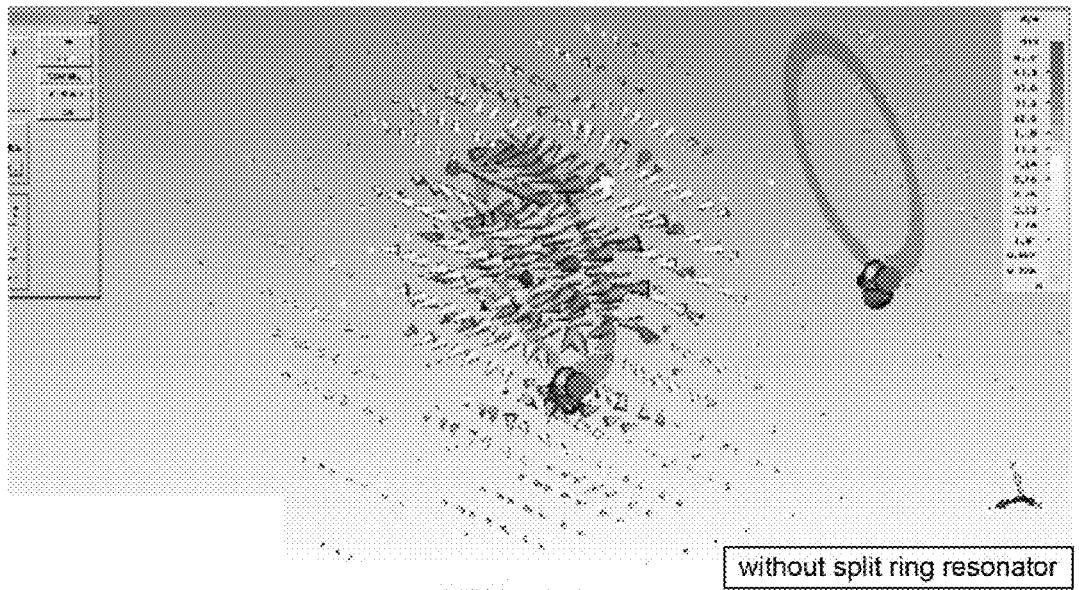
FIG. 11B15
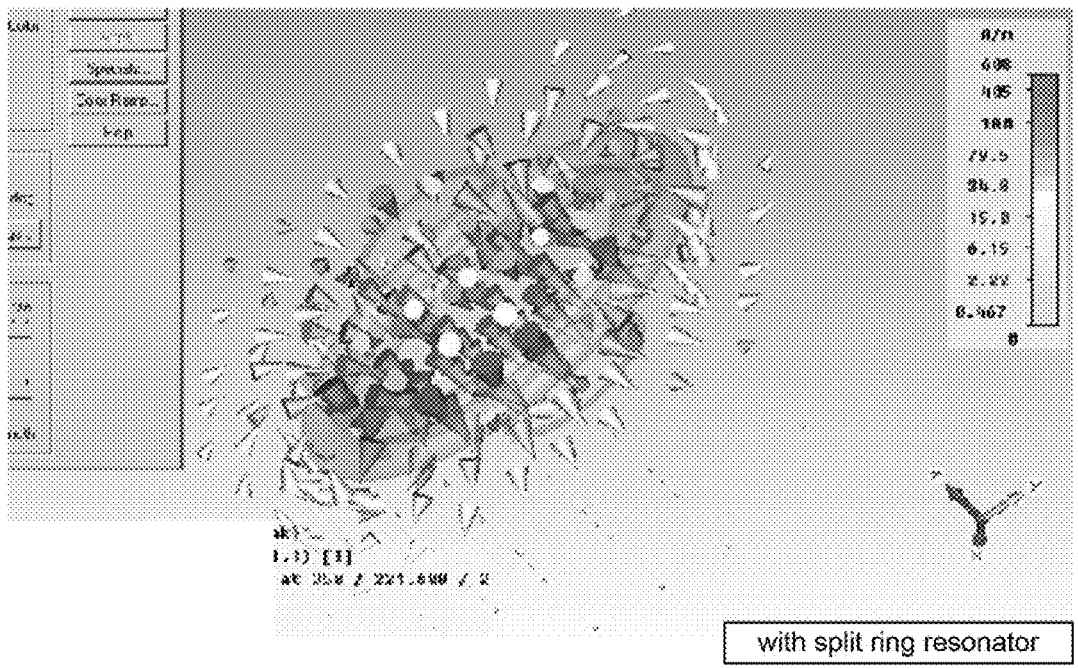
FIG. 11B16

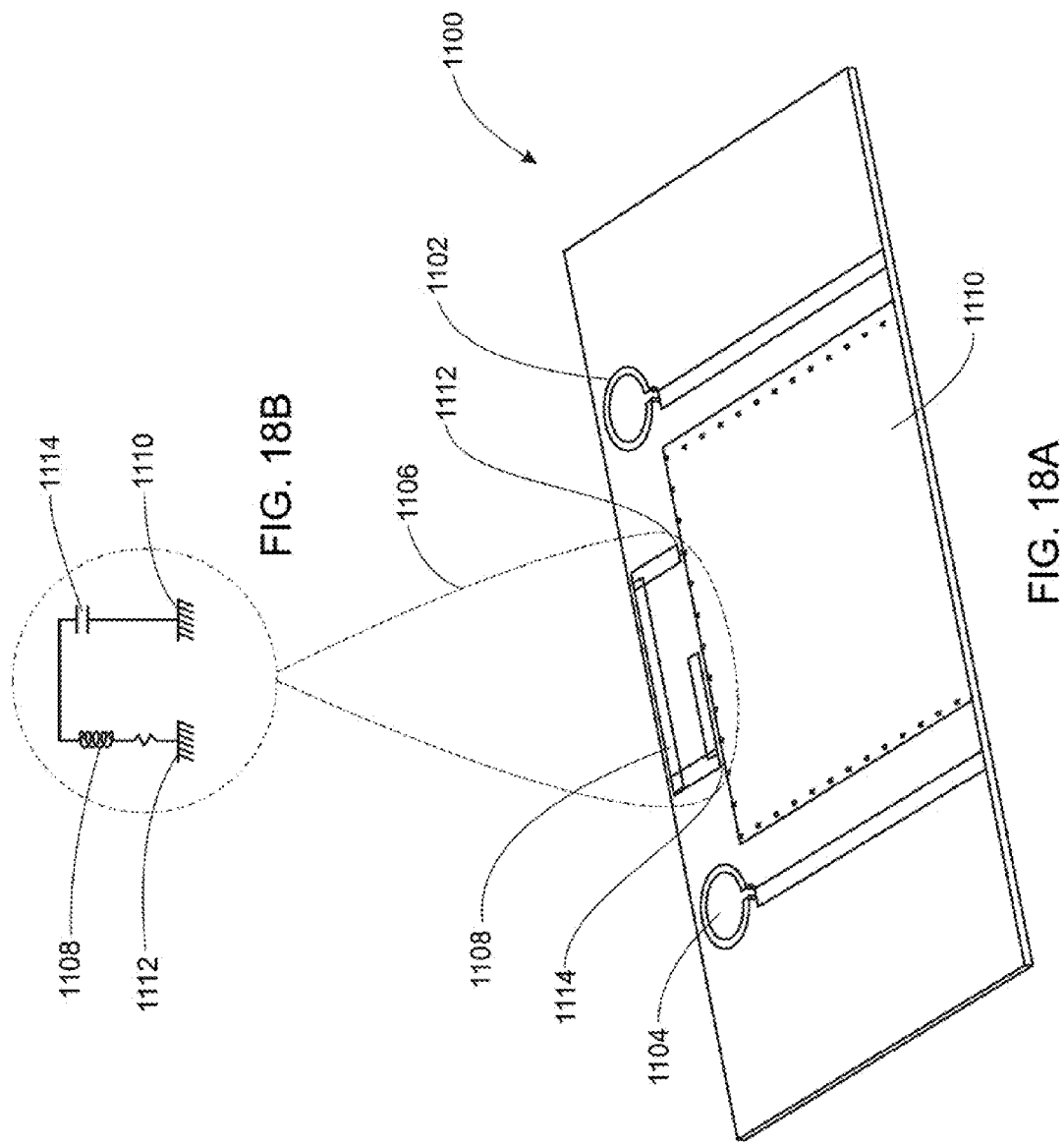

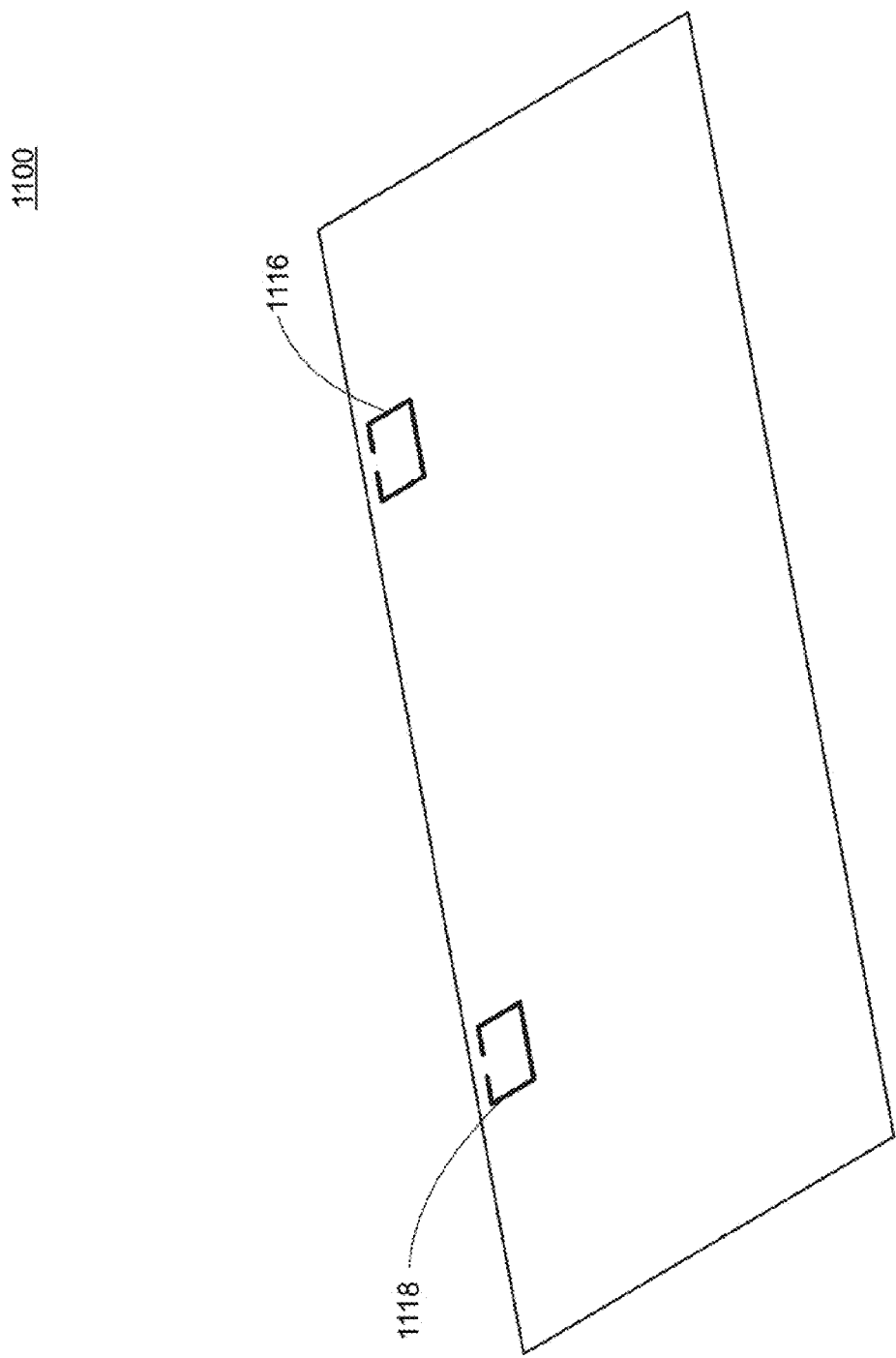

RFID SYSTEM WITH AN EDDY CURRENT TRAP

CROSS REFERENCE TO RELATED APPLICATIONS

The present application is a Non-provisional Application which claims priority from U.S. Provisional Patent Application Ser. No. 61/308,655, filed Feb. 26, 2010 and entitled RFID System With An Eddy Current Trap, which is incorporated herein by reference in its entirety.

This application is also a continuation-in-part of U.S. patent application Ser. No. 12/469,545, filed May 20, 2009, and entitled RFID System which is a continuation-in-part of U.S. patent application Ser. No. 12/205,681, filed Sep. 5, 2008, entitled RFID System and Method, which claims the benefit of U.S. Provisional Patent Application Ser. No. 61/092,396, filed Aug. 27, 2008, entitled RFID System and Method; U.S. Provisional Patent Application Ser. No. 60/970,497, filed Sep. 6, 2007, entitled RFID System and Method; and U.S. Provisional Patent Application Ser. No. 61/054,757, filed May 20, 2008, entitled RFID System and Method, all of which are herein incorporated by reference in their entireties.

U.S. patent application Ser. No. 12/469,545 also claims the benefit of U.S. Provisional Patent Application Ser. No. 61/168,364, filed Apr. 10, 2009, entitled Systems, Devices, and Methods for Communication Using Split Ring Resonators, which is herein incorporated by reference in its entirety.

TECHNICAL FIELD

This disclosure relates to an RFID system and, more particularly, to an RFID system including at least one loop antenna, at least one split ring resonator and at least one eddy current trap.

BACKGROUND

Processing systems may combine one or more ingredients to form a product. Unfortunately, such systems are often static in configuration and are only capable of generating a comparatively limited number of products. While such systems may be capable of being reconfigured to generate other products, such reconfiguration may require extensive changes to mechanical/electrical/software systems.

For example, in order to make a different product, new components may need to be added, such as e.g., new valves, lines, manifolds, and software subroutines. Such extensive modifications may be required due to existing devices/processes within the processing system being non-reconfigurable and having a single dedicated use, thus requiring that additional components be added to accomplish new tasks.

SUMMARY OF DISCLOSURE

In a first implementation, an RFID antenna assembly configured to be energized with a carrier signal. The RFID antenna assembly includes an inductive component including a loop antenna assembly, at least one capacitive component coupled to the inductive component, and an eddy current trap positioned a predetermined distance from the loop antenna assembly.

One or more of the following features may be included. The inductive component may be configured to be positioned proximate a first slot assembly to detect the presence of a first RFID tag assembly within the first slot assembly and not detect the presence of a second RFID tag assembly within a second slot assembly that is adjacent to the first slot assembly. The circumference of the loop antenna assembly may be approximately 10% of the wavelength of the carrier signal.

The at least one capacitive component may include a first capacitive component configured to couple a port on which the carrier signal is received and a ground. The at least one capacitive component may include a second capacitive component configured to couple the port on which the carrier signal is received and the inductive component.

In another implementation, an RFID antenna assembly is configured to be energized with a carrier signal. The RFID antenna assembly includes an inductive component having a loop antenna assembly. The circumference of the loop antenna assembly is no more than 25% of the wavelength of the carrier signal. At least one capacitive component is coupled to the inductive component and an eddy current trap positioned a predetermined distance from the loop antenna assembly.

One or more of the following features may be included. The inductive component may be configured to be positioned proximate a first slot assembly to detect the presence of a first RFID tag assembly within the first slot assembly and not detect the presence of a second RFID tag assembly within a second slot assembly that is adjacent to the first slot assembly. The circumference of the loop antenna assembly may be approximately 10% of the wavelength of the carrier signal.

The at least one capacitive component may include a first capacitive component configured to couple a port on which the carrier signal is received and a ground. The at least one capacitive component may include a second capacitive component configured to couple the port on which the carrier signal is received and the inductive component.

In another implementation, an RFID antenna assembly is configured to be energized with a carrier signal. The RFID antenna assembly includes an inductive component having a multi-segment loop antenna assembly. The multi-segment loop antenna assembly includes: at least a first antenna segment having at least a first phase shift element configured to reduce the phase shift of the carrier signal within the at least a first antenna segment. At least a second antenna segment includes at least a second phase shift element configured to reduce the phase shift of the carrier signal within the at least a second antenna segment. The length of each antenna segment is no more than 25% of the wavelength of the carrier signal. At least one matching component is configured to adjust the impedance of the multi-segment loop antenna assembly.

One or more of the following features may be included. The inductive component may be configured to be positioned proximate an access assembly and to allow RFID-based actuation of the access assembly. At least one of the first phase shift element and the second phase shift element may include a capacitive component. The length of each antenna segment may be approximately 10% of the wavelength of the carrier signal.

A first matching component may be configured to couple a port on which the carrier signal is received and a ground. The first matching component may include a capacitive component. A second matching component may be configured to couple the port on which the carrier signal is received and the inductive component. The second matching component may include a capacitive component.

In another implementation, a magnetic field focusing assembly includes a magnetic field generating device configured to generate a magnetic field, a split ring resonator assembly configured to be magnetically coupled to the magnetic field generating device and configured to focus at least a portion of the magnetic field produced by the magnetic field generating device and an eddy current trap positioned a predetermined distance from the magnetic field generating device.

One or more of the following features may be included. The magnetic field generating device may include an antenna assembly. The split ring resonator assembly may be constructed of a metamaterial. The split ring resonator assembly may be constructed of a non-ferrous material. The split ring resonator assembly may be configured to be generally planar and have a geometric shape.

The magnetic field generating device may be configured to be energized by a carrier signal having a defined frequency and the split ring resonator assembly may be configured to have a resonant frequency that is approximately 5-10% higher than the defined frequency of the carrier signal.

The magnetic field generating device may be configured to be energized with a carrier signal and may include an inductive component including a loop antenna assembly. The circumference of the loop antenna assembly may be no more than 25% of the wavelength of the carrier signal. At least one capacitive component may be coupled to the inductive component.

The inductive component may be configured to be positioned proximate a first slot assembly to detect the presence of a first RFID tag assembly within the first slot assembly and not detect the presence of a second RFID tag assembly within a second slot assembly that is adjacent to the first slot assembly. The circumference of the loop antenna assembly may be approximately 10% of the wavelength of the carrier signal. The at least one capacitive component may include a first capacitive component configured to couple a port on which the carrier signal is received and a ground. The at least one capacitive component may include a second capacitive component configured to couple the port on which the carrier signal is received and the inductive component.

The magnetic field generating device may be configured to be energized with a carrier signal and may include an inductive component including a multi-segment loop antenna assembly. The multi-segment loop antenna assembly may include at least a first antenna segment including at least a first phase shift element configured to reduce the phase shift of the carrier signal within the at least a first antenna segment. At least a second antenna segment may include at least a second phase shift element configured to reduce the phase shift of the carrier signal within the at least a second antenna segment. The length of each antenna segment may be no more than 25% of the wavelength of the carrier signal. At least one matching component may be configured to adjust the impedance of the multi-segment loop antenna assembly.

The inductive component may be configured to be positioned proximate an access assembly and to allow RFID-based actuation of the access assembly. At least one of the first phase shift element and the second phase shift element may include a capacitive component. The length of each antenna segment may be approximately 10% of the wavelength of the carrier signal. A first matching component may be configured to couple a port on which the carrier signal is received and a ground. The first matching component may include a capacitive component. A second matching component may be configured to couple the port on which the carrier signal is received and the inductive component. The second matching component may include a capacitive component.

In another implementation, an RFID antenna assembly is configured to be energized with a carrier signal. The RFID antenna assembly includes an inductive component having a multi-segment loop antenna assembly. The multi-segment loop antenna assembly includes at least a first antenna segment having at least a first phase shift element configured to reduce the phase shift of the carrier signal within the at least a first antenna segment. At least a second antenna segment includes at least a second phase shift element configured to reduce the phase shift of the carrier signal within the at least a second antenna segment. The RFID antenna assembly includes at least one far field antenna assembly. The length of each antenna segment is no more than 25% of the wavelength of the carrier signal. At least one matching component is configured to adjust the impedance of the multi-segment loop antenna assembly. The assembly also includes an eddy current trap positioned a predetermined distance from the multi-segment loop antenna assembly.

One or more of the following features may be included. The inductive component may be configured to be positioned proximate an access assembly of a processing system and to allow RFID-based actuation of the access assembly. The far field antenna assembly may be a dipole antenna assembly. The far field antenna assembly may include a first antenna portion and a second antenna portion. The sum length of the first antenna portion and the second antenna portion may be greater than 25% of the wavelength of the carrier signal.

These aspects of the invention are not meant to be exclusive and other features, aspects, and advantages of the present invention will be readily apparent to those of ordinary skill in the art when read in conjunction with the appended claims and accompanying drawings. The details of one or more implementations are set forth in the accompanying drawings and the description below. Other features and advantages will become apparent from the description, the drawings and the claims.

BRIEF DESCRIPTION OF THE DRAWINGS

These and other features and advantages of the present invention will be better understood by reading the following detailed description, taken together with the drawings wherein

FIG. 7 is an isometric view of one embodiment of an RFID system included within the processing system of FIG. 1;

FIG. 8A is a diagrammatic view of one embodiment of the RFID system of FIG. 7;

FIG. 11A is an isometric view of one embodiment of a split ring resonator for use with the antenna loop assembly of FIG. 10;

FIGS. 11B1-11B16 are various flux plot diagrams illustrative of the lines of magnetic flux produced an inductive loop assembly without and with a split ring resonator assembly at various phase angles of a carrier signal;

FIG. 18A is a diagrammatic view of one embodiment of a current trap and antenna assembly;

FIG. 18B is a diagrammatic view of the Eddy Current Trap shown in FIG. 18A;

FIG. 19 is a diagrammatic view of one embodiment of split ring resonators on a board;

Like reference symbols in the various drawings indicate like elements.

DETAILED DESCRIPTION OF EXEMPLARY EMBODIMENTS

Figure 1:
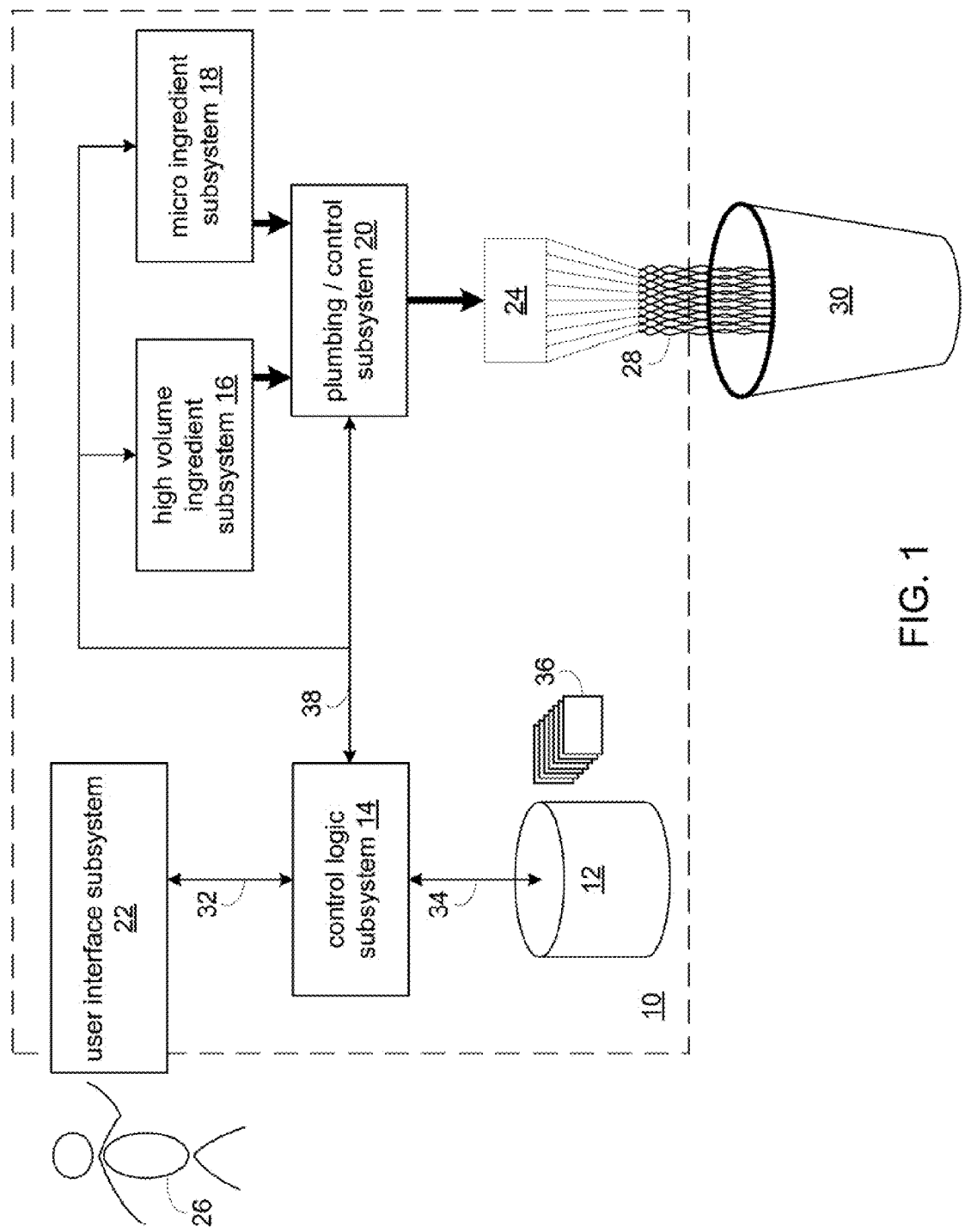
FIG. 1 is a diagrammatic view of one embodiment of a processing system.

Described herein is a product dispensing system. The system includes one or more modular components, also termed "subsystems". Although exemplary systems are described herein, in various embodiments, the product dispensing system may include one or more of the subsystems described, but the product dispensing system is not limited to only one or more of the subsystems described herein. Thus, in some embodiments, additional subsystems may be used in the product dispensing system.

The following disclosure will discuss the interaction and cooperation of various electrical components, mechanical components, electro-mechanical components, and software processes (i.e., "subsystems") that allow for the mixing and processing of various ingredients to form a product. Examples of such products may include but are not limited to: dairy-based products (e.g., milkshakes, floats, malts, frappes); coffee-based products (e.g., coffee, cappuccino, espresso); soda-based products (e.g., floats, soda w/fruit juice); tea-based products e.g., iced tea, sweet tea, hot tea); water-based products (e.g., spring water, flavored spring water, spring water w/vitamins, high-electrolyte drinks, high-carbohydrate drinks); solid-based products (e.g., trail mix, granola-based products, mixed nuts, cereal products, mixed grain products); medicinal products (e.g., infusible medicants, injectable medicants, ingestible medicants, dialysates); alcohol-based products (e.g., mixed drinks, wine spritzers, soda-based alcoholic drinks, water-based alcoholic drinks, beer with flavor "shots"); industrial products (e.g., solvents, paints, lubricants, stains); and health/beauty aid products (e.g., shampoos, cosmetics, soaps, hair conditioners, skin treatments, topical ointments).

The products may be produced using one or more "ingredients". Ingredients may include one or more fluids, powders, solids or gases. The fluids, powders, solids, and/or gases may be reconstituted or diluted within the context of processing and dispensing. The products may be a fluid, solid, powder or gas.

The various ingredients may be referred to as "macroingredients", "microingredients", or "large volume microingredients". One or more of the ingredients used may be contained within a housing, i.e., part of a product dispensing machine. However, one or more of the ingredients may be stored or produced outside the machine. For example, in some embodiments, water (in various qualities) or other ingredients used in high volume may be stored outside of the machine (for example, in some embodiments, high fructose corn syrup may be stored outside the machine), while other ingredients, for example, ingredients in powder form, concentrated ingredients, nutraceuticals, pharmaceuticals and/or gas cylinders may be stored within the machine itself.

Various combinations of the above-referenced electrical components, mechanical components, electro-mechanical components, and software processes are discussed below. While combinations are described below that disclose e.g., the production of beverages and medicinal products dialysates) using various subsystems, this is not intended to be a limitation of this disclosure, rather, exemplary embodiments of ways in which the subsystems may work together to create/dispense a product. Specifically, the electrical components, mechanical components, electromechanical components, and software processes (each of which will be discussed below in greater detail) may be used to produce any of the above-referenced products or any other products similar thereto.

Referring to FIG. 1, there is shown a generalized-view of processing system 10 that is shown to include a plurality of subsystems namely: storage subsystem 12, control logic subsystem 14, high volume ingredient subsystem 16, microingredient subsystem 18, plumbing/control subsystem 20, user interface subsystem 22, and nozzle 24. Each of the above describes subsystems 12, 14, 16, 18, 20, 22 will be described below in greater detail.

During use of processing system 10, user 26 may select a particular product 28 for dispensing (into container 30) using user interface subsystem 22. Via user interface subsystem 22, user 26 may select one or more options for inclusion within such product. For example, options may include but are not limited to the addition of one or more ingredients in one exemplary embodiment, the system is a system for dispensing a beverage. In this embodiment, the use may select various flavorings (e.g. including but not limited to lemon flavoring, lime flavoring, chocolate flavoring, and vanilla flavoring) into a beverage; the addition of one or more nutraceuticals (e.g. including but not limited to Vitamin A, Vitamin C, Vitamin D, Vitamin E, Vitamin $B_6$, Vitamin $Bi_2$, and Zinc) into a beverage; the addition of one or more other beverages (e.g. including but not limited to coffee, milk, lemonade, and iced tea) into a beverage; and the addition of one or more food products (e.g. ice cream, yogurt) into a beverage.

Once user 26 makes the appropriate selections, via user interface subsystem 22, user interface subsystem 22 may send the appropriate data signals (via data bus 32) to control logic subsystem 14. Control logic subsystem 14 may process these data signals and may retrieve (via data bus 34) one or more recipes chosen from plurality of recipes 36 maintained on storage subsystem 12. The term "recipe" refers to instructions for processing/creating the requested product. Upon retrieving the recipe(s) from storage subsystem 12, control logic subsystem 14 may process the recipe(s) and provide the appropriate control signals (via data bus 38) to e.g. high volume ingredient subsystem 16 microingredient subsystem 18 (and, in some embodiments, large volume microingredients, not shown, which may be included in the description with respect to microingredients with respect to processing. With respect to the subsystems for dispensing these large volume microingredients, in some embodiments, an alternate assembly from the microingredient assembly, may be used to dispense these large volume microingredients, and plumbing/control subsystem 20, resulting in the production of product 28 (which is dispensed into container 30).

Figure 2:
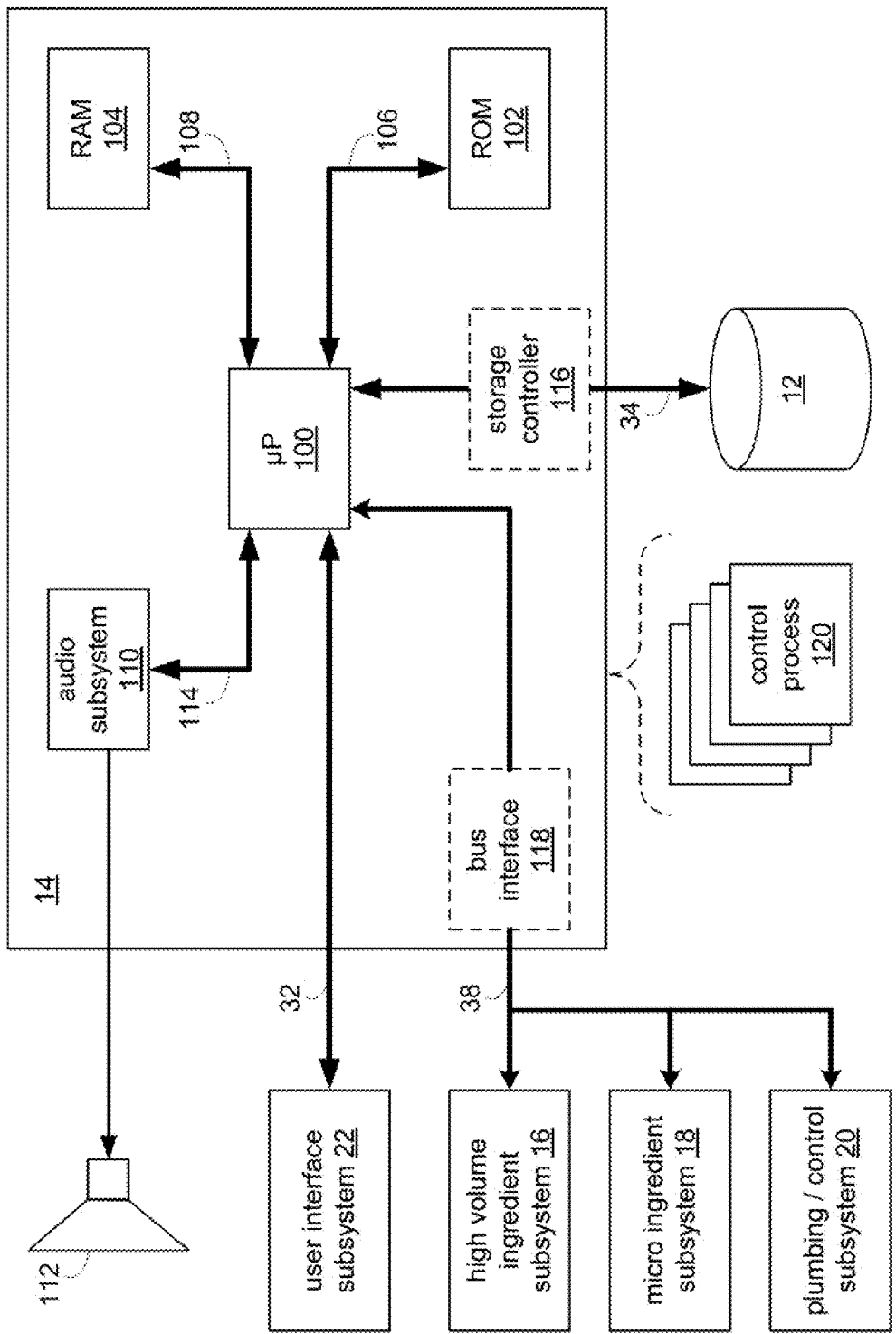
FIG. 2 is a diagrammatic view of one embodiment of a control logic subsystem included within the processing system of FIG. 1.

Referring also to FIG. 2, a diagrammatic view of control logic subsystem 14 is shown. Control logic subsystem 14 may include microprocessor 100 (e.g., an ARM microprocessor produced by Intel Corporation of Santa Clara, Calif.), non-volatile memory (e.g. read only memory 102), and volatile memory (e.g. random access memory 104); each of which may be interconnected via one or more data/system buses 106, 108. As discussed above, user interface subsystem 22 may be coupled to control logic subsystem 14 via data bus 32.

Control logic subsystem 14 may also include an audio subsystem 110 for providing e.g. an analog audio signal to speaker 112, which may be incorporated into processing system 10. Audio subsystem 110 may be coupled to microprocessor 100 via data/system bus 114.

Control logic subsystem 14 may execute an operating system, examples of which may include but are not limited to Microsoft Windows CE™, Redhat Linux™, Palm OS™, or a device-specific (i.e., custom) operating system.

The instruction sets and subroutines of the above-described operating system, which may be stored on storage subsystem 12, may be executed by one or more processors (e.g. microprocessor 100) and one or more memory architectures (e.g. readonly memory 102 and/or random access memory 104) incorporated into control logic subsystem 14.

Storage subsystem 12 may include, for example, a hard disk drive, an optical drive, a random access memory (RAM), a read-only memory (ROM), a CF (i.e., compact flash) card, an SD (i.e., secure digital) a SmartMedia card, a Memory Stick, and a MultiMedia card, for example.

As discussed above, storage subsystem 12 may be coupled to control logic subsystem 14 via data bus 34. Control logic subsystem 14 may also include storage controller 116 (shown in phantom) for converting signals provided by microprocessor 100 into a format usable by storage system 12. Further, storage controller 116 may convert signals provided by storage subsystem 12 into a format usable by microprocessor 100. In some embodiments, an Ethernet connection may also be included.

As discussed above, high-volume ingredient subsystem 16 (also referred to herein as "macroingredients"), microingredient subsystem 18 and/or plumbing/control subsystem 20 may be coupled to control logic subsystem 14 via data bus 38. Control logic subsystem 14 may include bus interface 118 (shown in phantom) for converting signals provided by microprocessor 100 into a format usable by high-volume ingredient subsystem 16, microingredient subsystem 18 and/or plumbing/control subsystem 20. Further, bus interface 118 may convert signals provided by high-volume ingredient subsystem 16, microingredient subsystem 18 and/or plumbing/control subsystem 20 into a format usable by microprocessor 100.

As will be discussed below in greater detail, control logic subsystem 14 may execute one or more control processes 120 that may control the operation of processing system 10. The instruction sets and subroutines of control processes 120, which may be stored on storage subsystem 12, may be executed by one or more processors (e.g. microprocessor 100) and one or more memory architectures (e.g. read-only memory 102 and/or random access memory 104) incorporated into control logic subsystem 14.

Figure 3:
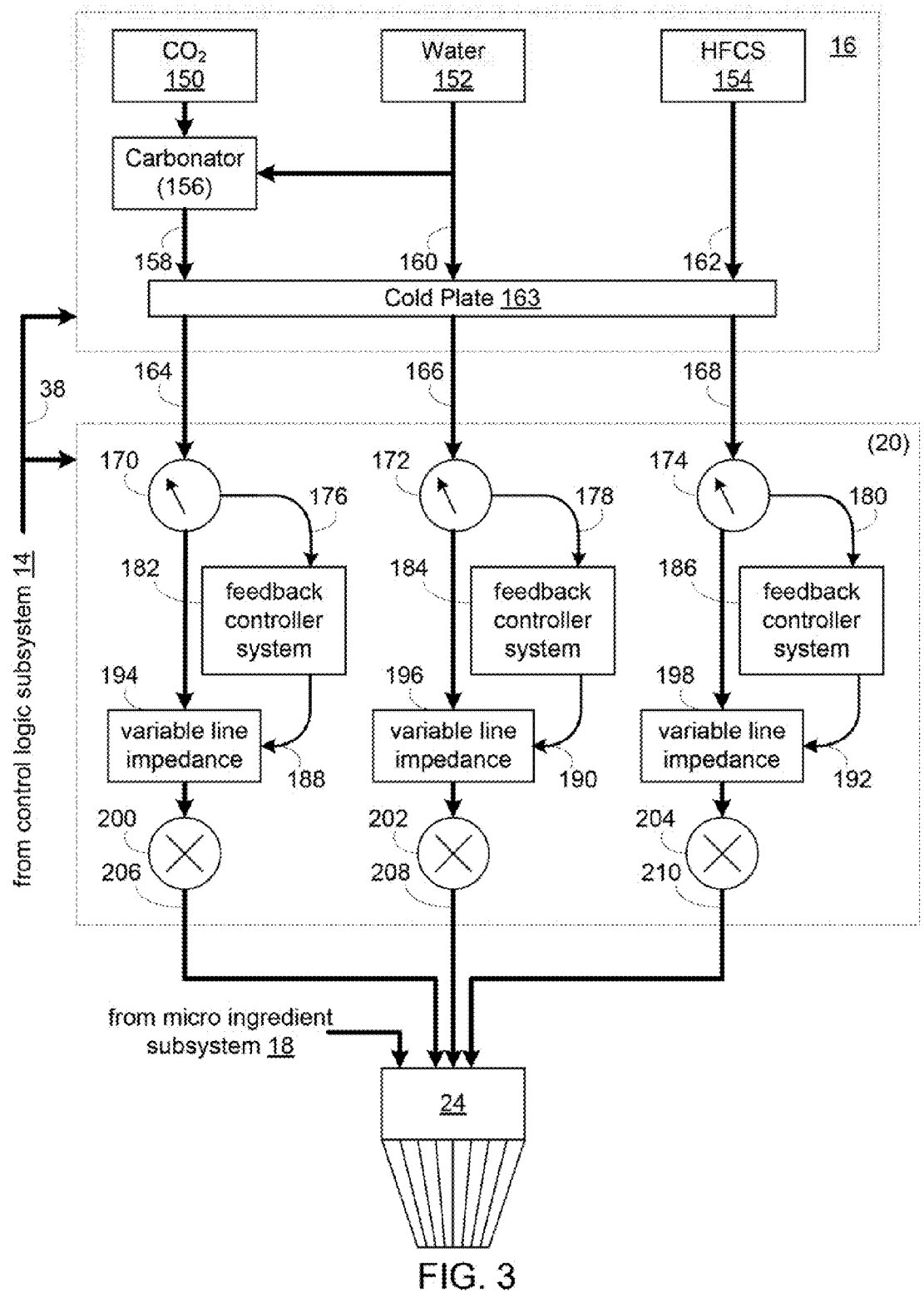
FIG. 3 is a diagrammatic view of one embodiment of a high volume ingredient subsystem included within the processing system of FIG. 1.

Referring also to FIG. 3, a diagrammatic view of high-volume ingredient subsystem 16 and plumbing/control subsystem 20 are shown. High-volume ingredient subsystem 16 may include containers for housing consumables that are used at a rapid rate when making product 28. For example, high-volume ingredient subsystem 16 may include carbon dioxide supply 150, water supply 152, and high fructose corn syrup supply 154. The high-volume ingredients, in some embodiments, may be located within close proximity to the other subsystems. An example of carbon dioxide supply 150 may include but is not limited to a tank (not shown) of compressed, gaseous carbon dioxide. An example of water supply 152 may include but is not limited to a municipal water supply (not shown), a distilled water supply, a filtered water supply, a reverse-osmosis ("RO") water supply, or other desired water supply. An example of high fructose corn syrup supply 154 may include but is not limited to one or more tank(s) (not shown) of highly-concentrated, high fructose corn syrup, or one or more bag-in-box packages of high-fructose corn syrup.

High-volume, ingredient subsystem 16 may include a carbonator 156 for generating carbonated water from carbon dioxide gas (provided by carbon dioxide supply 150) and water (provided by water supply 152). Carbonated water 158, water 160 and high fructose corn syrup 162 may be provided to cold plate assembly 163 e.g., in embodiments where a product is being dispensed in which it may be desired to be cooled. In some embodiments, the cold plate assembly may not be included as part of the dispensing systems or may be bypassed. Cold plate assembly 163 may be designed to chill carbonated water 158, water 160, and high fructose corn syrup 162 down to a desired serving temperature (e.g. 40° F.).

While a single cold plate assembly 163 is shown to chill carbonated water 158, water 160, and high fructose corn syrup 162, this is for illustrative purposes only and is not intended to be a limitation of disclosure, as other configurations are possible. For example, an individual cold plate assembly may be used to chill each of carbonated water 158, water 160 and high fructose corn syrup 162. Once chilled, chilled carbonated water 164, chilled water 166, and chilled high fructose corn syrup 168 may be provided to plumbing/ control subsystem 20. And in still other embodiments, a cold plate may not be included. In some embodiments, at least one hot plate may be included.

Although the plumbing is depicted as having the order shown, in some embodiments, this order is not used. For example, the flow control modules described herein may be configured in a different order, i.e., flow measuring device, binary valve and then variable line impendence.

For descriptive purposes, the system will be described below with reference to using the system to dispense soft drinks as a product, i.e., the macroingredients/high-volume ingredients described will include high-fructose corn syrup, carbonated water and water. However, in other embodiments of the dispensing system, the macroingredients themselves, and the number of macroingredients, may vary.

For illustrative purposes, plumbing/control subsystem 20 is shown to include three flow measuring devices 170, 172, 174, which measure the volume of chilled carbonated water 164, chilled water 166 and chilled high fructose corn syrup 168 (respectively). Flow measuring devices 170, 172, 174 may provide feedback signals 176, 178, 180 (respectively) to feedback controller systems 182, 184, 186 (respectively).

Feedback controller systems 182, 184, 186 (which will be discussed below in greater detail) may compare flow feedback signals 176, 178, 180 to the desired flow volume (as defined for each of chilled carbonated water 164, chilled water 166 and chilled high fructose corn syrup 168; respectively). Upon processing flow feedback signals 176, 178, 180, feedback controller systems 182, 184, 186 (respectively) may generate flow control signals 188, 190, 192 (respectively) that may be provided to variable line impedances 194, 196, 198 (respectively). An example of variable line impedance 194, 196, 198 is disclosed and claimed in U.S. Pat. No. 5,755,683 (which is herein incorporated by reference in its entirety) and U.S. Publication No. 2007/00850.49 (which is herein incorporated by reference in its entirety). Variable line impedances 194, 196, 198 may regulate the flow of chilled carbonated water 164, chilled water 166 and chilled high fructose corn syrup 168 passing through lines 206, 208, 210 (respectively), which are provided to nozzle 24 and (subsequently) container 30. However, additional embodiments of the variable line impedances are described herein.

Lines 206, 208, 210 may additionally include solenoid valves 200, 202, 204 (respectively) for preventing the flow of fluid through lines 206, 208, 210 during times when fluid flow is not desired/required (e.g. during shipping, maintenance procedures, and downtime).

As discussed above, FIG. 3 merely provides an illustrative view of plumbing control subsystem 20. Accordingly, the manner in which plumbing/control subsystem 20 is illustrated is not intended to be a limitation of this disclosure, as other configurations are possible. For example, some or all of the functionality of feedback controller systems 182, 184, 186 may be incorporated into control logic subsystem 14.

Figure 4:
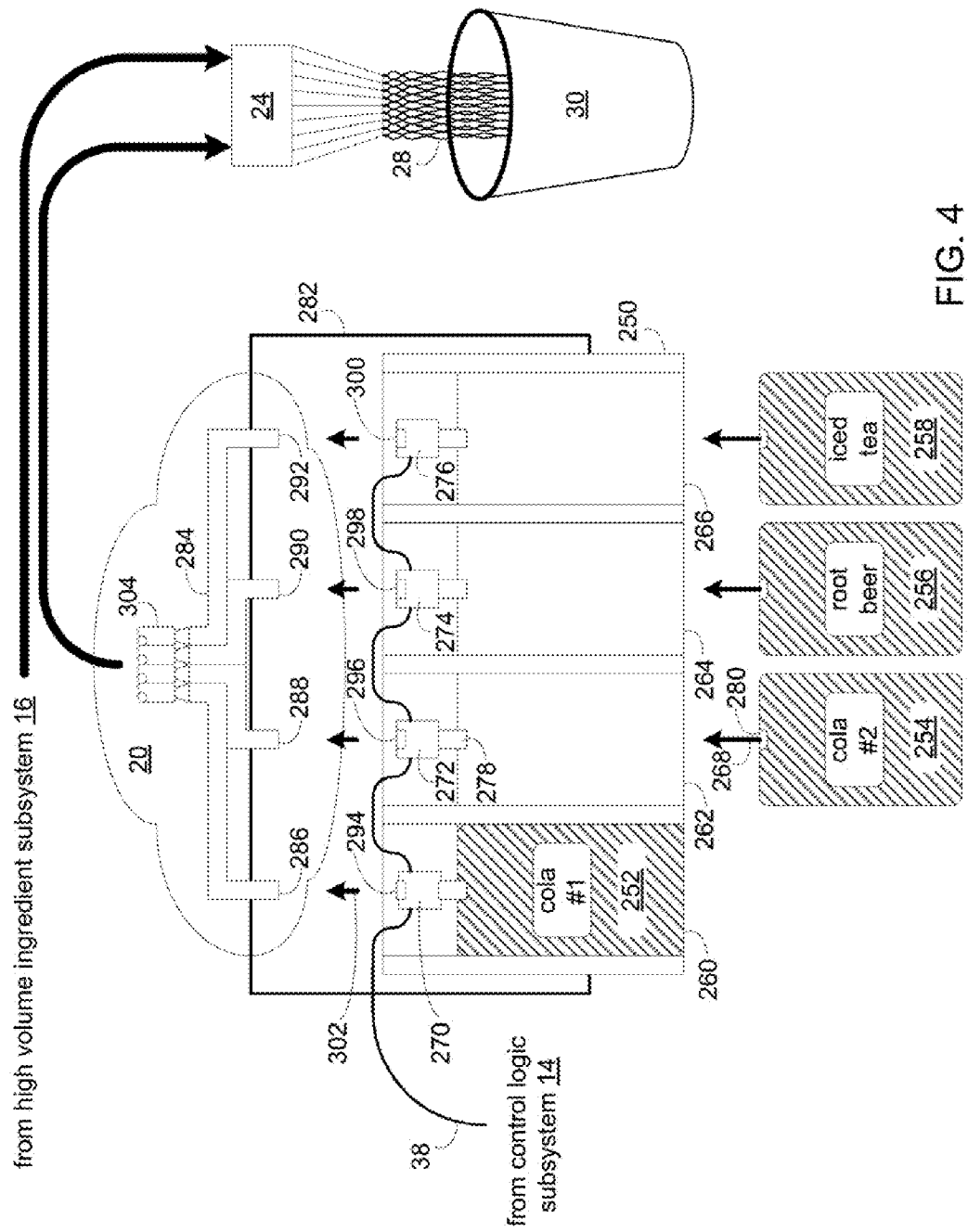
FIG. 4 is a diagrammatic view of one embodiment of a micro ingredient subsystem included within the processing system of FIG. 1.

Referring also to FIG. 4, a diagrammatic top-view of microingredient subsystem 18 and plumbing/control subsystem 20 is shown. Microingredient subsystem 18 may include product module assembly 250, which may be configured to releasably engage one or more product containers 252, 254, 256, 258, which may be configured to hold microingredients for use when making product 28. The microingredients may be substrates that may be used in making the product Examples of such micro ingredients/substrates may include hut are not limited to a first portion of a soft drink flavoring, a second portion of a soft drink flavoring, coffee flavoring, nutraceuticals, and pharmaceuticals; and may be fluids, powders or solids. However and for illustrative purposes, the description below refers to microingredients that are fluids. In some embodiments, the microingredients may be powders or solids. Where a microingredient is a powder, the system may include an additional subsystem for metering the powder and/or reconstituting the powder (although, as described in examples below, where the microingredient is a powder, the powder may be reconstituted as part of the methods of mixing the product.

Product module assembly 250 may include a plurality of slot assemblies 260, 262, 264, 266 configured to releasably engage plurality of product containers 252, 254, 256, 258. In this particular example, product module assembly 250 is shown to include four slot assemblies (namely slots 260, 262, 264, 266) and, therefore, may be referred to as a quad product module assembly. When positioning one or more of product containers 252, 254, 256, 258 within product module assembly 250, a product container (e.g. product container 254) may be slid into a slot assembly (e.g., slot assembly 262) in the direction of arrow 268. Although as shown herein, in the exemplary embodiment, a "quad product module" assembly is described, in other embodiments, more or less product may be contained within a module assembly Depending on the product being dispensed by the dispensing system, the numbers of product containers may vary. Thus, the numbers of product contained within any module assembly may be application specific, and may be selected to satisfy any desired characteristic of the system, including, but not limited to, efficiency, necessity and/or function of the system.

For illustrative purposes, each slot assembly of product module assembly 250 is shown to include a pump assembly. For example, slot assembly 252 shown to include pump assembly 270; slot assembly 262 shown to include pump assembly 272; slot assembly 264 is shown to include pump assembly 274; and slot assembly 266 is shown to include pump assembly 276.

Each of pump assemblies 270, 272, 274, 276 may include an inlet port for releasably engaging a product orifice included within the product container. For example, pump assembly 272 a shown to include inlet port 278 that is configured to releasably engage container orifice 280 included within product container 254. Inlet port 278 and/or product orifice 280 may include one or more sealing assemblies (e.g., one or more o-rings/luer fittings; not shown) to facilitate a leakproof seal.

An example of one or more of pump assembly 270, 272, 274, 276 may include but is not limited to a solenoid piston pump assembly that provides a defined and consistent amount of fluid each time that one or more of pump assemblies 270, 272, 274, 276 are energized. In one embodiment, such pumps are available from ULKA Costruzioni Elettromeccaniche S.p.A. of Pavia, Italy. For example, each time a pump assembly (e.g. pump assembly 274) is energized by control logic subsystem 14 via data bus 38, the pump assembly may provide a calibrated volume of the root beer flavoring included within product container 256. Again, for illustrative purposes only, the microingredients are fluids in this section of the description.

Other examples of pump assemblies 270, 272, 274, 276 and various pumping techniques are described in U.S. Pat. No. 4,808,161 (which is herein incorporated by reference in its entirety); U.S. Pat. No. 4,826,482 (which is herein incorporated by reference in its entirety); U.S. Pat. No. 4,976,162 (which is herein incorporated by reference in its entirety); U.S. Pat. No. 5,088,515 (which is herein incorporated by reference in its entirety); and U.S. Pat. No. 5,350,357 (which is herein incorporated by reference in its entirety). In some embodiments, the pump assembly may be any of the pump assemblies and may use any of the pump techniques described in U.S. Pat. No. 5,421,823 (which is herein incorporated by reference in its entirety).

The above-cited references describe non-limiting examples of pneumatically actuated membrane-based pumps that may be used to pump fluids. A pump assembly based on a pneumatically actuated membrane may be advantageous, for one or more reasons, including but not limited to, ability to deliver quantities, for example, microliter quantities, of fluids of various compositions reliably and precisely over a large number of duty cycles; and/or because the pneumatically actuated pump may require less electrical power because it may use pneumatic power, for example, from a carbon dioxide source. Additionally, a membrane-based pump may not require a dynamic seal, in which the surface moves with respect to the seal. Vibratory pumps such as those manufactured by ULKA generally require the use of dynamic elastomeric which may fail over time for example, after exposure to certain types of fluids and/or wear. In some embodiments, pneumatically-actuated membrane-based pumps may be more reliable, cost effective and easier to calibrate than other pumps. They may also produce less noise, generate less heat and consume less power than other pumps.

Product module assembly 250 may be configured to releasably engage bracket assembly 282. Bracket assembly 282 may be a portion of (and rigidly fixed within) processing system 10. Although referred to herein as a "bracket assembly", the assembly may vary in other embodiments. The bracket assembly serves to secure the product module assembly 250 in a desired location. An example of bracket assembly 282 may include but is not limited to a shelf within processing system 10 that is configured to releasably engage product module assembly 250. For example, product module assembly 250 may include a engagement device e.g. a clip assembly, a slot assembly, a latch assembly, a pin assembly; not shown) that is configured to releasably engage a complementary device that is incorporated into bracket assembly 282.

Plumbing/control subsystem 20 may include manifold assembly 284 that may be rigidly affixed to bracket assembly 282. Manifold assembly 284 may be configured to include a plurality of inlet ports 286, 288, 290, 292 that are configured to releasably engage a pump orifice (e.g. pump orifices 294, 296, 298, 300) incorporated into each of pump assemblies 270, 272, 274, 276. When positioning product module assembly 250 on bracket assembly 282, product module assembly 250 may be moved in the direction of the arrow 302, thus allowing for inlet ports 286, 288, 290, 292 to releasably engage pump orifices 294, 296, 298, 300. Inlet ports 286, 288, 290, 292 and/or pump orifices 294, 296, 298, 300 may include one or more O-ring or other sealing assemblies as described above (not shown) to facilitate a leakproof seal.

Manifold assembly 284 may be configured to engage tubing bundle 304, which may be plumbed (either directly or indirectly) to nozzle 24. As discussed above, high-volume ingredient subsystem 16 also provides fluids in the form of in at least one embodiment, chilled carbonated water 164, chilled water 166 and/or chilled high fructose corn syrup 168 (either directly or indirectly) to nozzle 24. Accordingly, as control logic subsystem 14 may regulate (in this particular example) the specific quantities of the various high-volume ingredients e.g., chilled carbonated water 164, chilled water 166, chilled high fructose corn syrup 168 and the quantities of the various microingredients (e.g. a first substrate (i.e., flavoring), a second substrate (i.e., a nutraceutical), and a third substrate (i.e., a pharmaceutical), control logic subsystem 14 may accurately control the makeup of product 28.

Although FIG. 4 depicts only one nozzle 24, in various other embodiments, multiple nozzles may be included. In some embodiments, more than one container 30 may receive product dispensed from the system via e.g., more than one set of tubing bundles. Thus, in some embodiments, the dispensing system may be configured such that one or more users may request one or more products to be dispensed concurrently.

Figure 5:
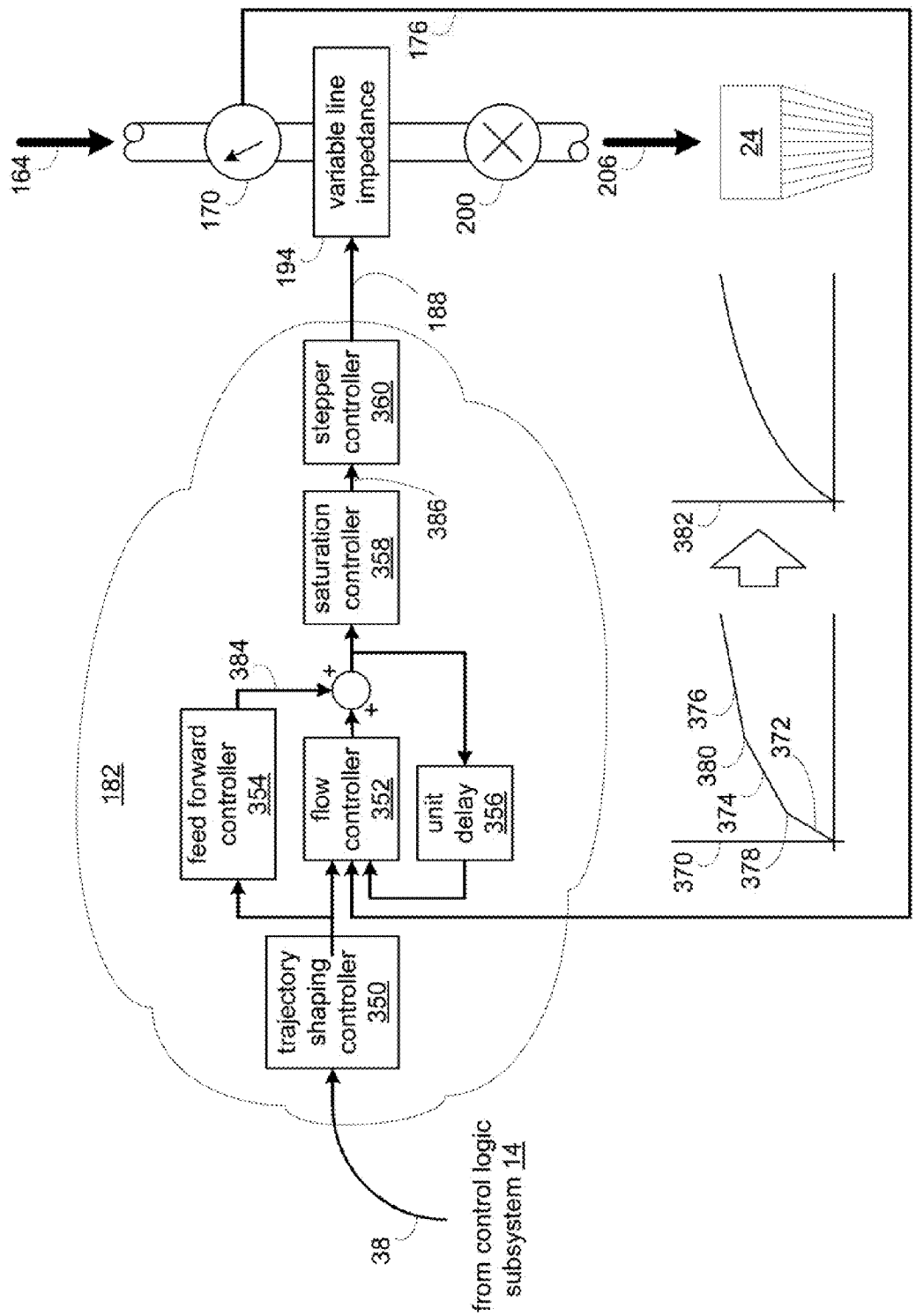
FIG. 5 is a diagrammatic view of one embodiment of a plumbing/control subsystem included within the processing system of FIG. 1.

Referring also to FIG. 5, a diagrammatic view of plumbing/control subsystem 20 is shown. While the plumbing/control subsystem described below concerns the plumbing/control system used to control the quantity of chilled carbonated water 164 being added to product 28, this is for illustrative purposes only and is not intended to be a limitation of this disclosure, as other configurations are also possible. For example, the plumbing/control subsystem described below may also be used to control e.g., the quantity of chilled water 166 and/or chilled high fructose corn syrup 168 being added to product 28.

As discussed above, plumbing/control subsystem 20 may include feedback controller system 182 that receives flow feedback signal 176 from flow measuring device 170. Feedback controller system 182 may compare flow feedback signal 176 to the desired flow volume (as defined by control logic subsystem 14 via data bus 38). Upon processing flow feedback signal 176, feedback controller system 182 may generate flow control signal 188 that may be provided to variable line impedance 194.

Feedback controller system 182 may include trajectory shaping controller 350, flow controller 352, feed forward controller 354, unit delay 356, saturation controller 358, and stepper controller 360, each of which will be discussed below in greater detail.

Trajectory shaping controller 350 may be configured to receive a control signal from control logic subsystem 14 via data bus 38. This control signal may define a trajectory for the manner in which plumbing/control subsystem 20 is supposed to deliver fluid (in the case, chilled carbonated water 164) for use in product 28. However, the trajectory provided by control logic subsystem 14 may need to be modified prior to being processed by e.g., flow controller 352. For example, control systems tend to have a difficult time processing control curves that are made up of a plurality of linear line segments (i.e., that include step changes). For example, flow regulator 352 may have difficulty processing control curve 370, as it consists of three distinct linear segments, namely segments 372, 374, 376. Accordingly, at the transition points transition points 378, 380), flow controller 352 specifically (and plumbing/control subsystem 20 generally) would be required to instantaneously change from a first flow rate to a second flow rate. Therefore, trajectory shaping controller 350 may filter control curve 30 to form smoothed control curve 382 that is more easily processed by flow controller 352 specifically (and plumbing/control subsystem 20 generally), as an instantaneous transition from a first flow rate to a second flow rate is no longer required.

Additionally, trajectory shaping controller 350 may allow for the pre-fill wetting and post-fill rinsing of nozzle 24. In some embodiments and/or for some recipes, one or more ingredients may present problems for nozzle 24 if the ingredient (referred to herein as "dirty ingredients") contacts nozzle 24 directly i.e., in the form in which it is stored. In some embodiments, nozzle 24 may be pre-fill wetted with a "pre-fill" ingredient e.g., water, so as to prevent the direct contact of these "dirty ingredients" with nozzle 24. Nozzle 24 may then be post-fill rinsed with a "post-wash ingredient" e.g., water.

Specifically, in the event that nozzle 24 is pre-fill wetted with e.g., 10 mL of water (or any "pre-fill" ingredient), and/or post-fill rinsed with e.g., 10 mL of water (or any "post-wash" ingredient), once the adding of the dirty ingredient has stopped, trajectory shaping controller 350 may offset the pre-wash ingredient added during the pre-fill wetting and/or post-fill rinsing by providing an additional quantity of dirty ingredient during the process. Specifically, as container 30 is being filled with product 28, the pre-fill rinse water or "pre-wash" may result in product 28 being initially under-concentrated with a the dirty ingredient. Trajectory shaping controller 350 may then add dirty ingredient at a higher-than-needed flow rate, resulting in product 28 transitioning from "under-concentrated" to "appropriately concentrated" to "over-concentrated", or present in a concentration higher than that which is called for by the particular recipe. However, once the appropriate amount of dirty ingredient has been added, the post-fill rinse process may add additional water, or another appropriate "post-wash ingredient", resulting in product 28 once again becoming "appropriately-concentrated" with the dirty ingredient.

Flow controller 352 may be configured as a proportional-integral (PI) loop controller. Flow controller 352 may perform the comparison and processing that was generally described above as being performed by feedback controller system 182. For example, flow controller 352 may be configured to receive feedback signal 176 from flow measuring device 170. Flow controller 352 may compare flow feedback signal 176 to the desired flow volume (as defined by control logic subsystem 14 and modified by trajectory shaping controller 350). Upon processing flow feedback signal 176, flow controller 352 may generate flow control signal 188 that may be provided to variable line impedance 194.

Feed forward controller 354 may provide an "best guess" estimate concerning what the initial position of variable line impedance 194 should be. Specifically, assume that at a defined constant pressure, variable line impedance has a flow rate (for chilled carbonated water 164) of between 0.00 mL/second and 120.00 mL/second. Further, assume that a flow rate of 40 mL/second is desired when filing container 30 with product 28. Accordingly, feed forward controller 354 may provide a feed forward signal (on feed forward line 384) that initially opens variable line impedance 194 to 33.33% of its maximum opening (assuming that variable line impedance 194 operates in a linear fashion).

When determining the value of the feed forward signal, feed forward controller 354 may utilize a lookup table (not shown) that may be developed empirically and may define the signal to be provided for various initial flow rates. An example such a lookup table may include, but is not limited to, the following table:

| FlOWratemL/second | Signal to stepper controller |
| --- | --- |
| 0 | pulse to 0 degrees |
| 20 | pulse to 30 degrees |
| 40 | pulse to 60 degrees |
| 60 | pulse to 150 degrees |
| 80 | pulse to 240 degrees |
| 100 | pulse to 270 degrees |
| 120 | pulse to 300 degrees |

Again, assuming that a flow rate of 40 mL/second is desired when filing container 30 with product 28, feed forward controller 354 may utilize the above-described lookup table and may pulse the stepper motor to 60.0 degrees (using feed forward line 384).

Unit delay 356 may form a feedback path through which a previous version of the control signal (provided to variable line impedance 194) is provided to flow controller 352.

Saturation controller 358 may be configured to disable the integral control of feedback controller system 182 (which, as discussed above, may be configured as a PI loop controller) whenever variable line impedance 194 is set to a maximum flow rate (by stepper controller 360), thus increasing the stability of the system by reducing flow rate overshoots and system oscillations.

Stepper controller 360 may be configured to convert the signal provided by saturation controller 358 (on line 386) into a signal usable by variable line impedance 194. Variable line impedance 194 may include a stepper motor for adjusting the orifice size (and, therefore, the flow rate) of variable line impedance 194. Accordingly, control signal 188 may be configured to control the stepper motor included within variable line impedance.

Figure 6:
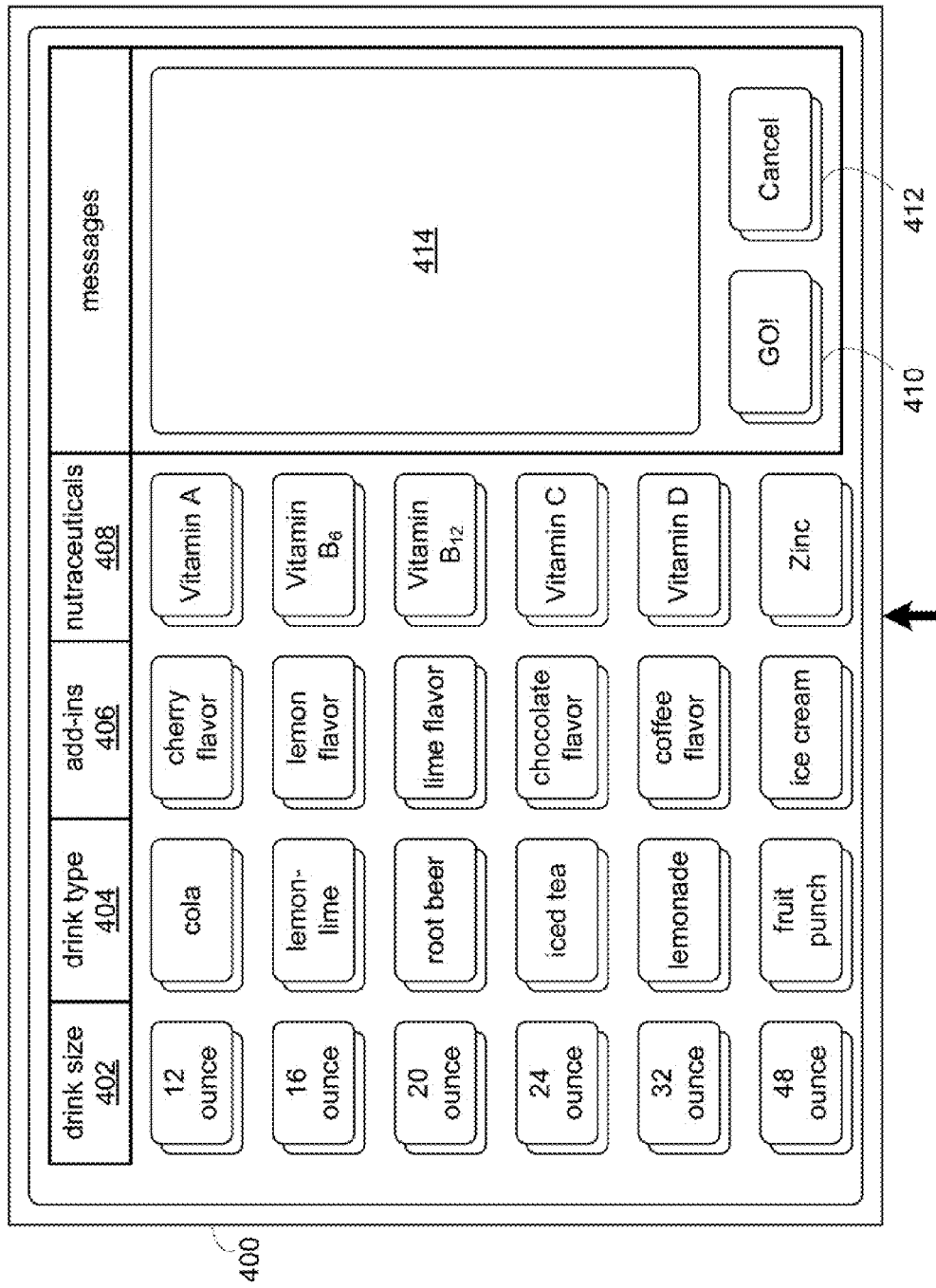
FIG. 6 is a diagrammatic view of one embodiment of a user interface subsystem included within the processing system of FIG. 1.

Referring also to FIG. 6, a diagrammatic view of user interface subsystem 22 is shown. User interface subsystem 22 may include touch screen interface 400 that allows user 26 to select various options concerning product 28. For example, user 26 (via "drink size" column 402) may be able to select the size of product 28. Examples of the selectable sizes may include but are not limited to: "12 ounce"; "16 ounce"; "20 ounce"; "24 ounce"; "32 ounce"; and "48 ounce".

User 26 may be able to select (via "drink type" column 404) the type of product 28. Examples of the selectable types may include but are not limited to: "cola"; "lemon-lime"; "root beer"; "iced tea"; "lemonade"; and "fruit punch".

User 26 may also be able to select (via "add-ins" column 406) one or more flavorings/products for inclusion within product 28. Examples of the selectable add-ins may include but are not limited to: "cherry flavor"; "lemon flavor"; "lime flavor"; "chocolate flavor"; "coffee flavor"; and "ice cream".

Further, user 26 may be able to select (via "nutraceuticals" column 408) one or more nutraceuticals for inclusion within product 28. Examples of such nutraceuticals may include but are not limited to: "Vitamin A"; "Vitamin Be"; "Vitamin $Bi_2$"; "Vitamin C"; "Vitamin D"; and "Zinc".

In some embodiments, an additional screen at a level lower than the touch screen may include a "remote control" (not shown) for the screen. The remote control may include buttons indicating up, down, left and right and select, for example. However, in other embodiments, additional buttons may be included.

Once user 26 has made the appropriate selections, user 26 may select "GO!" button 410 and user interface subsystem 22 may provide the appropriate data signals (via data bus 32) to control logic subsystem 14. Once received, control logic subsystem 14 may retrieve the appropriate data from storage subsystem 12 and may provide the appropriate control signals to e.g., high volume ingredient subsystem 16, microingredient subsystem 18, and plumbing/control subsystem 20, which may be processed (in the manner discussed above) to prepare product 28. Alternatively, user 26 may select "Cancel" button 412 and touch screen interface 400 may be reset to a default state no buttons selected).

User interface subsystem 22 may be configured to allow for bidirectional communication with user 26. For example, user interface subsystem 22 may include informational screen 414 that allows processing system 10 to provide information to user 26. Examples of the types of information that may be provided to user 26 may include but is not limited to advertisements, information concerning system malfunctions/warnings, and information concerning the cost of various products.

As discussed above, product module assembly 250 (of microingredient subsystem 18 and plumbing/control subsystem 20) may include a plurality of slot assemblies 260, 262, 264, 266 configured to releasably engage a plurality of product containers 252, 254, 256, 258. Unfortunately, when servicing processing system 10 to refill product containers 252, 254, 256, 258, it may be possible to install a product container within the wrong slot assembly of product module assembly 250. A mistake such as this may result in one or more pump assemblies (e.g., pump assemblies 270, 272, 274, 276) and/or one or more tubing assemblies (e.g., tubing bundle 304) being contaminated with one or more microingredients. For example, as root beer flavoring (i.e., the microingredient contained within product container 256) has a very strong taste, once a particular pump assembly/tubing assembly is used to distribute e.g., root beer flavoring, it can no longer be used to distribute a microingredient having a less-strong taste (e.g., lemon-lime flavoring, iced tea flavoring, and lemonade flavoring).

Additionally and as discussed above, product module assembly 250 may be configured to releasably, engage bracket assembly 282. Accordingly, in the event that processing system 10 includes multiple product module assemblies and multiple bracket assemblies, when servicing processing system 10, it may be possible to install a product module assembly onto the wrong bracket assembly. Unfortunately, such a mistake may also result in one or more pump assemblies (e.g., pump assemblies 270, 272, 274, 276) and/or one or more tubing assemblies (e.g., tubing bundle 304) being contaminated with one or more microingredients.

Accordingly, processing system 10 may include an RFID-based system to ensure the proper placement of product containers and product modules within processing system 10. Referring also to FIGS. 7 & 8A, processing system 10 may include RFID system 450 that may include RFID antenna assembly 452 positioned on product module assembly 250 of processing system 10.

As discussed above, product module assembly 250 may be configured to releasably engage at least one product container product container 258). RFID system 450 may include RFID tag assembly 454 positioned on (e.g., affixed to) product container 258. Whenever product module assembly 250 releasably engages the product container (e.g., product container 258), RFID tag assembly 454 may be positioned within e.g., upper detection zone 456 of RFID antenna assembly 452. Accordingly and in this example, whenever product container 258 is positioned within (i.e. releasably engages) product module assembly 250, RFID tag assembly 454 should be detected by RFID antenna assembly 452.

As discussed above, product module assembly 250 may be configured to releasably engage bracket assembly 282. RFID system 450 may further include RFID tag assembly 458 positioned on (e.g. affixed to) bracket assembly 282. Whenever bracket assembly 282 releasably engages product module assembly 250, RFID tag assembly 458 may be positioned within e.g., lower detection zone 460 of RFID antenna assembly 452.

Accordingly, through use of RFID antenna assembly 452 and RFID tag assemblies 454, 458, RFID system 450 may be able to determine whether or not the various product containers (e.g., product containers 252, 254, 256, 258) are properly positioned within product module assembly 250. Further, RFID system 450 may be able to determine whether or not product module assembly 250 is properly positioned within processing system 10.

While RFID system 450 shown to include one RFID antenna assembly and two RFID tag assemblies, this is for illustrative purposes only and is not intended to be a limitation of this disclosure, as other configurations are possible. Specifically, a typical configuration of RFID system 450 may include one RFID antenna assembly positioned within each slot assembly of product module assembly 250. For example, RFID system 450 may additionally include RFID antenna assemblies 462, 464, 466 positioned within product module assembly 250. Accordingly, RFID antenna assembly 452 may determine whether a product container is inserted into slot assembly 266 (of product module assembly 250); RFID antenna assembly 462 may determine whether a product container is inserted into slot assembly 264 (of product module assembly 250); RFID antenna assembly 464 may determine whether a product container is inserted into slot assembly 262 (of product module assembly 250); and RFID antenna assembly 466 may determine whether a product container is inserted into slot assembly 260 (of product module assembly 250). Further, since processing system 10 may include multiple product module assemblies, each of these product module assemblies may include one or more RFID antenna assemblies to determine which product containers are inserted into the particular product module assembly.

As discussed above, by monitoring for the presence of an RFID tag assembly within lower detection zone 460 of RFID antenna assembly 452, RFID system 450 may be able to determine whether product module assembly 250 is properly positioned within processing system 10. Accordingly, any of RFID antenna assemblies 452, 462, 464, 466 may be utilized to read one or more RFID tag assemblies affixed to bracket assembly 282. For illustrative purposes, bracket assembly 282 is shown to include only a single RFID tag assembly 458. However, this is for illustrative purposes only and is not intended to be a limitation of this disclosure, as other configurations are possible. For example, bracket assembly 282 may include multiple RFID tag assemblies, namely RFID tag assembly 468 (shown in phantom) for being read by RFID antenna assembly 462; RFID tag assembly 470 (shown in phantom) for being read by RFID antenna assembly 464; and RFID tag assembly 472 (shown in phantom) for being read by RFID antenna assembly 466.

One or more of the RFID tag assemblies (e.g., RFID tag assemblies 454, 458, 468, 470, 472) may be passive RFID tag assemblies (e.g., RFID tag assemblies that do not require a power source). Additionally, one or more of the MD tag assemblies (e.g., RFID tag assemblies 454, 458, 468, 470, 472) may be a writeable RFID tag assembly, in that RFID system 450 may write data to the RFID tag assembly. Examples of the type of data storable within the RFID tag assemblies may include, but is not limited to: a quantity identifier for the product container, a production date identifier for the product container, a discard date identifier for the product container, an ingredient identifier for the product container, a product module identifier, and a bracket identifier.

With respect to the quantity identifier, in some embodiments, each volume of ingredient pumped from a container including an RFID tag, the RFID tag is written to include the updated volume in the container, and/or, the amount pumped. Where the container is subsequently removed from the assembly, and replaced into a different assembly, the system may read the RFID tag and may know the volume in the container and/or the amount that has been pumped from the container. Additionally, the dates of pumping may also be written on the RFID tag.

Accordingly, when each of the bracket assemblies (e.g. bracket assembly 282) is installed within processing system 10, an RFID tag assembly (e.g. RFID tag assembly 458) may be attached, wherein the attached RFID tag assembly may define a bracket identifier (for uniquely identifying the bracket assembly). Accordingly, if processing system 10 includes ten bracket assemblies, ten RFID tag assemblies (i.e., one attached to each bracket assembly) may define ten unique bracket identifiers (i.e. one for each bracket assembly).

Further, when a product container (e.g. product container 252, 254, 256, 258) is manufactured and filled with a microingredient, an RFID tag assembly may include: an ingredient identifier (for identifying the microingredient within the product container); a quantity identifier (for identifying the quantity of microingredient within the product container); a production date identifier (for identifying the date of manufacture of the microingredient); and a discard date identifier (for identifying the date on which the product container should be discarded/recycled).

Accordingly, when product module assembly 250 is installed within processing system 10, RFID antenna assemblies 452, 462, 464, 466 may be energized by RFID subsystem 474. RFID subsystem 474 may be coupled to control logic subsystem 14 via databus 476. Once energized, RFID antenna assemblies 452, 462, 464, 466 may begin scanning their respective upper and lower detection zones (e.g. upper detection zone 456 and lower detection zone 460) for the presence of RFID tag assemblies.

As discussed above, one or more RFID tag assemblies may be attached to the bracket assembly with which product module assembly 250 releasably engages. Accordingly, when product module assembly 250 is slid onto (i.e. releasably engages) bracket assembly 282, one or more of RFID tag assemblies 458, 468, 470, 472 may be positioned within the lower detection zones of RFID antenna assemblies 452, 462, 464, 466 (respectively). Assume, for illustrative purposes, that bracket assembly 282 includes only one RFID tag assembly, namely RFID tag assembly 458. Further, assume for illustrative purposes that product containers 252, 254, 256, 258 are being installed within slot assemblies 260, 262, 264, 266 (respectively). Accordingly, RFID subsystem 474 should detect bracket assembly 282 (by detecting RFID tag assembly 458) and should detect product containers 252, 254, 256, 258 by detecting the RFID tag assemblies (e.g., RFID tag assembly 454) installed on each product container.

The location information concerning the various product modules, bracket assemblies, and product containers, may be stored within e.g., storage subsystem 12 that is coupled to control logic subsystem 14. Specifically, if nothing has changed, RFID subsystem 474 should expect to have RFID antenna assembly 452 detect RFID tag assembly 454 (i.e., which is attached to product container 258) and should expect to have RFID antenna assembly 452 detect RFID tag assembly 458 (i.e. which is attached to bracket assembly 282). Additionally, if nothing has changed: RFID antenna assembly 462 should detect the RFID tag assembly (not shown) attached to product container 256; RFID antenna assembly 464 should detect the RFID tag assembly (not shown) attached to product container 254; and RFID antenna assembly 466 should detect the RFID tag assembly (not shown) attached to product container 252.

Assume for illustrative purposes that, during a routine service call, product container 258 is incorrectly positioned within slot assembly 264 and product container 256 is incorrectly positioned within slot assembly 266. Upon acquiring the information included within the RFID tag assemblies (using the RFID antenna assemblies), RFID subsystem 474 may detect the RFID tag assembly associated with product container 258 using RFID antenna assembly 262; and may detect the RFID tag assembly associated with product container 256 using RFID antenna assembly 452. Upon comparing the new locations of product containers 256, 258 with the previously stored locations of product containers 256, 258 (as stored on storage subsystem 12), RFID subsystem 474 may determine that the location of each of these product containers is incorrect.

Accordingly, RFID subsystem 474, via control logic subsystem 14, may render a warning message on e.g. informational screen 414 of user-interface subsystem 22, explaining to e.g. the service technician that the product containers were incorrectly reinstalled. Depending on the types of microingredients within the product containers, the service technician may be e.g. given the option to continue or told that they cannot continue. As discussed above, certain microingredients (e.g. root beer flavoring) have such a strong taste that once they have been distributed through a particular pump assembly and/or tubing assembly, the pump assembly/tubing assembly can no longer be used for any other microingredient. Additionally and as discussed above, the various RFID tag assemblies attached to the product containers may define the microingredient within the product container.

Accordingly, if a pump assembly/tubing assembly that was used for lemon-lime flavoring is now going to be used for root beer flavoring, the service technician may be given a warning asking them to confirm that this is what they want to do. However, if a pump assembly/tubing assembly that was used for root beer flavoring is now going to be used for lemon-lime flavoring, the service technician may be provided with a warning explaining that they cannot proceed and must switch the product containers back to their original configurations or e.g., have the compromised pump assembly/tubing assembly removed and replaced with a virgin pump assembly/tubing assembly. Similar warnings may be provided in the event that RFID subsystem 474 detects that a bracket assembly has been moved within processing system 10.

RFID subsystem 474 may be configured to monitor the consumption of the various microingredients. For example and as discussed above, an RFID tag assembly may be initially encoded to define the quantity of microingredient within a particular product container. As control logic subsystem 14 knows the amount of microingredient pumped from each of the various product containers, at predefined intervals (e.g. hourly), the various RFID tag assemblies included within the various product containers may be rewritten by RFID subsystem 474 (via an RFID antenna assembly) to define an up-to-date quantity for the microingredient included within the product container.

Upon detecting that a product container has reached a predetermined minimum quantity, RFID subsystem 474, via control logic subsystem 14, may render a warning message on informational screen 414 of user-interface subsystem 22. Additionally, RFID subsystem 474 may provide a warning (via informational screen 414 of user-interface subsystem 22) in the event that one or more product containers has reached or exceeded an expiration date (as defined within an RFID tag assembly attached to the product container). Additionally/alternatively, the above-described warning message may be transmitted to a remote computer (not shown), such as a remote server that is coupled (via a wireless or wired communication channel) to processing system 10.

While RFID system 450 is described above as having an RFID antenna assembly affixed to a product module and RFID tag assemblies affixed to bracket assemblies and product containers, this is for illustrative purposes only and is not intended to be a limitation of this disclosure. Specifically, the RFID antenna assembly may be positioned on any product container, a bracket assembly, or product module. Additionally, the RFID tag assemblies may be positioned on any product container, bracket assembly, or product module. Accordingly, in the event that an RFID tag assembly is affixed to a product module assembly, the RFID tag assembly may define a product module identifier that e.g. defines a serial number for the product module.

Figure 8B:
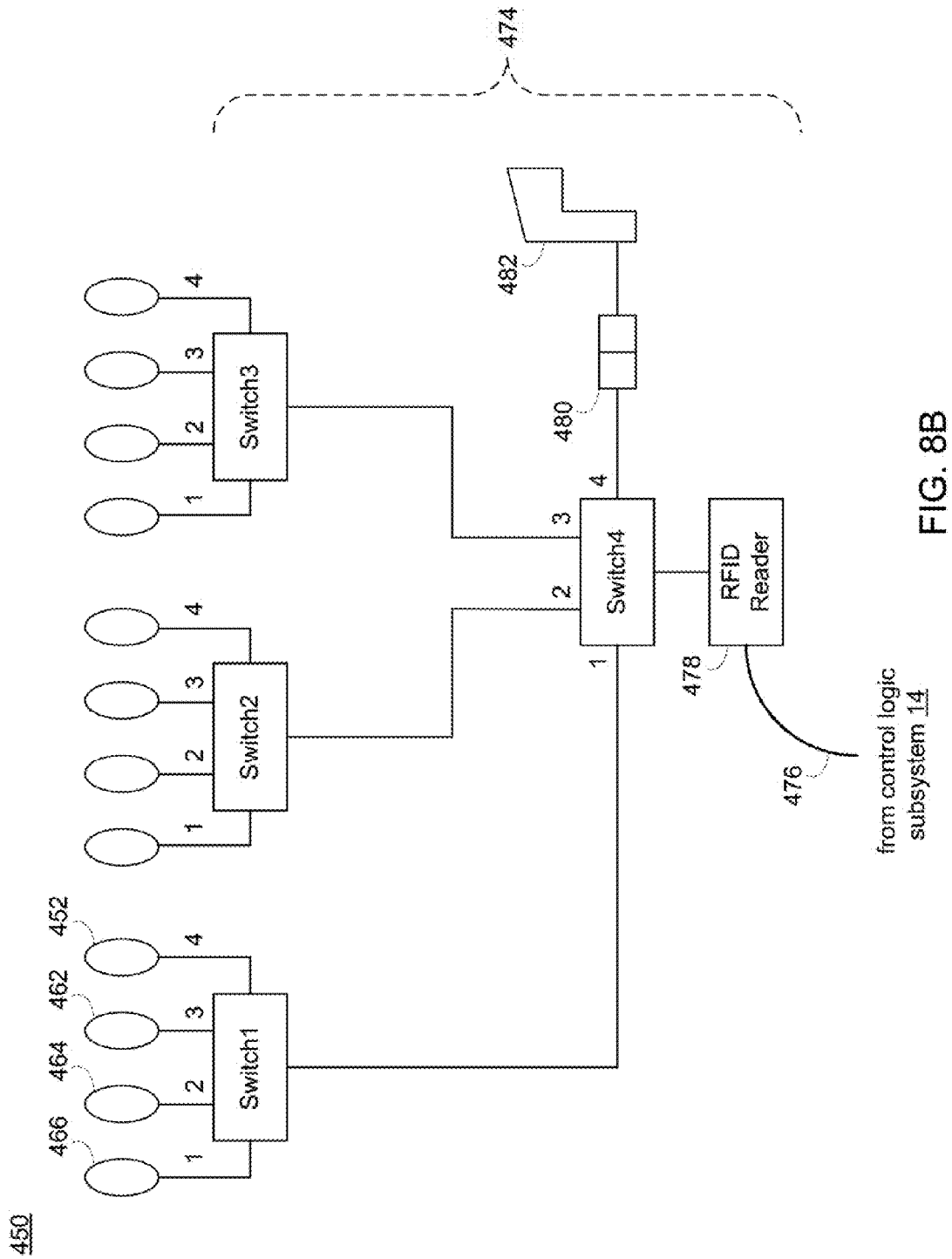
FIG. 8B is another diagrammatic view of one embodiment of the RFID system of FIG. 7.

Referring also to FIG. 8B, there is shown one implementation of RFID subsystem 474 included within RFID system 450. RFID subsystem 474 may be configured to allow a single RFID reader 478 (also included within RFID subsystem 474) to sequentially energize a plurality of RFID antenna assemblies (e.g., RFID antenna assemblies 452, 462, 464, 466).

During a scanning period, RFID system 450 may select Port1 on Switch4 (i.e., the port coupled to Switch1) and sequentially cycle Switch1 to select Port1, then Port2, then Port3, and then Port4; thus sequentially energizing RFID antenna assemblies 466, 464, 462, 452 and reading any RFID tag assemblies positioned proximate the energized RFID antenna assemblies.

During the next scanning period, RFID system 450 may select Port2 on Switch4 (i.e., the port coupled to Switch2) and sequentially cycle Switch2 to select Port1, then Port2, then Port3, and then Port4; thus sequentially energizing the RFID antenna assemblies (coupled to Switch2) and reading any RFID tag assemblies positioned proximate the energized RFID antenna assemblies.

During the next scanning period, RFID system 450 may select Port3 on Switch4 (i.e., the port coupled to Switch3) and sequentially cycle Switch3 to select Port1, then Port2, then Port3, and then Port4; thus sequentially energizing the RFID antenna assemblies (coupled to Switch3) and reading any RFID tag assemblies positioned proximate the energized RFID antenna assemblies.

One or more ports of Switch4 (e.g., Port4) may be coupled to auxiliary connector 480 (e.g., a releasable coaxial connector) that allows auxiliary device 482 to be releasably coupled to auxiliary connector 480. Examples of auxiliary device 482 may include but are not limited to an RFID reader and a handheld antenna. During any scanning period in which RFID system 450 selects Port4 on Switch4 (i.e., the port coupled to auxiliary connector 480), the device releasably coupled to auxiliary connector 480 may be energized. Examples of Switch1, Switch2, Switch3 and Switch4 may include but are not limited to single pole, quadruple throw electrically-selectable switches.

Due to the close proximity of the slot assemblies (e.g., slot assemblies 260, 262, 264, 266) included within product module assembly 250, it may be desirable to configure RFID antenna assembly 452 in a manner that allows it to avoid reading e.g., product containers positioned within adjacent slot assemblies. For example, RFID antenna assembly 452 should be configured so that RFID antenna assembly 452 can only read RFID tag assemblies 454, 458; RFID antenna assembly 462 should be configured so that RFID antenna assembly 462 can only read RFID tag assembly 468 and the RFID tag assembly (not shown) affixed to product container 256; RFID antenna assembly 464 should be configured so that RFID antenna assembly 464 can only read RFID tag assembly 470 and the RFID tag assembly (not shown) affixed to product container 254; and RFID antenna assembly 466 should be configured so that RFID antenna assembly 466 can only read RFID tag assembly 472 and the RFID tag assembly (not shown) affixed to product container 252.

Figure 9:
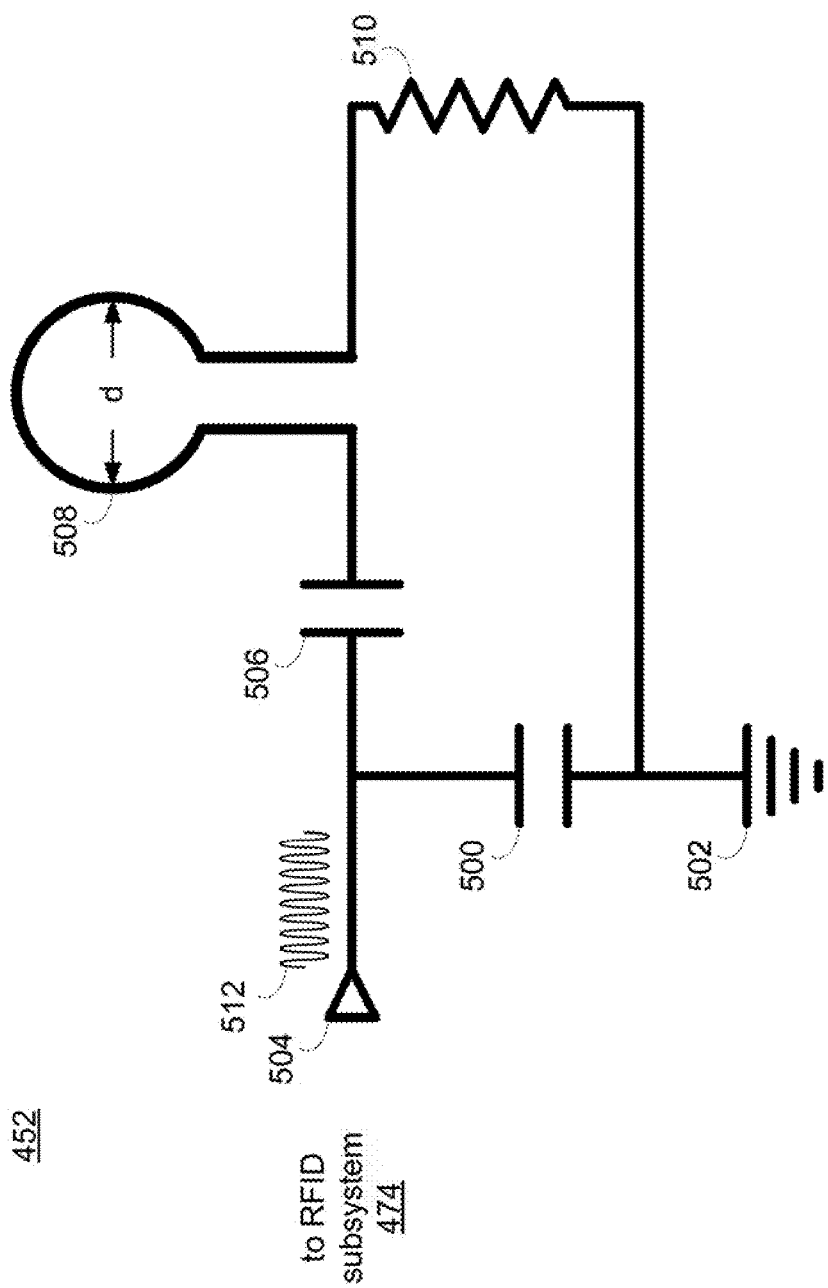
FIG. 9 is a diagrammatic view of one embodiment of an RFID antenna assembly included within the RFID system of FIG. 7.

Accordingly and referring also to FIG. 9, one or more of RFID antenna assemblies 452, 462, 464, 466 may be configured as a loop antenna. While the following discussion is directed towards RFID antenna assembly 452, this is for illustrative purposes only and is not intended to be a limitation of this disclosure, as the following discussion may be equally applied to RFID antenna assemblies 462, 464, 466.

RFID assembly 452 may include first capacitor assembly 500 (e.g., a 2.90 pF capacitor) that is coupled between ground 502 and port 504 that may energize RFID antenna assembly 452. A second capacitor assembly 506 (e.g., a 2.55 pF capacitor) maybe positioned between port 504 and inductive loop assembly 508. Resistor assembly 510 (e.g., a 2.00 Ohm resistor) may couple inductive loop assembly 508 with ground 502 while providing a reduction in the Q factor (also referred to herein as "de-Qing") to increase the bandwidth and provide a wider range of operation.

As is known in the art, the characteristics of RFID antenna assembly 452 may be adjusted by altering the physical characteristics of inductive loop assembly 508. For example, as the diameter "d" of inductive loop assembly 508 increases, the far field performance of RFID antenna assembly 452 may increase. Further, as the diameter "d" of inductive loop assembly 508 decreases; the far field performance of RFID antenna assembly 452 may decrease.

Specifically, the far field performance of MD antenna assembly 452 may vary depending upon the ability of RFID antenna assembly 452 to radiate energy. As is known in the art, the ability of RFID antenna assembly 452 to radiate energy may be dependent upon the circumference of inductive loop assembly 508 (with respect to the wavelength of carrier signal 512 used to energize RFID antenna assembly 452 via port 504.

Figure 10:
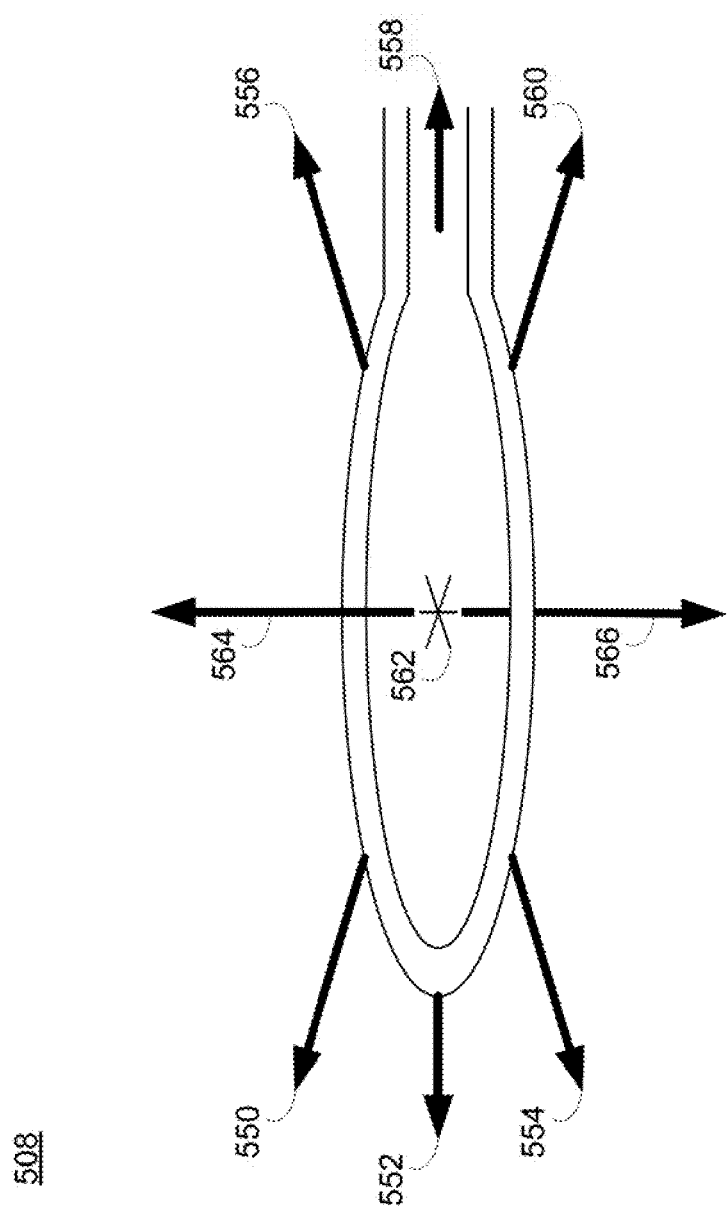
FIG. 10 is an isometric view of one embodiment of an antenna loop assembly of the RFID antenna assembly of FIG. 9.

Referring also to FIG. 10 and in a preferred embodiment, carrier signal 512 may be a 915 MHz carrier signal having a wavelength of 12.89 inches. With respect to loop antenna design, once the circumference of inductive loop assembly 508 approaches or exceeds 50% of the wavelength of carrier signal 512, the inductive loop assembly 508 may radiate energy outward in a radial direction (e.g., as represented by arrows 550, 552, 554, 556, 558, 560) from axis 562 of inductive loop assembly 508, resulting in strong far field performance. Conversely, by maintaining the circumference of inductive loop assembly 508 below 25% of the wavelength of carrier signal 512, the amount of energy radiated outward by inductive loop assembly 508 will be reduced and far field performance will be compromised. Further, magnetic coupling may occur in a direction perpendicular to the plane of inductive loop assembly 508 (as represented by arrows 564, 566), resulting in strong near field performance.

As discussed above, due to the close proximity of slot assemblies (e.g., slot assemblies 260, 262, 264, 266) included within product module assembly 250, it may be desirable to configure RFID antenna assembly 452 in a manner that allows it to avoid reading e.g., product containers positioned within adjacent slot assemblies. Accordingly, by configuring inductive loop assembly 508 so that the circumference of inductive loop assembly 508 is below 25% of the wavelength of carrier signal 512 (e.g., 3.22 inches for a 915 MHz carrier signal), far field performance may be reduced and near field performance may be enhanced. Further, by positioning inductive loop assembly 508 so that the RFID tag assembly to be read is either above or below RFID antenna assembly 452, the RFID tag assembly may be inductively coupled to RFID antenna assembly 452. For example, when configured so that the circumference of inductive loop assembly 508 is 10% of the wavelength of carrier signal 512 (e.g., 1.29 inches for a 915 MHz carrier signal), the diameter of inductive loop assembly 508 would be 0.40 inches, resulting in a comparatively high level of near field performance and a comparatively low level of far field performance.

Referring also to FIG. 11A, to further reduce the possibility of reading e.g., product containers positioned within adjacent slot assemblies, split ring resonator assembly 568 may be positioned proximate inductive loop assembly 508. For example, split ring resonator assembly 568 may be positioned approximately 0.125 inches away from inductive loop assembly 508.

Split ring resonator assembly 568 may be generally planar and may include at least one ring, and in some embodiments, a pair of concentric rings 570, 572, each of which may include a "split" (e.g., a gap) 574, 576 (respectively) that may be positioned opposite each other (with respect to split ring resonator assembly 568). Split ring resonator assembly 568 may be positioned (with respect to inductive loop assembly 508) so that split ring resonator assembly 568 may be magnetically coupled to inductive loop assembly 508 and at least a portion of the magnetic field (as represented by arrow 566) generated by inductive loop assembly 508 may be focused to further reduce the possibility of reading e.g., product containers positioned within adjacent slot assemblies.

When split ring resonator assembly 568 is magnetically coupled to inductive loop assembly 508, the magnetic flux of the magnetic field (as represented in this illustrative example by arrow 566) may penetrate rings 570, 572 and rotating currents (as represented by arrows 578, 580 respectively) may be generated. Rotating currents 578, 580 within rings 570, 572 (respectively) may produce their own lines of magnetic flux that may (depending on their direction) enhance the magnetic field of inductive loop assembly 508.

For example, rotating current 578 may generate lines of magnetic flux (as represented by arrow 584) that flow in a generally perpendicular direction inside of ring 570 (and, therefore, enhance magnetic field 566). Further, rotating current 580 may generate lines of magnetic flux (as represented by arrow 588) that flow in a generally perpendicular direction inside of ring 572 (and, therefore, enhance magnetic field 566).

Accordingly, through the use of split ring resonator assembly 568, magnetic field 566 that is generated by inductive loop assembly 508 may be generally enhanced within the area bounded by split ring resonator assembly 568 (as represented by enhancement area 590).

When configuring split ring resonator assembly 568, rings 570, 572 may be constructed from a non-ferrous metamaterial. An example of such a non-ferrous metamaterial is copper. As is known in the art, a metamaterial is a material in which the properties of the material are defined by the structure of the material (as opposed to the composition of the material).

Left-handed metamaterials may exhibit an interesting behavior of magnetic resonance when excited with an incident electromagnetic wave, which may be due to the physical properties of the structure. Normally shaped as concentric split rings, the dielectric permittivity and effective permeability of the left-handed metamaterial may become negative at resonance, and may form a left handed coordinate system. Further, the index of refraction may be less than zero, so the phase and group velocities may be oriented in opposite directions such that the direction of propagation is reversed with respect to the direction of energy flow.

Accordingly, split ring resonator assembly 568 may be configured such that the resonant frequency of split ring resonator assembly 568 is slightly above (e.g., 5-10% greater) the frequency of carrier signal 512 (i.e., the carrier signal that energizes inductive loop assembly 508). Continuing with the above-stated example in which carrier signal 512 has a frequency of 915 MHz, split ring resonator assembly 568 may be configured to have a resonant frequency of approximately 950 MHz-1.00 GHz, which, in some embodiments, may be desirable for may reasons, including, but not limited to, minimizing group delay distortion within the operating band of RFID system 478, which occurs at resonance.

Referring also to FIGS. 11B1-11B16, there are shown various flux plot diagrams illustrative of the lines of magnetic flux produced by e.g., inductive loop assembly 508 without and with e.g., split ring resonator assembly 568 at various phase angles of e.g., carrier signal 512. Left Handed Metamaterials may exhibit an interesting behavior of magnetic resonance when excited with an incident electromagnetic wave, which may be due to the physical properties of the structure. In FIGS. 11B1-11B16, a loop antenna inductive loop assembly 508) excites a split ring resonator (e.g., split ring resonator assembly 568) and the magnetic (H) field patterns are shown for a given phase angle. As the phase angle of e.g., carrier signal 512 is varied, the direction and density of the lines of magnetic flux may be observed concentrating within and extending from the geometric footprint of e.g., split ring resonator assembly 568.

Figure 12B:
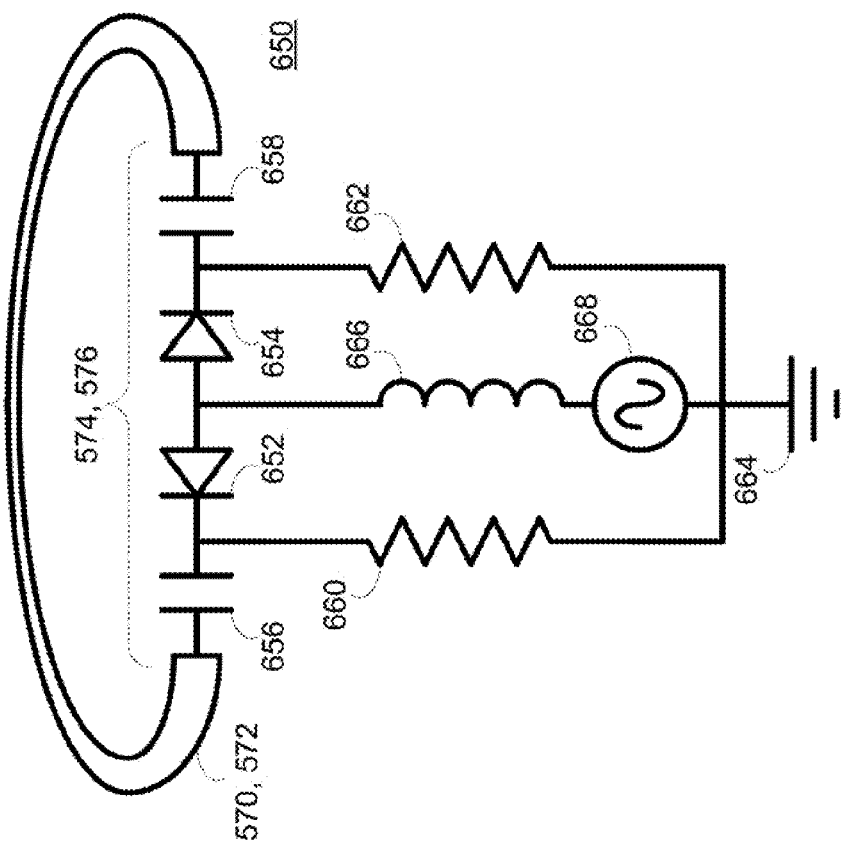
FIG. 12B is one embodiment of a schematic diagram of a tuning circuit for use with the split ring resonator of FIG. 11 A.
Figure 13A:
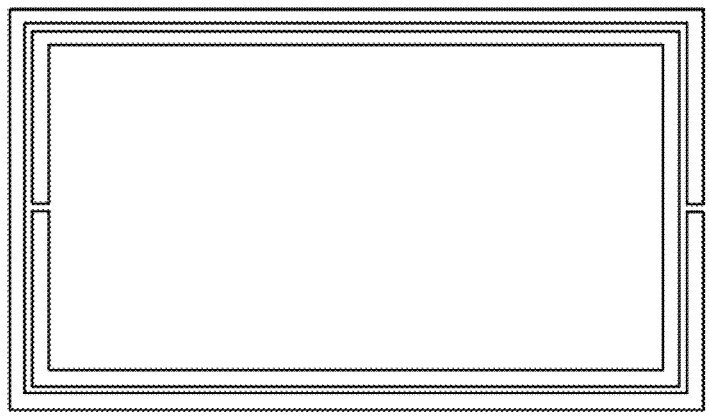
FIGS. 13A-13B are examples of alternative embodiments of the split ring resonator of FIG. 11 A.
Figure 13B:
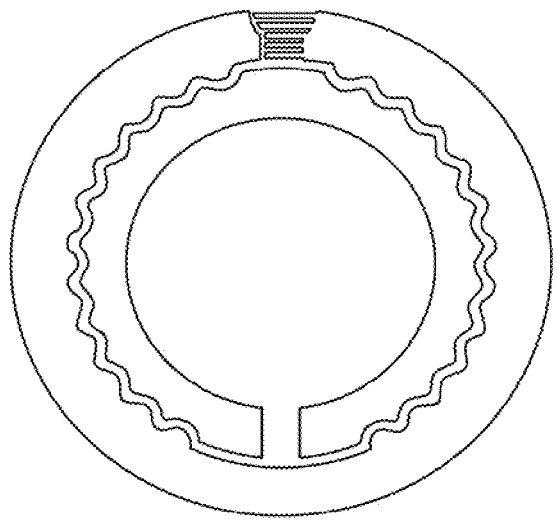
Figure 14:
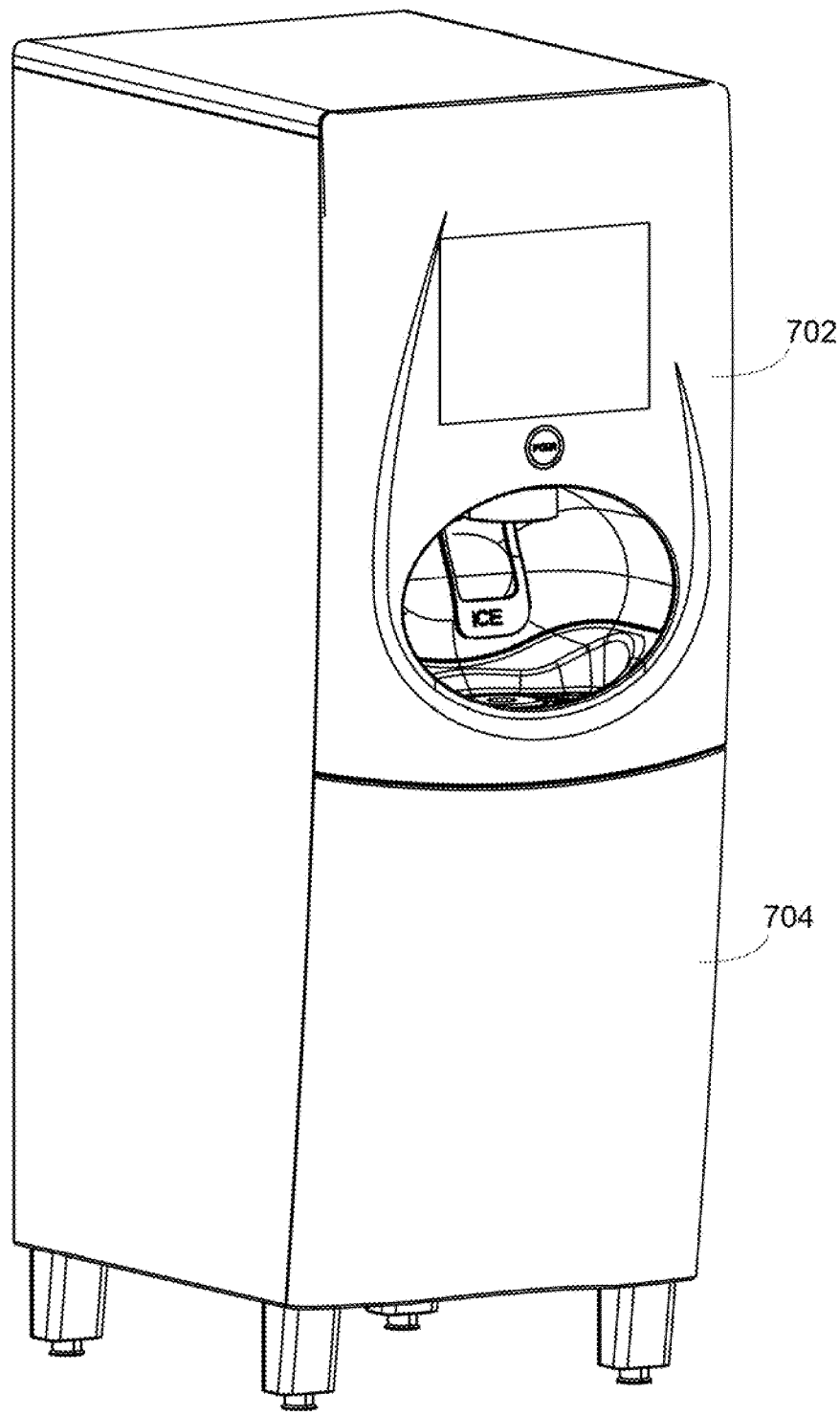
FIG. 14 is one embodiment of an isometric view of a housing assembly for housing the processing system of FIG. 1.

Specifically, FIGS. 11B1-11B2 are illustrative of the lines of magnetic flux produced by e.g., inductive loop assembly 508 without and with (respectively) e.g., split ring resonator assembly 568 at a 0 degree phase angle of e.g., carrier signal 512. FIGS. 11B3-11B4 are illustrative of the lines of magnetic flux produced by e.g., inductive loop assembly 508 without and with (respectively) e.g., split ring resonator assembly 568 at a 45 degree phase angle of e.g., carrier signal 512. FIGS. 11B5-11B6 are illustrative of the lines of magnetic flux produced by e.g., inductive loop assembly 508 without and with (respectively) e.g., split ring resonator assembly 568 at a 90 degree phase angle of e.g., carrier signal 512. FIGS. 11B7-11B8 are illustrative of the lines of magnetic flux produced by e.g., inductive loop assembly 508 without and with (respectively) e.g., split ring resonator assembly 568 at a 135 degree phase angle of e.g., carrier signal 512. FIGS. 11B9-11B10 are illustrative of the lines of magnetic flux produced by e.g., inductive loop assembly 508 without and with (respectively) e.g., split ring resonator assembly 568 at a 180 degree phase angle of e.g., carrier signal 512. FIGS. 11B11-11B12 are illustrative of the lines of magnetic flux produced by e.g., inductive loop assembly 508 without and with (respectively) e.g., split ring resonator assembly 568 at a 225 degree phase angle of e.g., carrier signal 512. FIGS. 11B13-11B14 are illustrative of the lines of magnetic flux produced by e.g., inductive loop assembly 508 without and with (respectively) e.g., split ring resonator assembly 568 at a 270 degree phase angle of e.g., carrier signal 512. FIGS. 11B15-11B16 are illustrative of the lines of magnetic flux produced by e.g., inductive loop assembly 508 without and with (respectively) e.g., split ring resonator assembly 568 at a 315 degree phase angle of e.g., carrier signal 512.

Figure 11C:
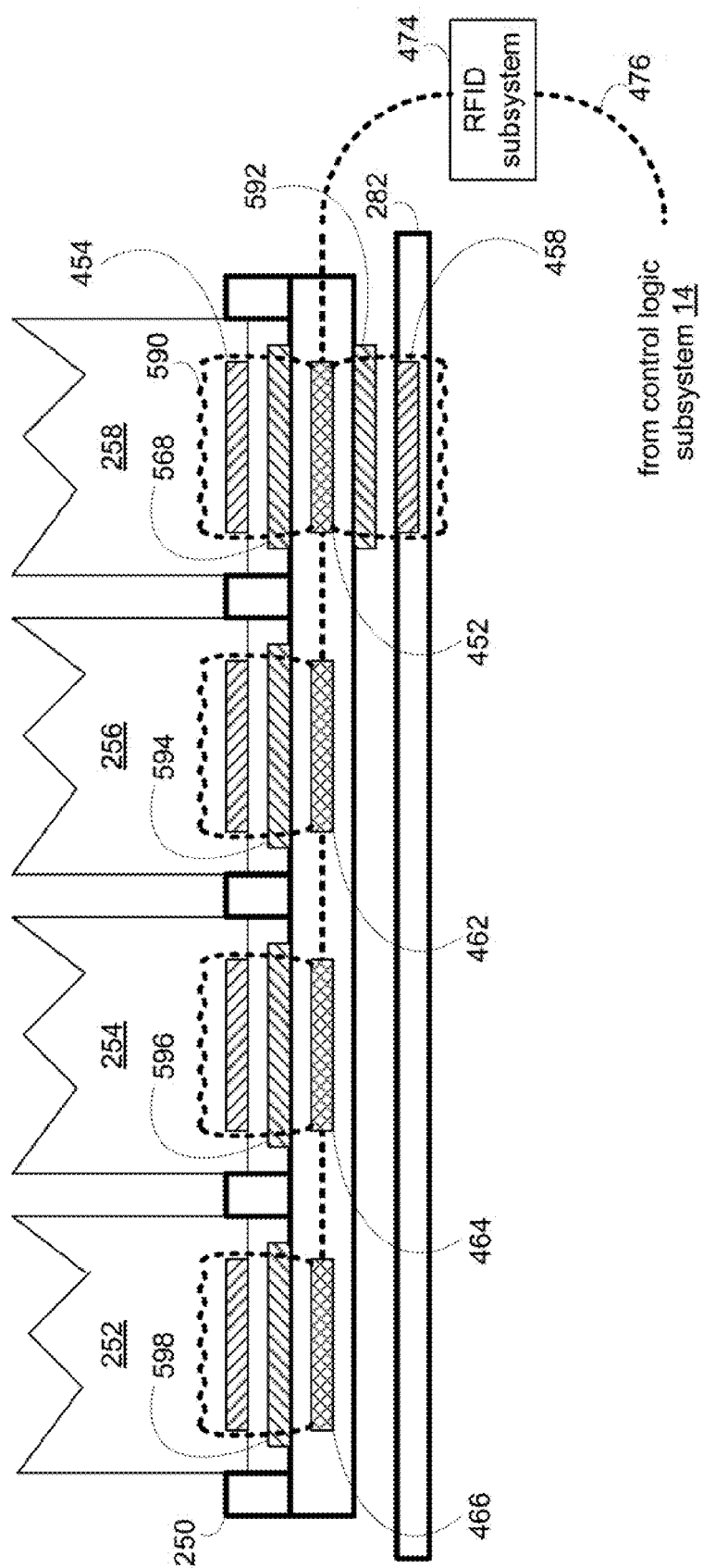
FIG. 11C is a diagrammatic view of one embodiment of the RFID system of FIG. 7 including one embodiment of the split ring resonators of FIG. 11 A.

Referring also to FIG. 11C, there is shown one exemplary implementation of the use of split ring resonators with RFID antenna assemblies. Specifically, product module assembly 250 is shown to include slots for four product containers (e.g., product containers 252, 254, 256, 258). Four RFID antenna assemblies (e.g., RFID antenna assemblies 452, 462, 464, 466) are affixed to product module assembly 250. One split ring resonator assembly (e.g., split ring resonator assembly 568) may be positioned above RFID antenna assembly 452 to focus the "upper portion" of the magnetic field generated by RFID antenna assembly 452 and define e.g., enhancement area 590. In this particular example, a split ring resonator assembly (e.g., split ring resonator assembly 592) may be positioned below RFID antenna assembly 452 to focus the "lower" portion of the magnetic field generated by RFID antenna assembly 452. Further, three additional split ring resonator assemblies split ring resonator assemblies 594, 596, 598) may be positioned above RFID antenna assemblies 462, 464, 466 to focus the "upper portion" of the respective magnetic fields generated by RFID antenna assemblies 462, 464, 466 and define the respective enhancement area associated with each RFID antenna assembly. In some embodiments, a single split ring resonator may be used rather than the two shown in FIG. 11C. In embodiments using a single split ring resonator, the split ring resonator may be positioned either above or below the RFID antenna assembly.

Figure 12A:
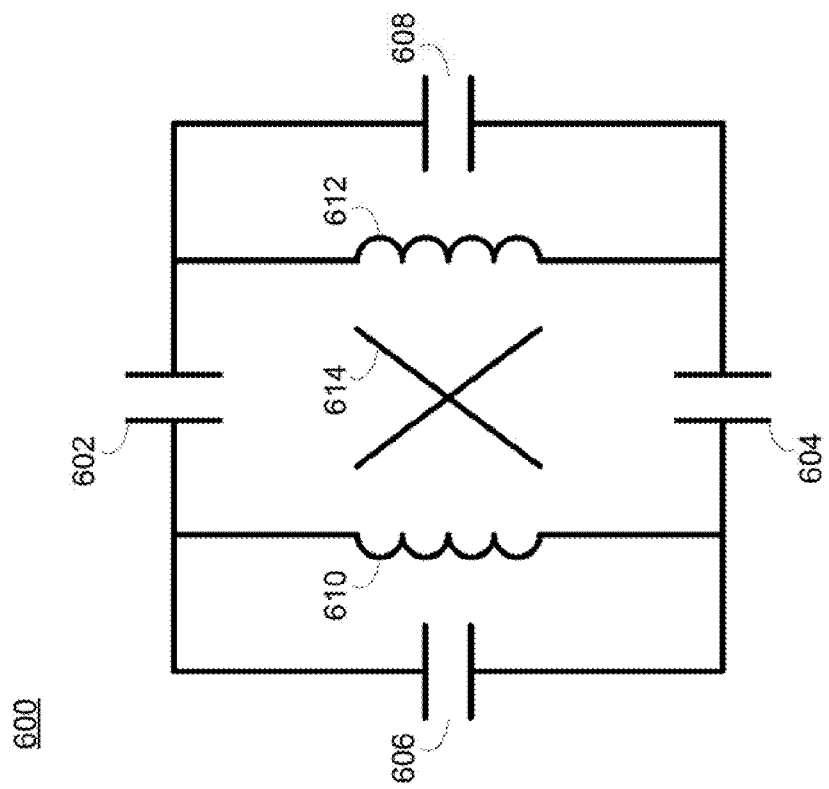
FIG. 12A is one embodiment of a schematic diagram of an equivalent circuit of the split ring resonator of FIG. 11 A.

Referring also to FIG. 12A, when configuring split ring resonator assembly 568, split ring resonator assembly 568 may be modeled as L-C tank circuit 600. For example, capacitor assemblies 602, 604 may be representative of the capacitance of the spacing "x" (FIG. 11 A) between the rings 570, 572. Capacitor assemblies 606, 608 may be representative of the capacitance of gaps 574, 576 (respectively). Inductor assemblies 610, 612 may be representative of the inductances of rings 570 572 (respectively). Further, mutual inductance coupling 614 may be representative of the mutual inductance coupling between rings 570, 572. Accordingly, the values of capacitor assemblies 602, 604, 606, 608, inductor assemblies 610, 612, and mutual inductance coupling 614 may be chosen so that split ring resonator assembly 568 has the desired resonant frequency.

In a preferred embodiment, the width of spacing "x" is 0.20 inches, the width of gap 574 is 0.20 inches, the width of gap 576 is 0.20 inches, the width "y" (FIG. 11 A) of ring 570 is 0.20 inches, and the width "z" (FIG. 11 A) of ring 572 is 0.20 inches. Further, in a preferred embodiment, capacitor assembly 602 may have a value of approximately 1.00 picofarads, capacitor assembly 604 may have a value of approximately 1.00 picofarads, capacitor assembly 606 may have a value of approximately 1.00 picofarads, capacitor assembly 608 may have a value of approximately 1.00 picofarads, inductor assembly 610 may have a value of approximately 1.00 milli-Henry, inductor assembly 612 may have a value of approximately 1.00 milliHenry, and mutual inductance coupling 614 may have a value of 0.001. In some embodiments, the inductor assembly 610 may have a value of approximately 5 nano-Henry, however, in various embodiments, this value the inductor assembly 610 may different values than those stated herein.

As discussed above, it may be desirable to set the resonant frequency of split ring resonator assembly 568 to be slightly above (e.g., 5-10% greater) than the frequency of carrier signal 512 (i.e., the carrier signal that energizes inductive loop assembly 508). Referring also to FIG. 12B, there is shown varactor tuning circuit 650 that is configured to allow for e.g., tuning of the resonant frequency/varying the phase shift/modulating response characteristics/changing the quality factor of split ring resonator assembly 568. For example, varactor tuning circuit 650 may be positioned within gaps 574, 576 of rings 570, 572 (respectively) and may include one or more varactor diodes 652, 654 (e.g., MDT MV20004), coupled anode to anode, in series with one or two capacitors (e.g., capacitors 656, 658). In a typical embodiment, capacitors 656, 658 may have a value of approximately 10 picofarads. A pair of resistor assemblies (e.g., 660, 662) may tie the cathodes of varactor diodes 652, 654 (respectively) to ground 664, and inductor assembly 666 may supply a negative voltage (produced by generator 668) to the anodes of varactor diodes 652, 654. In a typical embodiment, resistor assemblies 660, 662 may have a value of approximately 100K ohms, inductor assembly 666 may have a value of approximately 20-300 nanoHenry (with a range of typically 100-200 nano-Henry), and generator 668 may have a value of approximately –2.5 volts. If varactor tuning circuit 650 is configured to include a varactor diode (e.g., varactor diode 652), varactor diode 654 and resistor assembly 662 may be removed for varactor tuning circuit 650 and capacitor 658 may be directly coupled to the anode of varactor diode 652 and inductor assembly 666.

While split ring resonator assembly 568 is shown to include a pair of generally circular rings namely rings 570, 572), this is for illustrative purposes only and is not intended to be a limitation of this disclosure. Specifically, the general shape of split ring resonator assembly 568 may be varied depending on the manner in which magnetic field 566 is to be focused or a shape fashioned to create left hand behavior in a desired footprint. Additionally, in some embodiments, the split ring resonator assembly 568 may include a single ring. Additionally, for example, if a generally circular enhancement area is desired, a split ring resonator assembly 568 having generally circular rings may be utilized. Alternatively, if a generally rectangular enhancement area is desired, a split ring resonator assembly 568 having generally rectangular rings may be utilized (as shown in FIG. 13A). Alternatively still, if a generally square enhancement area is desired, a split ring resonator assembly 568 having generally square rings may be utilized. Additionally, if a generally oval enhancement area is desired, a split ring resonator assembly 568 having generally oval rings may be utilized.

Further, the rings utilized within split ring resonator assembly 568 need not be smooth rings (as shown in FIG. 11A) and, depending on the application, may include non-smooth (e.g., corrugated) surfaces. An example of such a corrugated ring surface is shown in FIG. 13B.

Figure 15B:
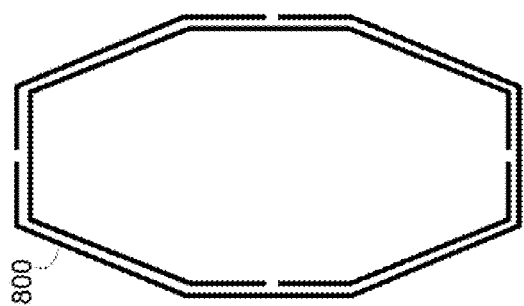
FIG. 15B is one embodiment of a diagrammatic view of a split ring resonator for use with the RFID access antenna assembly of FIG. 15A.
Figure 15A:
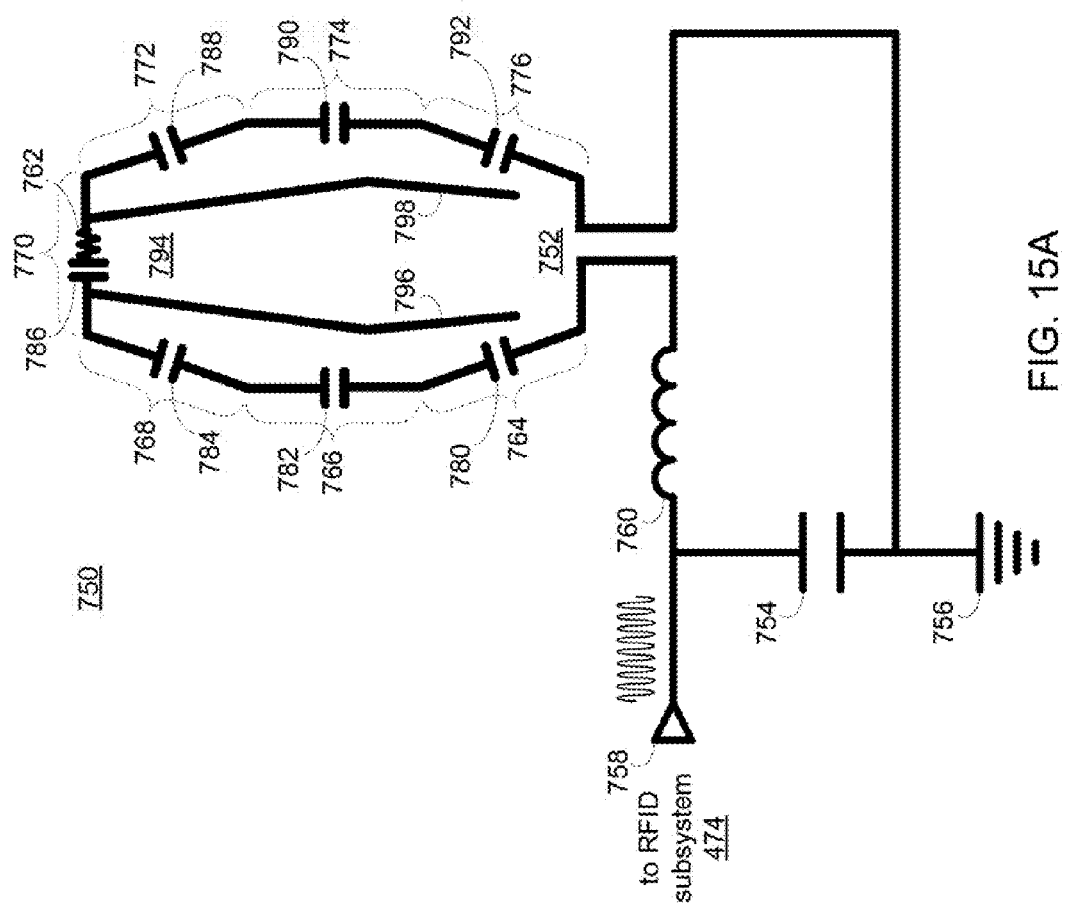
FIG. 15A is one embodiment of a diagrammatic view of an RFID access antenna assembly included within the processing system of FIG. 1.

Referring also to FIGS. 14 & 15A, processing system 10 may be incorporated into housing assembly 700. Housing assembly 700 may include one or more access doors/panels 702, 704 that e.g., allow for the servicing of processing system 10 and allow for the replacement of empty product containers (e.g., product container 258). For various reasons (e.g., security, safety, etc), it may be desirable to secure access doors/panels 702, 704 so that the internal components of processing system 10 can only be accessed by authorized personnel. Accordingly, the previously-described RFID subsystem (i.e., RFID subsystem 474) may be configured so that access doors/panels 702, 704 may only be opened if the appropriate RFID tag assembly is positioned proximate RFID antenna assembly 750. An example of such an appropriate RFID tag assembly may include an RFID tag assembly that is affixed to a product container (e.g., RFID tag assembly 454 that is affixed to product container 258).

RFID antenna assembly 750 may include multi-segment inductive loop assembly 752. A first matching component 754 (e.g., a 5.00 pF capacitor) may be coupled between ground 756 and port 758 that may energize RFID antenna assembly 750. A second matching component 760 (e.g., a 16.56 nanoHenries inductor) may be positioned between port 758 and multi-segment inductive loop assembly 752. Matching components 754, 760 may adjust the impedance of multi-segment inductive loop assembly 752 to a desired impedance (e.g., 50.00 Ohms). Generally, matching components 754, 760 may improve the efficiency of RFID antenna assembly 750.

Optionally, RFID antenna assembly 750 may include a reduction in the Q factor of element 762 (e.g., a 50 Ohm resistor) that may be configured to RFID antenna assembly 750 to be utilized over a broader range of frequencies. This may also allow RFID antenna assembly 750 to be used over an entire band and may also allow for tolerances within the matching network. For example, if the band of interest of RFID antenna assembly 750 is 50 MHz and reduction of Q factor element (also referred to herein as a "de-Qing element") 762 is configured to make the antenna 100 MHz wide, the center frequency of RFID antenna assembly 750 may move by 25 MHz without affecting the performance RFID antenna assembly 750. De-Qing element 762 may be positioned within multi-segment inductive loop assembly 752 or positioned somewhere else within MD antenna assembly 750.

As discussed above, by utilizing a comparatively small inductive loop assembly (e.g., inductive loop assembly 508 of FIGS. 9 & 10), far field performance of an antenna assembly may be reduced and near field performance may be enhanced. Unfortunately, when utilizing such a small inductive loop assembly, the depth of the detection range of the RFID antenna assembly is also comparatively small (e.g., typically proportional to the diameter of the loop). Therefore, to obtain a larger detection range depth, a larger loop diameter may be utilized. Unfortunately and as discussed above, the use of a larger loop diameter may result in increased far field performance, and a reduction in near field performance.

Accordingly, multi-segment inductive loop assembly 752 may include a plurality of discrete antenna segments (e.g., antenna segments 764, 766, 768, 770, 772, 774, 776), with a phase shift element (e.g., capacitor assemblies 780, 782, 784, 786, 788, 790, 792). Examples of capacitor assemblies 780, 782, 784, 786, 788, 790, 792 may include 1.0 pF capacitors or varactors (e.g., voltage variable capacitors) for example, 0.1-250 pF varactors. The above-described phase shift element may be configured to allow for the adaptive controlling of the phase shift of multi-segment inductive loop assembly 752 to compensate for varying conditions; or for the purpose of modulating the characteristics of multi-segment inductive loop assembly 752 to provide for various inductive coupling features and/or magnetic properties. An alternative example of the above-described phase shift element is a coupled line (not shown).

As discussed above, by maintaining the length of an antenna segment below 25% of the wavelength of the carrier signal energizing RFID antenna assembly 750, the amount of energy radiated outward by the antenna segment will be reduced, field performance will be compromised, and near field performance will be enhanced. Accordingly each of antenna segments 764, 766, 768, 770, 772, 774, 776 maybe sized so that they are no longer than 25% of the wavelength of the carrier signal energizing RFID antenna assembly 750. Further, by properly sizing each of capacitor assemblies 780, 782, 784, 786, 788, 790, 792, any phase shift that occurs as the carrier signal propagates around multi-segment inductive loop assembly 752 may be offset by the various capacitor assemblies incorporated into multi-segment inductive loop assembly 752. Accordingly, assume for illustrative purposes that for each of antenna segments 764, 766, 768, 770, 772, 774, 776, a 90° phase shift occurs. Accordingly, by utilizing properly sized capacitor assemblies 780, 782, 784, 786, 788, 790, 792, the 90° phase shift that occurs during each segment may be reduced/eliminated. For example, for a carrier signal frequency of 915 MHz and an antenna segment length that is less than 25% (and typically 10%) of the wavelength of the carrier signal, a 1.2 pF capacitor assembly may be utilized to achieve the desired phase shift cancellation, as well as tune segment resonance.

As discussed above, by utilizing comparatively short antenna segments (e.g., antenna segments 764, 766, 768, 770, 772, 774, 776) that are no longer than 25% of the wavelength of the carrier signal energizing RFID antenna assembly 750, far field performance of antenna assembly 750 may be reduced and near field performance may be enhanced.

If a higher level of far field performance is desired from RFID antenna assembly 750, RFID antenna assembly 750 may include far field antenna assembly 794 (e.g., a dipole antenna assembly) electrically coupled to a portion of multi-segment inductive loop assembly 752. Far field antenna assembly 794 may include first antenna portion 796 (i.e., forming the first portion of the dipole) and second antenna portion 798 forming the second portion of the dipole). As discussed above, by maintaining the length of antenna segments 764, 766, 768, 770, 772, 774, 776 below 25% of the wavelength of the carrier signal, far field performance of antenna assembly 750 may be reduced and near field performance may be enhanced. Accordingly, the sum length of first antenna portion 796 and second antenna portion 798 may be greater than 25% of the wavelength of the carrier signal, thus allowing for an enhanced level of far field performance.

While multi-segment inductive loop assembly 752 is shown as being constructed of a plurality of linear antenna segments coupled via miter joints, this is for illustrative purposes only and is not intended to be a limitation of this disclosure. For example, a plurality of curved antenna segments may be utilized to construct multi-segment inductive loop assembly 752. Additionally, multi-segment inductive loop assembly 752 may be configured to be any loop-type shape. For example, multi-segment inductive loop assembly 752 may be configured as an oval (as shown in FIG. 15A), a circle, a square, a rectangle, or an octagon.

As discussed above, split ring resonator assembly 568 (FIG. 11A) or a plurality of split ring resonator assemblies may be positioned (with respect to inductive loop assembly 508, FIG. 11A) so that split ring resonator assembly 568 (FIG. 11A) may be magnetically coupled to inductive loop assembly 508 (FIG. 11A) and at least a portion of the magnetic field (as represented by arrow 566, FIG. 11A) generated by inductive loop assembly 508 (FIG. 11A) may be focused to further reduce the possibility of reading e.g., product containers positioned within adjacent slot assemblies. Such a split ring resonator assembly may be utilized with the above-described multi-segment inductive loop assembly 752 to focus the magnetic field generated by multi-segment inductive loop assembly 752. An example of a split ring resonator assembly 800 configured to be utilized with multi-segment inductive loop assembly 752 is shown in FIG. 15B. The quantity of gaps included within split ring resonator 800 may be varied to tune split ring resonator 800 to the desired resonant frequency.

Similar to the discussion of split ring resonator assembly 568, the shape of split ring resonator 800 may be varied depending on the manner in which the magnetic field produced by multi-segment inductive loop assembly 752 is to be focused. For example, if a generally circular enhancement area is desired, a split ring resonator assembly 800 having generally circular rings may be utilized. Alternatively, if a generally rectangular enhancement area is desired, a split ring resonator assembly 800 having generally rectangular rings may be utilized. Alternatively still, if a generally square enhancement area is desired, a split ring resonator assembly 800 having generally square rings may be utilized. Additionally, if a generally oval enhancement area is desired, a split ring resonator assembly 800 having generally oval rings may be utilized (as shown in FIG. 15B).

Eddy Current Trap

Referring now to FIGS. 18A and 18B, a board 1100 is shown with two loop antennas 1102, 1104 and an Eddy Current Trap 1106 therebetween. FIG. 18B shows an electrical schematic of one embodiment of the Eddy Current Trap 1106. The Eddy Current Trap 1106 may include a ground plane 1110, a de-Qing resistor 1112, a capacitive gap 1114 and an inductive trace 1108.

In some embodiments of the various embodiments of the antenna, in between two loop antennas 1102, 1104, an Eddy Current Trap 1106 may be installed/positioned. Thus, in some embodiments, an Eddy Current Trap 1106 may be installed/positioned at a predetermined distance from the loop antennas 1102, 1104. An Eddy Current Trap 1106 is a resonant tank circuit that absorbs electromagnetic field patterns from the loop antennas 1102, 1104. In some embodiments, the Eddy Current Trap 1106 may be implemented either in lumped element or distributed components, or a combination of the two. The Eddy Current Trap 1106 may be used to improve the isolation between the loop antennas 1102, 1104. In some embodiments, as shown in FIG. 19, at least one split ring resonator 1116, 1118 may be printed on the opposite side of the board shown in FIG. 18. However, in some embodiments, the at least one split ring resonator 1116, 1118 may be printed on a separate board.

In some embodiments, as in the embodiment shown in FIG. 19, the split ring resonator 1116, 1118 is a single ring. However, in other embodiments, the split ring resonator 1116, 1118 may be any of the embodiments of split ring resonators described herein. In some embodiments, one or more de-Qing elements 1112 may be used to improve broadband response.

Figure 20A:
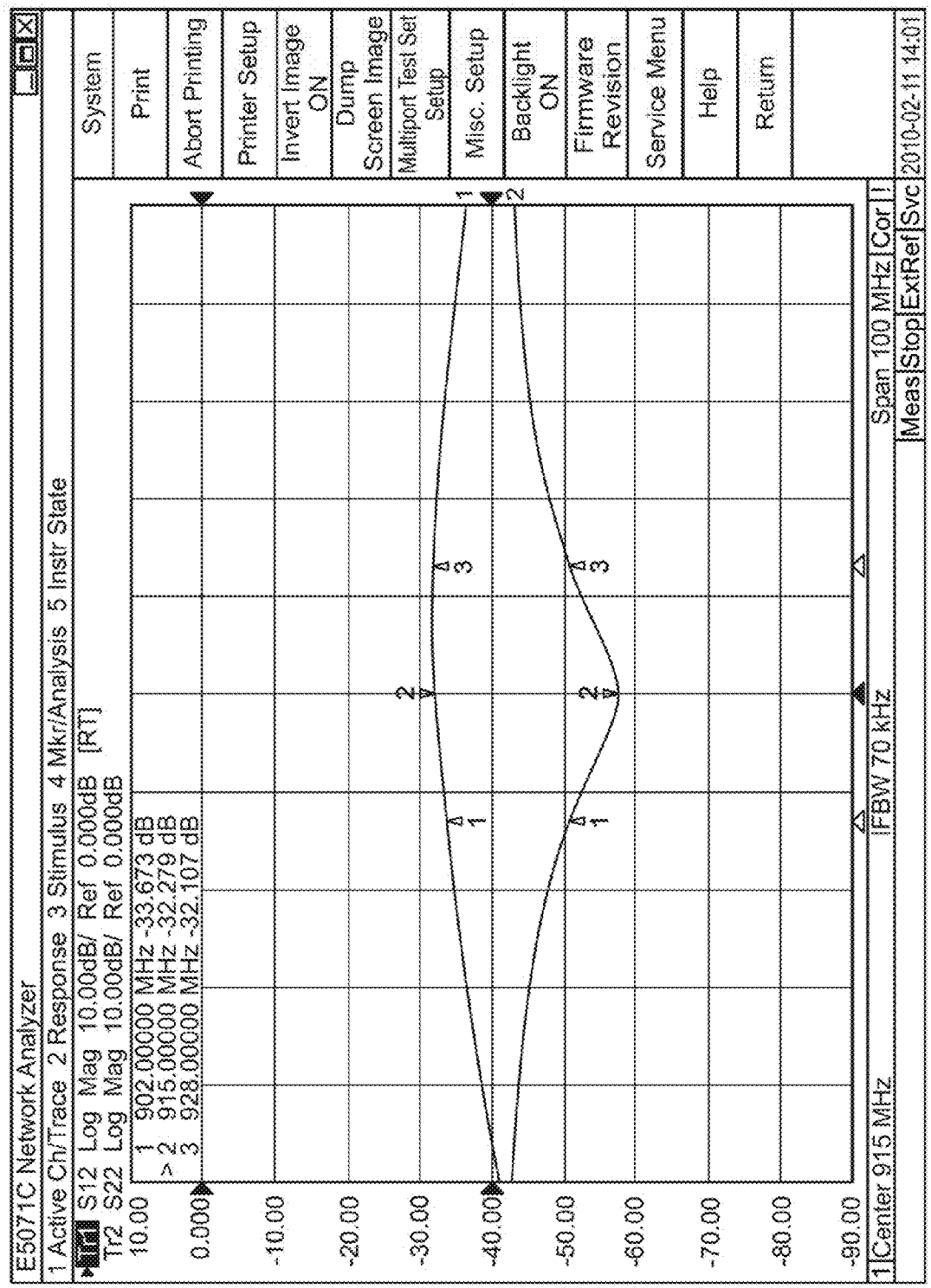
FIGS. 20A-20G show testing results showing two loop antennas, according to one embodiment, with and without an Eddy Current Trap, according to one embodiment, installed.
Figure 20B:
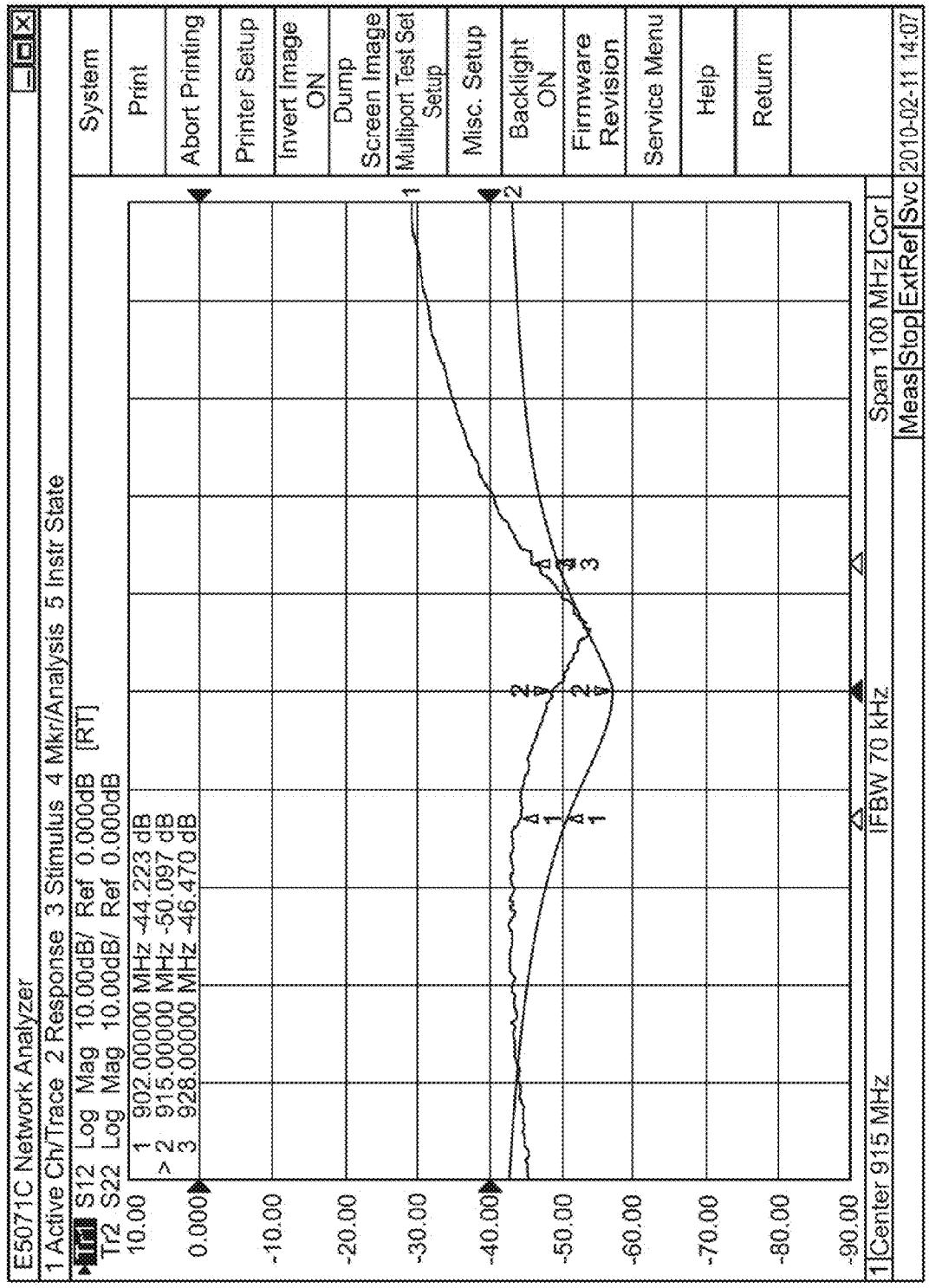
Figure 20C:
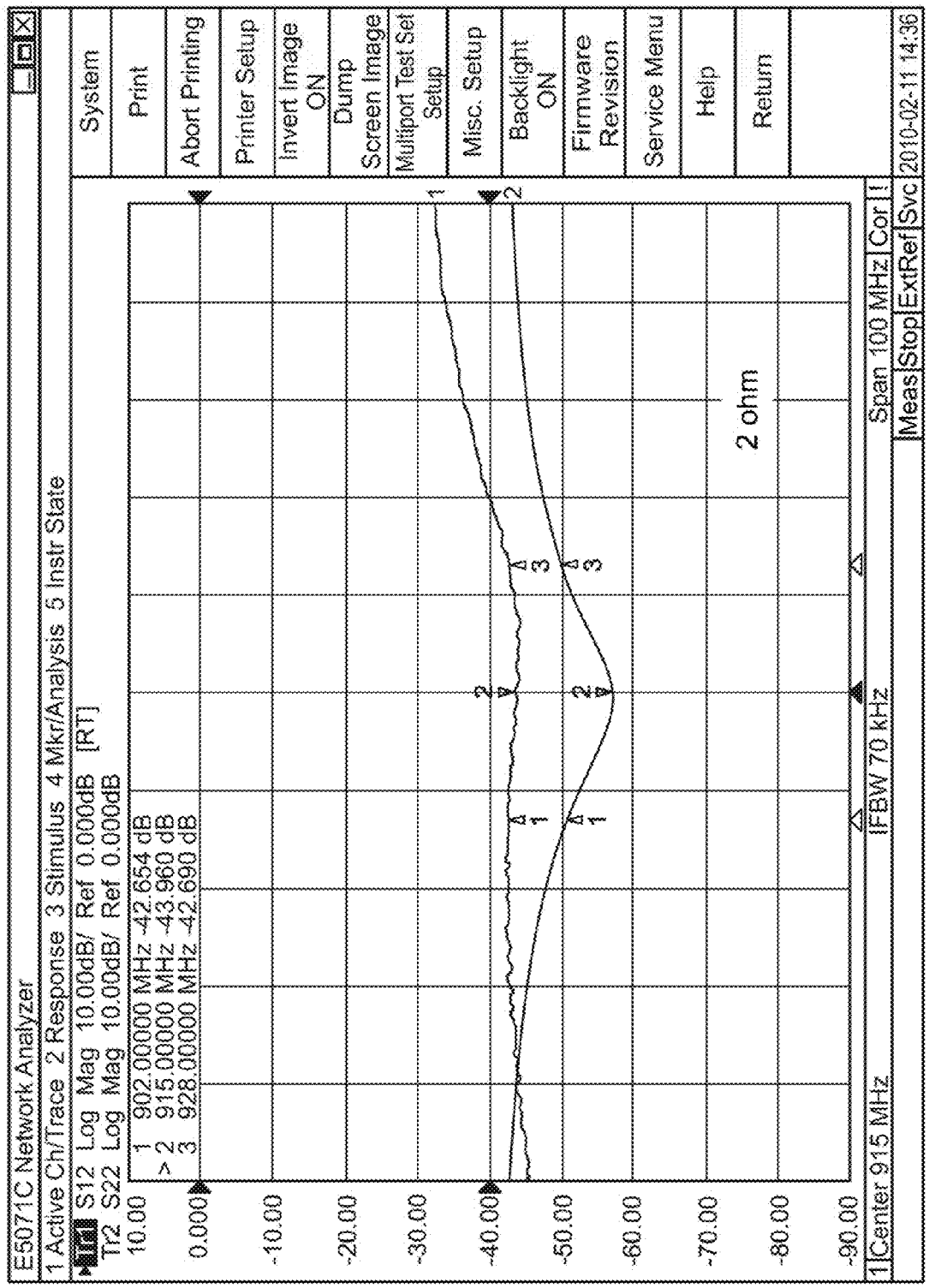
Figure 20D:
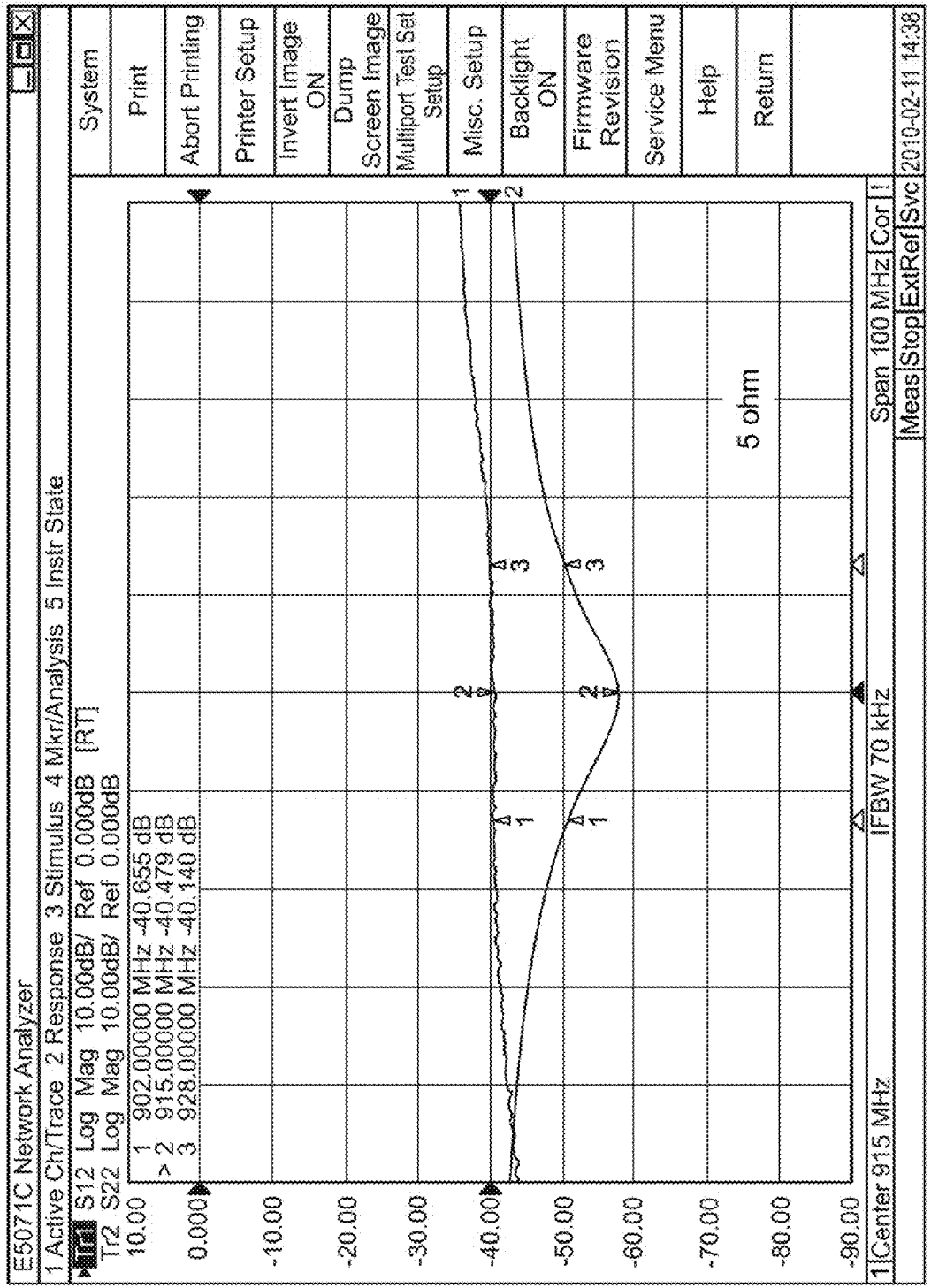
Figure 20E:
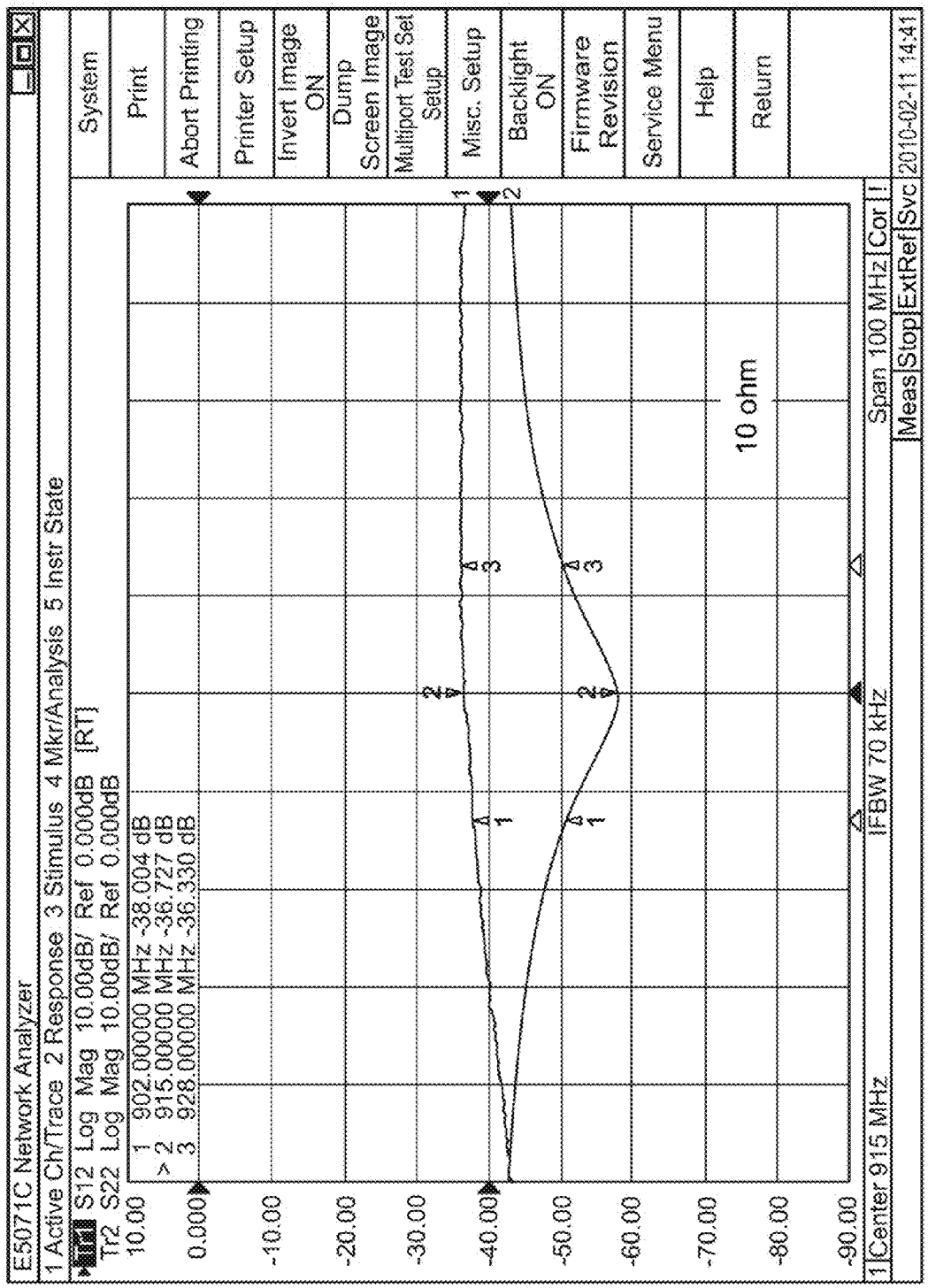
Figure 20F:
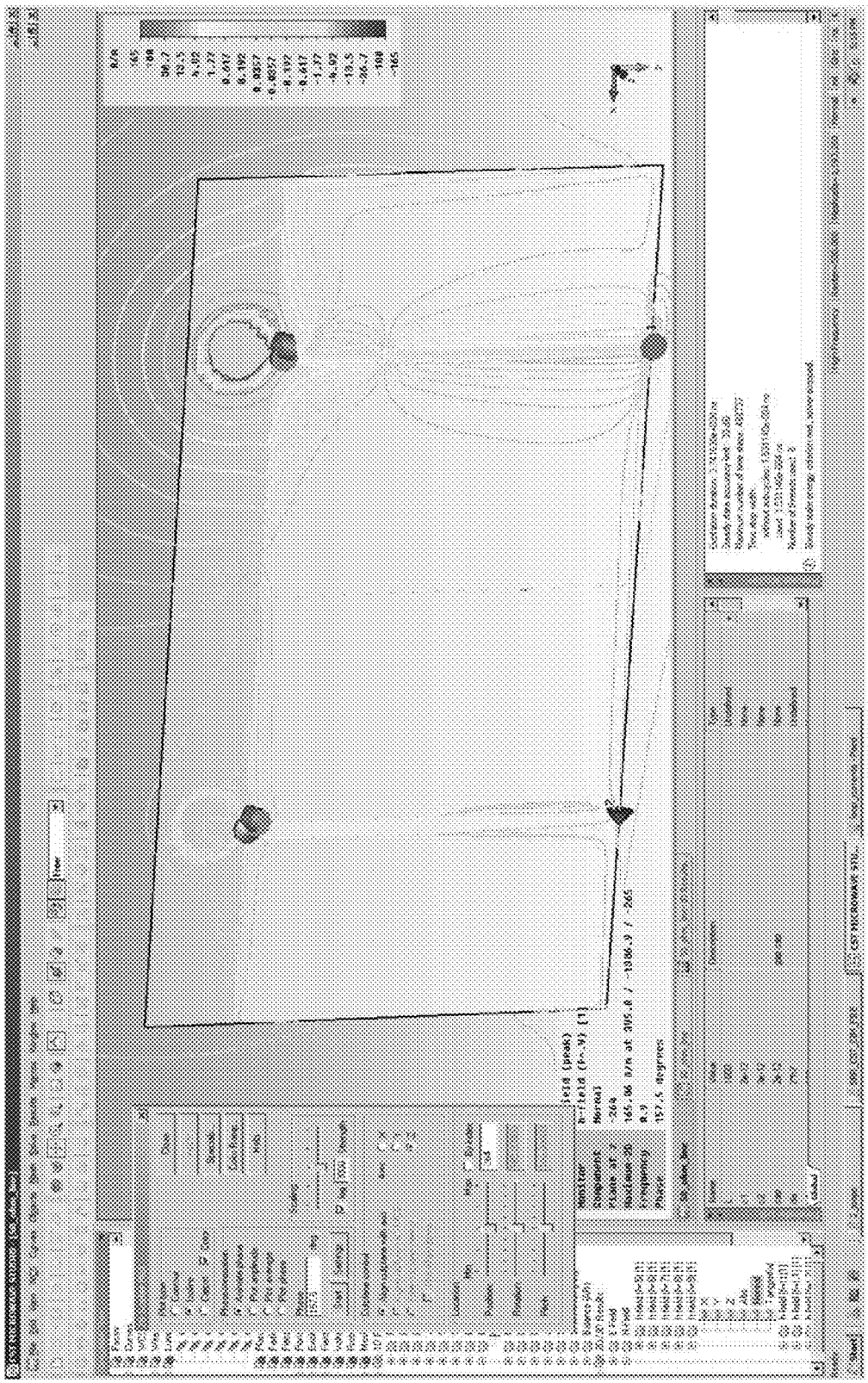
Figure 20G:
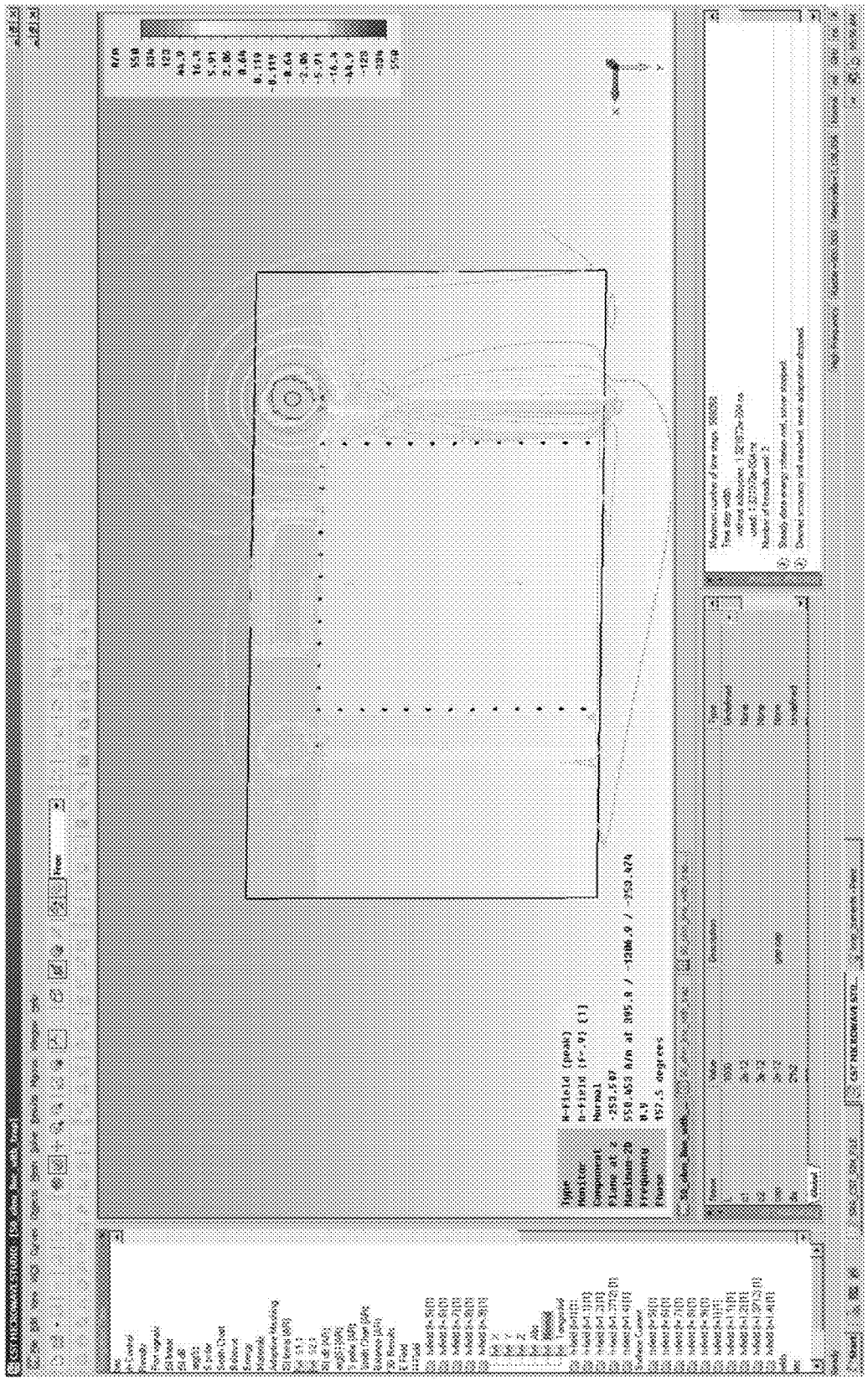

Referring now to FIGS. 20A-20E, various results are shown. FIG. 20A, a reference calibration is shown. This is a calibration showing the isolation between the two loop antennas, according to one embodiment. In FIG. 20B, an Eddy Current Trap has been installed and the isolation between the two loop antennas is measured. FIG. 20B shows the improvement in isolation between the two loop antennas. In FIGS. 20C-20E, various De-Qing resistors were installed (e.g., a 2 ohm, FIG. 20C, 5 ohm, 20D and 10 ohm, 20E resistor respectively) and an improved broadband response is shown. In FIG. 20F, results from an electromagnetic simulation are shown. A 3D plot of a 2D plane is shown. This shows the magnetic field currents in amps per meter. The plots show the amount of energy trapped in the Eddy Current Trap. The results show a comparison with and without the Eddy Current Trap. Finally, FIG. 20E-20G show resulting isoline plots from electromagnetic simulations performed and shows the amount of energy trapped in the Eddy Current Trap, see FIG. 20G, whereas FIG. 20F is the result without an Eddy Current Trap.

Figure 21:
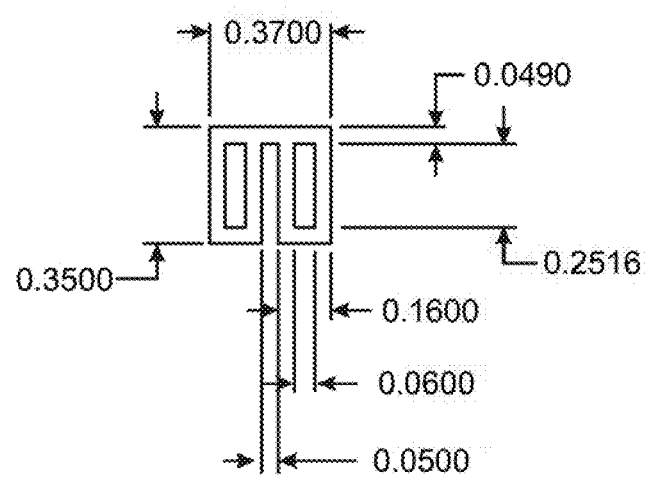
FIG. 21 shows one embodiment of a loop antenna.

Referring now to FIG. 21, another embodiment of a loop antenna is shown. This embodiment of the loop antenna may be used with any of the various systems described herein. The loop antenna shown in FIG. 21 is one embodiment of a loop antenna and various embodiments may vary.

Figure 16B:
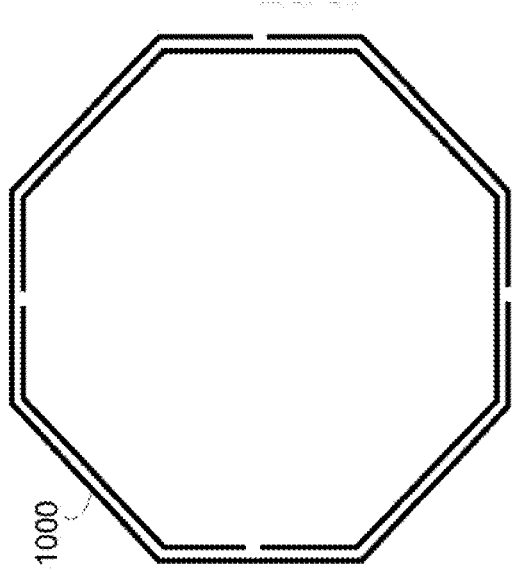
FIG. 16B is a preferred embodiment of a diagrammatic view of a split ring resonator for use with the RFID access antenna assembly of FIG. 16 A.
Figure 16A:
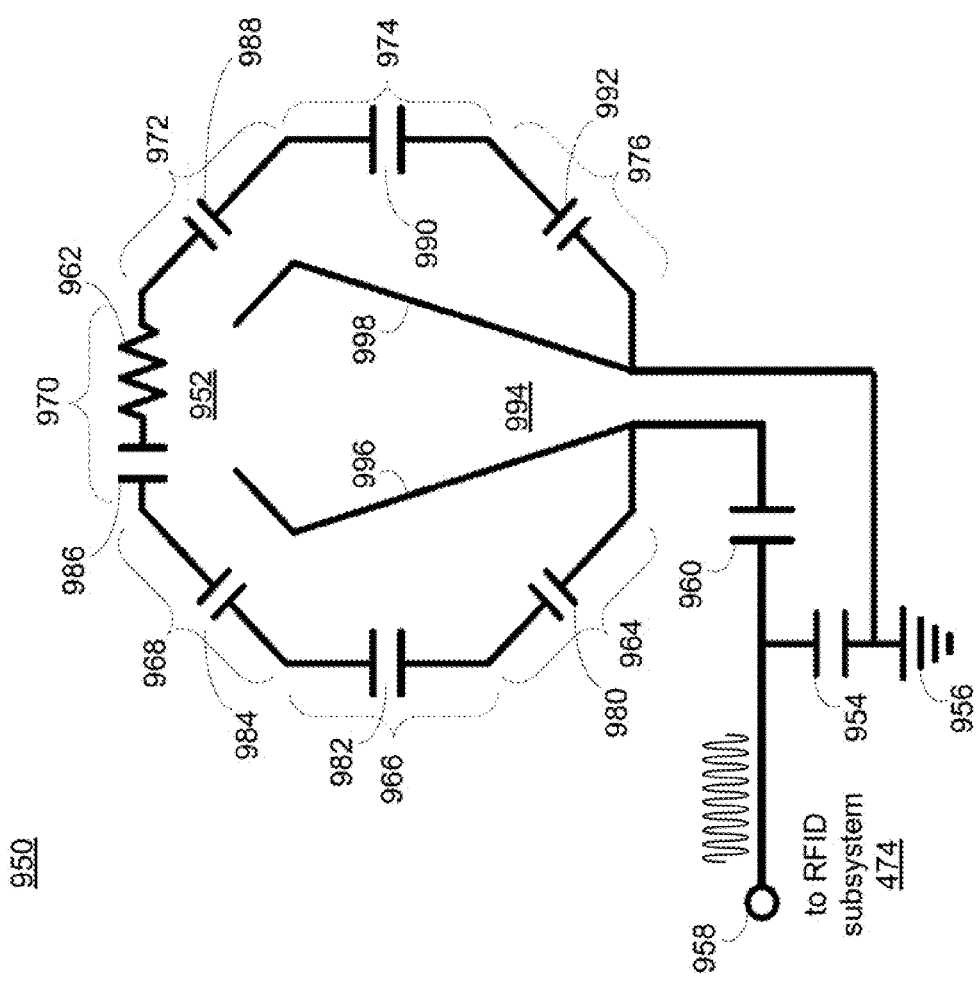
FIG. 16A is a preferred embodiment of a diagrammatic view of the RFID access antenna assembly of FIG. 15 A.
Figure 17:
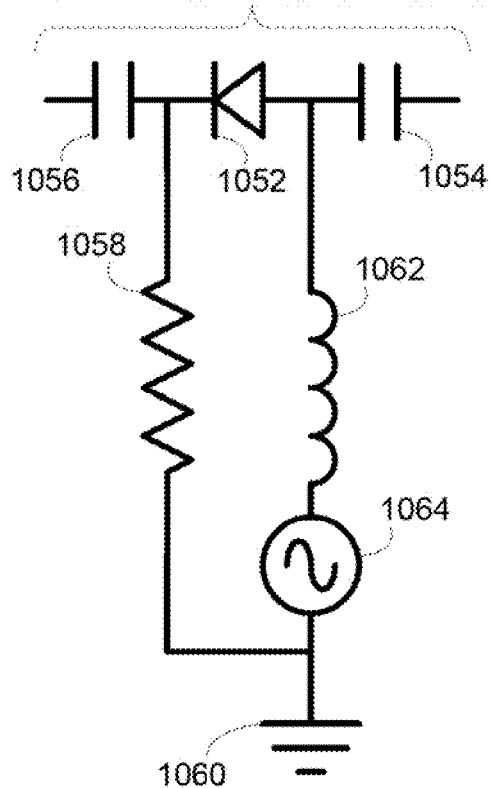
FIG. 17 is one embodiment of a schematic diagram of a tuning circuit for use with the RFID access antenna assembly of FIGS. 15A & 15B.

Referring also to FIG. 16A, there is shown a preferred embodiment RFID antenna assembly 950 that may be configured to effectuate the opening of access doors/panels 702, 704 (FIG. 14).

RFID antenna assembly 950 may include multi-segment inductive loop assembly 952. A first matching component 954 (e.g., a 5.00 pF capacitor) may be coupled between ground 956 and port 958 that may energize RFID antenna assembly 950. A second matching component 960 (e.g., a 5.00 pF capacitor) may be positioned between port 958 and multi-segment inductive loop assembly 952. Matching components 954, 960 may adjust the impedance of multi-segment inductive loop assembly 952 to a desired impedance (e.g., 50.00 Ohms). Generally, matching components 954, 960 may improve the efficiency of RFID antenna assembly 950.

RFID antenna assembly 950 may include resistive element 962 (e.g., a 50 Ohm resistor) that may be configured to tune RIM antenna assembly 750. Resistive element 962 may be positioned within multi-segment inductive loop assembly 952 or positioned somewhere else within RFID antenna assembly 950.

Multi-segment inductive loop assembly 952 may include a plurality of discrete antenna segments (e.g., antenna segments 964, 966, 968, 970, 972, 974, 976), with a phase shift element (e.g., capacitor assemblies 980, 982, 984, 986, 988, 990, 992). Examples of capacitor assemblies 980, 982, 984, 986, 988, 990, 992 may include 1.0 pF capacitors or varactors (e.g., voltage variable capacitors) for example, 0.1-250 pF varactors. The above-described phase shift element may be configured to allow for the adaptive controlling of the phase shift of multi-segment inductive loop assembly 952 to compensate for varying conditions; or for the purpose of modulating the characteristics of multi-segment inductive loop assembly 952 to provide for various inductive coupling features and/or magnetic properties. In some embodiments, an alternative example of the above-described phase shift element may be a coupled line shown).

As discussed above, by maintaining length of an antenna segment below 25% of the wavelength of the carrier signal energizing RFID antenna assembly 750, the amount of energy radiated outward by the antenna segment will be reduced, far field performance will be compromised, and near field performance will be enhanced. Accordingly each of antenna segments 964, 966, 968, 970, 972, 974, 976 may be sized so that they are no longer than 25% of the wavelength of the carrier signal energizing RFID antenna assembly 950. Further, by properly sizing each of capacitor assemblies 980, 982, 984, 986, 988, 990, 992, any phase shift that occurs as the carrier signal propagates around multi-segment inductive loop assembly 952 may be offset by the various capacitor assemblies incorporated into multi-segment inductive loop assembly 952. Accordingly, assume for illustrative purposes that for each of antenna segments 964, 966, 968, 970, 972, 974, 976, a 90° phase shift occurs. Accordingly, by utilizing properly sized capacitor assemblies 980, 982, 984, 986, 988, 990, 992, the 90° phase shift that occurs during each segment may be reduced/eliminated. For example, for a carrier signal frequency of 915 MHz and an antenna segment length that is less than 25% (and typically 10%) of the wavelength of the carrier signal, a 1.2 pF capacitor assembly may be utilized to achieve the desired phase shift cancellation, as well as tune segment resonance.

As discussed above, by utilizing comparatively short antenna segments (e.g., antenna segments 964, 966, 968, 970, 972, 974, 976) that are no longer than 25% of the wavelength of the carrier signal energizing RFID antenna assembly 950, far field performance of antenna assembly 950 may be reduced and near field performance may be enhanced.

If a higher level of far field performance is desired from RFID antenna assembly 950, RFID antenna assembly 950 may include far field antenna assembly 994 (e.g., a dipole antenna assembly) electrically coupled to a portion of multi-segment inductive loop assembly 952. Far field antenna assembly 994 may include first antenna portion 996 (i.e., forming the first portion of the dipole) and second antenna portion 998 (i.e., forming the second portion of the dipole). As discussed above, by maintaining the length of antenna segments 964, 966, 968, 970, 972, 974, 976 below 25% of the wavelength of the carrier signal, far field performance of antenna assembly 950 may be reduced and near field performance may be enhanced. Accordingly, the sum length of first antenna portion 996 and second antenna portion 998 may be greater than 25% of the wavelength of the carrier signal, thus allowing for an enhanced level of far field performance.

While multi-segment inductive loop assembly 952 is shown as being constructed of a plurality of linear antenna segments coupled via miter joints, this is for illustrative purposes only and is not intended to be a limitation of this disclosure. For example, a plurality of curved antenna segments may be utilized to construct multi-segment inductive loop assembly 952. Additionally, multi-segment inductive loop assembly 952 may be configured to be any loop-type shape. For example, multi-segment inductive loop assembly 952 may be configured as an octagon (as shown in FIG. 16A), a circle, a square, a rectangle, or an octagon.

As discussed above, split ring resonator assembly 568 (FIG. 11 A) or a plurality of split ring resonator assemblies may be positioned (with respect to inductive loop assembly 508, FIG. 11 A) so that split ring resonator assembly 568 (FIG. 11 A) may be magnetically coupled to inductive loop assembly 508 (FIG. 11 A) and at least a portion of the magnetic field (as represented by arrow 566, FIG. 11 A) generated by inductive loop assembly 508 (FIG. 11 A) may be focused to further reduce the possibility of reading e.g., product containers positioned within adjacent slot assemblies. Such a split ring resonator assembly may be utilized with the above-described multi-segment inductive loop assembly 952 to focus the magnetic field generated by multi-segment inductive loop assembly 952. An example of a split ring resonator assembly 1000 configured to be utilized with multi-segment inductive loop assembly 952 is shown in FIG. 16B. The quantity of gaps included within split ring resonator 1000 may be varied to tune split ring resonator 1000 to the desired resonant frequency. As discussed above, it may be desirable to set the resonant frequency of split ring resonator assembly 1000 to be slightly above (e.g., 5-10% greater) than the frequency of carrier signal 512 (i.e., the carrier signal that energizes inductive loop assembly 952). Referring also to FIG. 12B, there is shown varactor tuning circuit 650 that is configured to allow for e.g., tuning of the resonant frequency/varying the phase shift/modulating response characteristics/changing the quality factor of split ring resonator assembly 1000. For example, varactor tuning circuit 650 may be positioned within gaps of rings, shown in resonator 1000, and may include one or more varactor diodes 652, 654 (e.g., NIDT MV20004), coupled anode to anode, in series with one or two capacitors (e.g., capacitors 656, 658). In a typical embodiment, capacitors 656, 658 may have a value of approximately 10 picofarads. A pair of resistor assemblies (e.g., 660, 662) may tie the cathodes of varactor diodes 652, 654 (respectively) to ground 664, and inductor assembly 666 may supply a negative voltage (produced by generator 668) to the anodes of varactor diodes 652, 654. In a typical embodiment, resistor assemblies 660, 662 may have a value of approximately 100K ohms, inductor assembly 666 may have a value of approximately 20-300 nanoHenry (with a range of typically 100-200 nanoHenry), and generator 668 may have a value of approximately −2.5 volts. If varactor tuning circuit 650 is configured to include a single varactor diode (e.g., varactor diode 652), varactor diode 654 and resistor assembly 662 may be removed for varactor tuning circuit 650 and capacitor 658 may be directly coupled to the anode of varactor diode 652 and inductor assembly 666.

While the system is described above as having the RFID tag assembly (e.g., RFID tag assembly 454) that is affixed to the product container (e.g., product container 258) positioned above the RFID antenna assembly (e.g., RFID antenna assembly 452), which is positioned above the RFID tag (e.g., RFID tag assembly 458) that is affixed to bracket assembly 282, this for illustrative purposes only and is not intended to be a limitation of this disclosure, as other configurations are possible. For example, the RFID tag assembly (e.g., RFID tag assembly 454) that is affixed to the product container (e.g., product container 258) may be positioned below the RFID antenna assembly (e.g., RFID antenna assembly 452), which may be positioned below the RFID tag (e.g., RFID tag assembly 458) that is affixed to bracket assembly 282.

While the various electrical components, mechanical components, electromechanical components, and software processes are described above as being utilized within a processing system that dispenses beverages, this is for illustrative purposes only and is not intended to be a limitation of this disclosure, as other configurations are possible. For example, the above-described processing system may be utilized for processing/dispensing other consumable products (e.g., ice cream and alcoholic drinks). Additionally, the above-described system may be utilized in areas outside of the food industry. For example, the above-described system may be utilized for processing/dispensing: vitamins; pharmaceuticals; medical products, cleaning products; lubricants; painting/staining products; and other non-consumable liquids/semi liquids/granular solids and/or fluids.

As discussed above, the various electrical components, mechanical components, electro-mechanical components, and software processes of processing system 10 may be used in any machine in which on-demand creation of a product from one or more substrates (also referred to as "ingredients") is desired.

In the various embodiments, the product is created following a recipe that is programmed into the processor. As discussed above, the recipe may be updated, imported or changed by permission. A recipe may be requested by a user, or may be preprogrammed to be prepared on a schedule. The recipes may include any number of substrates or ingredients and the product generated may include any number of substrates or ingredients in any concentration desired.

The substrates used may be any fluid, at any concentration, or, any powder or other solid that may be reconstituted either while the machine is creating the product or before the machine creates the product (i.e., a "batch" of the reconstituted powder or solid may be prepared at a specified time in preparation for metering to create additional products or dispensing the "batch" solution as a product). In various embodiments, two or more substrates may themselves be mixed in one manifold, and then metered to another manifold to mix with additional substrates.

Thus, in various embodiments, on demand, or prior to actual demand but at a desired time, a first manifold of a solution may be created by metering into the manifold, according to the recipe, a first substrate and at least one additional substrate. In some embodiments, one of the substrates may be reconstituted, i.e., the substrate may be a powder/solid, a particular amount of which is added to a mixing manifold. A liquid substrate may also be added to the same mixing manifold and the powder substrate may be reconstituted in the liquid to a desired concentration. The contents of this manifold may then be provided to e.g., another manifold or dispensed.

In some embodiments, the methods described herein may be used in conjunction with mixing on-demand dialysate, for use with peritoneal dialysis or hemodialysis, according to a recipe/prescription. As is known in the art, the composition of dialysate may include, but is not limited to, one or more of the following: bicarbonate, sodium, calcium, potassium, chloride, dextrose, lactate, acetic acid, acetate, magnesium, glucose and hydrochloric acid.

The dialysate may be used to draw waste molecules (e.g., urea, creatinine, ions such as potassium, phosphate, etc.) and water from the blood into the dialysate through osmosis, and dialysate solutions are well-known to those of ordinary skill in the art.

For example, a dialysate typically contains various ions such as potassium and calcium that are similar to their natural concentration in healthy blood. In some cases, the dialysate may contain sodium bicarbonate, which is usually at a concentration somewhat higher than found in normal blood. Typically, the dialysate is prepared by mixing water from a source of water (e.g., reverse osmosis or "RO" water) with one or more ingredients: an "acid" (which may contain various species such as acetic acid, dextrose, NaCl, CaCl, KCl, MgCl, etc.), sodium bicarbonate (NaHCOs), and/or sodium chloride (NaCl). The preparation of dialysate, including using the appropriate concentrations of salts, osmolality, and the like, is also well-known to those of ordinary skill in the art. As discussed in detail below, the dialysate need not be prepared in real-time, on-demand. For instance, the dialysate can be made concurrently or prior to dialysis, and stored within a dialysate storage vessel or the like.

In some embodiments, one or more substrates, for example, the bicarbonate, may be stored in powder form. Although for illustrative and exemplary purposes only, a powder substrate may be referred to in this example as "bicarbonate", in other embodiments, any substrate/ingredient, in addition to, or instead of, bicarbonate, may be stored in a machine in powder form or as another solid and the process described herein for reconstitution of the substrate may be used. The bicarbonate may be stored in a "single use" container that, for example, may empty into a manifold. In some embodiments, a volume of bicarbonate may be stored in a container and a particular volume of bicarbonate from the container may be metered into a manifold. In some embodiments, the entire volume of bicarbonate may be completely emptied into a manifold, to mix a large volume of dialysate.

The solution in the first manifold lay be mixed in a second manifold with one or more additional substrates/ingredients. In addition, in some embodiments, one or more sensors (e.g., one or more conductivity sensors) may be located such that the solution mixed in the first manifold may be tested to ensure the intended concentration has been reached. In some embodiments, the data from the one or more sensors may be used in a feedback control loop to correct for errors in the solution. For example, if the sensor data indicates the bicarbonate solution has a concentration that is greater or less than the desired concentration, additional bicarbonate or RO may be added to the manifold.

In some recipes in some embodiments, one or more ingredients may be reconstituted in a manifold prior to being mixed in another manifold with one or more ingredients, whether those ingredients are also reconstituted powders/solids or liquids.

Thus, the system and methods described herein may provide a means for accurate, on-demand production or compounding of dialysate, or other solutions, including other solutions used for medical treatments. In some embodiments, this system may be incorporated into a dialysis machine, such as those described in U.S. patent application Ser. No. 12/072, 908 filed on 27 Feb. 2008 and having a priority date of 27 Feb. 2007, which is herein incorporated by reference in its entirety.

In other embodiments, this system may be incorporated into any machine where mixing a product, on-demand, may be desired.

Water may account for the greatest volume in dialysate, thus leading to high costs, space and time in transporting bags of dialysate. The above-described processing system 10 may prepare the dialysate in a dialysis machine, or, in a stand-alone dispensing machine (e.g., on-site at a patient's home), thus eliminating the need for shipping and storing large numbers of bags of dialysate. This above-described processing system 10 may provide a user or provider with the ability to enter the prescription desired and the above-described system may, using the systems and methods described herein, produce the desired prescription on-demand and on-site (e.g., including but not limited to: a medical treatment center, pharmacy or a patient's home) Accordingly, the systems and methods described herein may reduce transportation costs as the substrates/ingredients are the only ingredient requiring shipping delivery.

As discussed above, other examples of such products producible by processing system 10 may include but are not limited to: dairy-based products (e.g., milkshakes, floats, malts, frappes); coffee-based products (e.g., coffee, cappuccino, espresso); soda-based products floats, soda w/fruit juice); tea-based products (e.g., iced tea, sweet tea, hot tea); water-based products (e.g., spring water, flavored spring water, spring water w/vitamins, high-electrolyte drinks, high-carbohydrate drinks); solid-based products (e.g., trail mix, granola-based products, mixed nuts, cereal products, mixed grain products); medicinal products (e.g., infusible medicants, injectable medicants, ingestible medicants); alcohol-based products (e.g., mixed drinks, wine spritzers, soda-based alcoholic drinks, water-based alcoholic drinks); industrial products (e.g., solvents, paints, lubricants, stains); and health/beauty aid products shampoos, cosmetics, soaps, hair conditioners, skin treatments, topical ointments).

A number of implementations have been described. Nevertheless, it will be understood that various modifications may be made. Accordingly, other implementations are within the scope of the following claims.

What is claimed is:

1. A magnetic field focusing assembly comprising:
a magnetic field generating device configured to generate a magnetic field;
a split ring resonator assembly configured to be magnetically coupled to the magnetic field generating device and configured to focus at least a portion of the magnetic field produced by the magnetic field generating device; and
an eddy current trap positioned a predetermined distance from the magnetic field generating device.

2. The magnetic field focusing assembly of claim 1 wherein the magnetic field generating device includes an antenna assembly.

3. The magnetic field focusing assembly of claim 1 wherein the split ring resonator assembly is constructed of a metamaterial.

4. The magnetic field focusing assembly of claim 1 wherein the split ring resonator assembly is constructed of a non-ferrous material.

5. The magnetic field focusing assembly of claim 1 wherein the split ring resonator assembly is configured to be generally planar and have a geometric shape.

6. The magnetic field focusing assembly of claim 1 wherein the magnetic field generating device is configured to be energized by a carrier signal having a defined frequency and the split ring resonator assembly is configured to have a resonant frequency that is approximately 5-10% higher than the defined frequency of the carrier signal.

7. The magnetic field focusing assembly of claim 1 wherein the magnetic field generating device is configured to be energized with a carrier signal, the magnetic field generating device including:
   an inductive component including a loop antenna assembly, wherein the circumference of the loop antenna assembly is no more than 25% of the wavelength of the carrier signal; and
   at least one capacitive component coupled to the inductive component.

8. The magnetic field focusing assembly of claim 7 wherein the inductive component is configured to be positioned proximate a first slot assembly to detect the presence of a first RFID tag assembly within the first slot assembly and not detect the presence of a second RFID tag assembly within a second slot assembly that is adjacent to the first slot assembly.

9. The magnetic field focusing assembly of claim 7 wherein the circumference of the loop antenna assembly is approximately 10% of the wavelength of the carrier signal.

10. The magnetic field focusing assembly of claim 7 wherein the at least one capacitive component includes a first capacitive component configured to couple a port on which the carrier signal is received and a ground.

11. The magnetic field focusing assembly of claim 10 wherein the at least one capacitive component includes a second capacitive component configured to couple the port on which the carrier signal is received and the inductive component.

12. The magnetic field focusing assembly of claim 1 wherein the magnetic field generating device is configured to be energized with a carrier signal, the magnetic field generating device including:
   an inductive component including a multi-segment loop antenna assembly, wherein the multi-segment loop antenna assembly includes:
      at least a first antenna segment including at least a first phase shift element configured to reduce the phase shift of the carrier signal within the at least a first antenna segment, and
      at least a second antenna segment including at least a second phase shift element configured to reduce the phase shift of the carrier signal within the at least a second antenna segment,
      wherein the length of each antenna segment is no more than 25% of the wavelength of the carrier signal; and
   at least one matching component configured to adjust the impedance of the multi-segment loop antenna assembly.

13. The magnetic field focusing assembly of claim 12 wherein the inductive component is configured to be positioned proximate an access assembly and to allow RFID-based actuation of the access assembly.

14. The magnetic field focusing assembly of claim 12 wherein at least one of the first phase shift element and the second phase shift element includes a capacitive component.

15. The magnetic field focusing assembly of claim 12 wherein the length of each antenna segment is approximately 10% of the wavelength of the carrier signal.

16. The magnetic field focusing assembly of claim 12 wherein the at least one matching component includes:
   a first matching component configured to couple a port on which the carrier signal is received and a ground.

17. The magnetic field focusing assembly of claim 16 wherein the first matching component includes a capacitive component.

18. The magnetic field focusing assembly of claim 16 wherein the at least one matching component includes:
   a second matching component configured to couple the port on which the carrier signal is received and the inductive component.

19. The magnetic field focusing assembly of claim 18 wherein the second matching component includes a capacitive component.

* * * * *